(12) United States Patent
Frey et al.

(10) Patent No.: US 11,942,994 B2
(45) Date of Patent: Mar. 26, 2024

(54) APPARATUS AND METHOD FOR TRANSMITTING AND/OR RECEIVING DATA OVER A FIBER-OPTICAL CHANNEL EMPLOYING PERTURBATION-BASED FIBER NONLINEARITY COMPENSATION IN A PERIODIC FREQUENCY DOMAIN

(71) Applicant: Fraunhofer-Gesellschaft zur Förderung der angewandten Forschung e.V., Munich (DE)

(72) Inventors: Felix Frey, Berlin (DE); Johannes Fischer, Berlin (DE); Robert Fischer, Berlin (DE)

(73) Assignee: Fraunhofer-Gesellschaft zur Förderung der angewandten Forschung e. V., Munich (DE)

( * ) Notice: Subject to any disclaimer, the term of this patent is extended or adjusted under 35 U.S.C. 154(b) by 0 days.

(21) Appl. No.: 17/556,944

(22) Filed: Dec. 20, 2021

(65) Prior Publication Data
US 2022/0116113 A1  Apr. 14, 2022

Related U.S. Application Data

(63) Continuation of application No. PCT/EP2019/067484, filed on Jun. 28, 2019.

(30) Foreign Application Priority Data

Jun. 21, 2019 (EP) .................................... 19181865

(51) Int. Cl.
*H04B 10/2575* (2013.01)
*H04B 10/50* (2013.01)
*H04B 10/69* (2013.01)

(52) U.S. Cl.
CPC ..... *H04B 10/2575* (2013.01); *H04B 10/5057* (2013.01); *H04B 10/697* (2013.01)

(58) Field of Classification Search
CPC ............ H04B 10/2575; H04B 10/5057; H04B 10/697
(Continued)

(56) References Cited

U.S. PATENT DOCUMENTS

| 11,336,367 | B1* | 5/2022 | Oveis Gharan ...... H04B 10/075 |
| 2003/0231726 | A1* | 12/2003 | Schuchert ........... H04L 27/3863 375/350 |

(Continued)

FOREIGN PATENT DOCUMENTS

| CN | 104158787 A | * 11/2014 | |
| CN | 106452593 A | * 2/2017 | ....... H04B 10/07951 |

(Continued)

OTHER PUBLICATIONS

Sophocles et al; Introduction to Signal Processing ; 2011; pp. 1-398. (Year: 2011).*

(Continued)

*Primary Examiner* — Amritbir K Sandhu
(74) *Attorney, Agent, or Firm* — Perkins Coie LLP; Michael A. Glenn

(57) ABSTRACT

An apparatus for determining an interference in a transmission medium during a transmission of a data input signal according to an embodiment has a transform module configured to transform the data input signal from a time domain to a frequency domain comprising a plurality of frequency channels to obtain a frequency-domain data signal comprising a plurality of spectral coefficients, wherein each spectral coefficient is assigned to one of the frequency channels, an analysis module configured to determine the interference by determining one or more spectral interference coefficients, (Continued)

wherein each spectral interference coefficient is assigned to one frequency channel. The analysis module is configured to determine each spectral interference coefficient depending on the spectral coefficients, and depending on a transfer function, wherein the transfer function is configured to receive two or more argument values, wherein each of the argument values indicates one frequency channel, and wherein the transfer function is configured to return a return value depending on the argument values.

26 Claims, 18 Drawing Sheets

(58) Field of Classification Search
USPC .......................................................... 398/115
See application file for complete search history.

(56) References Cited

U.S. PATENT DOCUMENTS

| 2012/0114341 | A1 | 5/2012 | Hu et al. |
| 2014/0099116 | A1* | 4/2014 | Bai .......................... H04J 14/06 398/76 |
| 2015/0295643 | A1 | 10/2015 | Zhao et al. |
| 2017/0264468 | A1 | 9/2017 | Millar et al. |

FOREIGN PATENT DOCUMENTS

| EP | 2639976 | A1 * | 9/2013 | ......... H04B 10/2507 |
| EP | 2651084 | A2 * | 10/2013 | ......... H04B 10/2507 |
| JP | 2015204622 | A | 11/2015 | |
| JP | 2017017427 | A | 1/2017 | |
| JP | 2018530974 | A | 10/2018 | |
| KR | 20080051984 | A * | 6/2008 | |
| WO | 2017033550 | A1 | 3/2017 | |

OTHER PUBLICATIONS

Zhao et al; Fast channel estimation and equalization scheme for offset—QAM OFDM systems; Jan. 2019; Optics Express; pp. 1-15. (Year: 2019).*
Ebrahim et al.; Windowed overlapped frequency domain block filtering approach for direct sequence signal acquisition; Apr. 2017; Digital Communications and Networks; pp. 1-8. (Year: 2017).*
A. Bononi, P. Serena, and A. Orlandini, "A Unified Design Framework for Terrestrial Systems," J. Lightwave Technol., vol. 26, No. 22, pp. 3617-3631, 2008.
A. Mecozzi and F. Matera, "Polarization Scattering by Intra-channel Collisions," Opt. Express, vol. 20, No. 2, pp. 1213-1218, 2012.
A. Vannucci, P. Serena, and A. Bononi, "The RP Method: A New Tool for The Iterative Solution of the Nonlinear Schrödinger Equation," J. Lightwave Technol., vol. 20, No. 7, pp. 1102-1112, 2002.
F. Frey, R. Emmerich, C. Schubert, J. K. Fischer, and F. Fischer, "Improved Perturbation-based Fiber Nonlinearity Compensation," in 44th Eur. Conf. Opt. Commun., No. Tu1F.6, 2018.
F. P. Guiomar and A. N. Pinto, "Simplified Volterra Series Nonlinear Equalizer for Polarization-multiplexed Coherent Optical Systems," J. Lightwave Technol., vol. 31, No. 23, pp. 3879-3891, 2013.
G. P. Agrawal, Fiber-Optic Communication Systems. John Wiley & Sons, Inc., 4th ed., 2010 (in parts 1, 2, 3, 4, 5 and 6).
Ghazisaeidi, "A Theory of Nonlinear Interactions Between Signal and Amplified Spontaneous Emission Noise in Coherent Wavelength Division Multiplexed Systems," J. Lightwave Technol., vol. 35, pp. 5150-5175, Dec. 2017.
H. Louchet, A. Hodzic, K. Petermann, A. Robinson, and R. Epworth, "Simple Criterion for the Characterization of Nonlinear Impairments in Dispersion-Managed Optical Transmission Systems," IEEE Photonics Technol. Lett., vol. 17, No. 10, pp. 2089-2091, 2005.

J. Ablowitz and T. Hirooka, "Managing Nonlinearity in Strongly Dispersion-managed Optical Pulse Transmission," J. Opt. Soc. Am. B Opt. Phys., vol. 19, No. 3, pp. 425-439, 2002.
J. C. Cartledge et al., Digital signal processing for fiber nonlinearities [Invited], Optics Express vol. 25, No. 3, Feb. 6, 2017, pp. 1916-1936.
J. K. Fischer, C.-A. Bunge, and K. Petermann, "Equivalent Single-Span Model for Dispersion-Managed Fiber-Optic Transmission Systems," J. Lightwave Technol., vol. 27, No. 16, pp. 3425-3432, 2009.
J. Shynk, "Frequency-Domain and Multirate Adaptive Filtering," IEEE Signal Process Mag., vol. 9, No. 1, pp. 14-37, 1992.
K. V. Peddanarappagari and M. Brandt-Pearce, "Volterra Series Transfer Function of Single-mode Fibers," J. Lightwave Technol., vol. 15, No. 12, pp. 2232-2241, 1997.
Liu, L. Li, Y. Huang, K. Cui, Q. Xiong, F. N. Hauske, C. Xie, and Y. Cai, "Intrachannel Nonlinearity Compensation by Inverse Volterra Series Transfer Function," J. Lightwave Technol., vol. 30, No. 3, pp. 310-316, 2012.
M. Secondini, E. Forestieri, and C. R. Menyuk, "A Combined Regular-Logarithmic Perturbation Method for Signal-Noise Interaction in Amplified Optical Systems," J Lightwave Technol, vol. 27, pp. 3358-3369, Aug. 2009.
M. Winter, C.-A. Bunge, D. Setti, and K. Petermann, "A Statistical Treatment of Cross-Polarization Modulation in DWDM Systems," J. Lightwave Technol., vol. 27, No. 17, pp. 3739-3751, 2009.
Mecozzi and R. Essiambre, "Nonlinear Shannon Limit in Pseudolinear Coherent Systems," J. Lightwave Technol., vol. 30, No. 12, pp. 2011-2024, 2012.
Mecozzi, C. B. Clausen, and M. Shtaif, "Analysis of Intrachannel Nonlinear Effects in Highly Dispersed Optical Pulse Transmission," IEEE Photonics Technol. Lett., vol. 12, No. 4, pp. 392-394, 2000.
Mecozzi, C. B. Clausen, and M. Shtaif, "System Impact of Intrachannel Nonlinear Effects in Highly Dispersed Optical Pulse Transmission," IEEE Photonics Technol. Lett., vol. 12, No. 12, pp. 1633-1635, 2000.
Mecozzi, C. B. Clausen, M. Shtaif, S. G. Park, and A. H. Gnauck, "Cancellation of Timing and Amplitude Jitter in Symmetric Links Using Highly Dispersed Pulses," IEEE Photonics Technol. Lett., vol. 13, No. 5, pp. 445-447, 2001.
P. Gordon and H. Kogelnik, "PMD Fundamentals: Polarization Mode Dispersion in Optical Fibers," Proc. Natl. Acad. Sci. U.S.A., vol. 97, No. 9, pp. 4541-4550, 2000.
P. Poggiolini, "The GN Model of Non-linear Propagation in Uncompensated Coherent Optical Systems," J. Lightwave Technol., vol. 30, No. 24, pp. 3857-3879, 2012.
P. Poggiolini, G. Bosco, A. Carena, V. Curri, Y. Jiang, and F. Forghieri, "A Detailed Analytical Derivation of the GN Model of Non-Linear Interference in Coherent Optical Transmission Systems," arXiv Prepr.arXiv1209.0394v13, No. 1209.0394, pp. 1-24, 2012.
R. Dar, "Analytical and Semi-Analytical Models for Nonlinear Transmission," in 42th Eur. Conf. Opt. Commun., No. W.1.D.5, 2016.
R. Dar, M. Feder, A. Mecozzi, and M. Shtaif, "Accumulation of Nonlinear Interference Noise in Fiber-Optic Systems," Opt. Express, vol. 22, No. 12, pp. 14199-14211, 2014.
R. Dar, M. Feder, A. Mecozzi, and M. Shtaif, "Properties of Nonlinear Noise in Long, Dispersion-Uncompensated Fiber Links," Opt. Express, vol. 21, No. 22, pp. 25685-25699, 2013.
R. Dar, M. Feder, A. Mecozzi, and M. Shtaif, "Pulse Collision Picture of Inter-Channel Nonlinear Interference in Fiber-Optic Communications," J. Lightwave Technol., vol. 34, pp. 593-607, Jan. 2016.
R. Gabitov and S. K. Turitsyn, "Averaged Pulse Dynamics in a Cascaded Transmission System with Passive Dispersion Compensation," Opt. Lett., vol. 21, No. 5, pp. 327-329, 1996.
R. W. Boyd, Nonlinear Optics. Academic Press, 3rd ed., 2008.
S. J. Savory, "Digital Coherent Optical Receivers: Algorithms and Subsystems," IEEE J. Sel. Top. Quantum Electron., vol. 16, No. 5, pp. 1164-1179, Sep. 2010.

(56) References Cited

OTHER PUBLICATIONS

Serena and A. Bononi, "On the Nonlinear Reference Phase in Regular Perturbation Models," in 2015 Tyrrhenian Int. Work. Digit. Commun., No. 1-4, 2015.

V. Sinkin, R. Holzlöhner, J. Zweck, and C. R. Menyuk, "Optimization of the Split-step Fourier Method in Modeling Optical-fiber Communications Systems," J Lightwave Technol, vol. 21, pp. 61-68, Jan. 2003.

Xu and M. Brandt-Pearce, "Modified Volterra Series Transfer Function Method and Applications to Fiber-Optic Communications," in 35th Annu. Asilomar Conf. Signals, Syst. Comput., pp. 23-27, 2001.

Xu and M. Brandt-Pearce, "Modified Volterra Series Transfer Function Method," IEEE Photonics Technol. Lett., vol. 14, pp. 47-49, Jan. 2002.

Y. Fan, L. Dou, Z. Tao, L. Lei, S. Oda, T. Hoshida, and J. C. Rasmussen, "Modulation Format Dependent Phase Noise Caused by Intra-channel Nonlinearity," in 38th Eur. Conf. Opt. Commun., No. We.2.C.3, 2012.

Z. Tao, Y. Zhao, Y. Fan, L. Dou, T. Hoshida, and J. Rasmussen, "Analytical Intrachannel Nonlinear Models to Predict the Nonlinear Noise Waveform," J. Lightwave Technol., vol. 33, No. 10, pp. 2111-2119, 2014.

"Frequency-Domain Chromatic Dispersion Equalization Using Overlap-Add Methods in Coherent Optical System", T. Xu et al.; Journal of Optical Communications., DE, (Jan. 1, 2011), vol. 32, No. 2, doi:10.1515/joc.2011.022, ISSN 0173-4911, pp. 131-135, XP055669111 [A] DOI: http://dx.doi.org/10.1515/joc.2011.022.

"Modeling of the Impact of Nonlinear Propagation Effects in Uncompensated Optical Coherent Transmission Links", A. Carena, V. Curri, G. Bosco, P. Poggiolini, and F. Forghieri; J. Lightwave Technology., vol. 30, No. 10, pp. 1524-1539, May 2012.

"Perturbation Analysis of Nonlinear Propagation in a Strongly Dispersive Optical Communication System", P. Johannisson and M. Karlsson, J. Lightwave Technol., vol. 31, No. 8, pp. 1273-1282, Apr. 2013. ISSN 0733-8724, XP011495534 [AD] DOI: http://dx.doi.org/10.1109/JLT.2013.2246543.

A. V. Oppenheim and A. S. Willsky, Signals and Systems. Prentice Hall, 1983 (Reference only refer to general background information. Reference not available).

D. Kammeyer, Nachrichtenübertragung. Vieweg + Teubner, 2008 (Reference only refer to general background information. Reference not available).

D. Zwillinger, Handbook of Differential Equations (eprint). Academic Press, 3rd ed., 1998.

J. Ablowitz and T. Hirooka, "Resonant Nonlinear Intrachannel Interactions in Strongly Dispersion-managed Transmission Systems," Opt. Lett., vol. 25, No. 24, pp. 1750-1752, 2000.

Kaminow, Optical Fiber Telecommunications vol. VIB, Systems and Networks. Elsevier Science Publishing, 6th ed., 2013. (Reference only refer to general background information. Reference not available).

Mecozzi, "A Unified Theory of Intrachannel Nonlinearity in Pseudolinear Transmission," in Impact of Nonlinearities on Fiber Optic Communications, pp. 253-291, Springer Science & Business Media, 2011.

R. Engelbrecht, Nichtlineare Faseroptik: Grundlagen und Anwendungsbeispiele. Springer-Verlag, 2015.

R. F. H. Fischer, Precoding and Signal Shaping for Digital Transmission. John Wiley & Sons, 2002.

X. Wei, "Power-Weighted Dispersion Distribution Function Longhaul Optical Transmission Links," Opt. Lett., vol. 31, No. 17, pp. 2544-2546, 2006.

\* cited by examiner

APPARATUS AND METHOD FOR TRANSMITTING AND/OR RECEIVING DATA OVER A FIBER-OPTICAL CHANNEL EMPLOYING PERTURBATION-BASED FIBER NONLINEARITY COMPENSATION IN A PERIODIC FREQUENCY DOMAIN

CROSS-REFERENCE TO RELATED APPLICATIONS

This application is a continuation of copending International Application No. PCT/EP2019/067484, filed Jun. 28, 2019, which is incorporated herein by reference in its entirety, and additionally claims priority from European Application No. 19181865.7, filed Jun. 21, 2019, which is also incorporated herein by reference in its entirety.

BACKGROUND OF THE INVENTION

The present invention relates to an apparatus and method for transmitting and/or receiving data over a channel, in particular, to an apparatus and method for transmitting and/or receiving data over a fiber-optical channel employing perturbation-based fiber nonlinearity compensation in a periodic frequency domain.

In communication theory, discrete-time end-to-end channel models play a fundamental role in developing advanced transmission and equalization schemes. Most notable the discrete-time linear, dispersive channel with additive white Gaussian noise (AWGN) is often used to model point-to-point transmission scenarios. In the last decades, a large number of transmission methods matched to such linear channels have emerged and are now applied in many standards in the field of digital transmission systems. With the advent of high-speed CMOS technology, those schemes have also been adopted in applications for fiber-optical transmission with digital-coherent reception [1]. However, many of the applied techniques (e.g., coded modulation, signal shaping and equalization) are designed for linear channels whereas the fiber-optical channel is inherently nonlinear. An exact model to obtain the output sequence from a given input sequence by an explicit input/output relation is highly desirable to make further advances in developing strategies optimized for fiber-optical transmission.

Indeed, many works in the past two decades were devoted to develop channel models for fiber-optic transmission with good trade-offs between computational complexity and numerical accuracy. Starting from the nonlinear Schrödinger equation (NLSE), approximate solutions can be obtained following either a perturbative approach (cf. [2, P. 610]) or the equivalent method of Volterra series transfer function (VSTF) (cf. [3], [4]). These channel models can approximate the nonlinear distortion—there commonly termed nonlinear interference (NLI)—up to the order of the series expansion of the NLSE. A comprehensive summary of recent developments on channel models can be found in [5, Sec. I].

One particular class of channel models—based on a first-order time-domain perturbative approach—has been published in the early 2000s in a series of contributions by Antonio Mecozzi in collaboration with a group from AT&T Labs [6]-[8]. The results, however, were limited to transmission schemes that were practical at that time (e.g., dispersion-managed transmission, intensity-modulation and direct-detection) and the details of the theory and its derivation were published only recently in [9]. A follow-up seminal paper with Rene-Jean Essiambre [10] extents the former work by including the matched filter and T-spaced sampling after ideal coherent detection. One central result of this work is the integral formulation of the Volterra kernel coefficients providing a first-order approximation of the per-modulation-interval T equivalent end-to-end input/output relation. Based on this work the joint contributions with Ronen Dar and colleagues [11]-[13] resulted in the so-called pulse-collision picture of the nonlinear fiber-optical channel. Here, the properties of cross-channel NLI were properly associated with certain types of pulse collisions in time-domain.

SUMMARY

According to an embodiment, an apparatus for determining an interference in a transmission medium during a transmission of a data input signal may have: a transform module configured to transform the data input signal from a time domain to a frequency domain comprising a plurality of frequency channels to obtain a frequency-domain data signal comprising a plurality of spectral coefficients, wherein each spectral coefficient of the plurality of spectral coefficients is assigned to one of the plurality of frequency channels, and an analysis module configured to determine the interference by determining one or more spectral interference coefficients, wherein each of the one or more spectral interference coefficients is assigned to one of the plurality of frequency channels, wherein the analysis module configured to determine each of the one or more spectral interference coefficients depending on the plurality of spectral coefficients and depending on a transfer function, wherein the transfer function is configured to receive two or more argument values, wherein each of the two or more argument values indicates one of the plurality of frequency channels, and wherein the transfer function is configured to return a return value depending on the two or more argument values.

According to another embodiment, a method for determining an interference in a transmission medium during a transmission of a data input signal may have the steps of: transforming the data input signal from a time domain to a frequency domain comprising a plurality of frequency channels to obtain a frequency-domain data signal comprising a plurality of spectral coefficients, wherein each spectral coefficient of the plurality of spectral coefficients is assigned to one of the plurality of frequency channels, and determining the interference by determining one or more spectral interference coefficients, wherein each of the one or more spectral interference coefficients is assigned to one of the plurality of frequency channels, wherein determining each of the one or more spectral interference coefficients is conducted depending on the plurality of spectral coefficients and depending on a transfer function, wherein the transfer function is configured to receive two or more argument values, wherein each of the two or more argument values indicates one of the plurality of frequency channels, and wherein the transfer function is configured to return a return value depending on the two or more argument values.

Another embodiment may have a non-transitory digital storage medium having stored thereon a computer program for performing the above inventive method for determining an interference in a transmission medium during a transmission of a data input signal, when said computer program is run by a computer.

An apparatus for determining an interference in a transmission medium during a transmission of a data input signal according to an embodiment is provided. The apparatus comprises a transform module configured to transform the data input signal from a time domain to a frequency domain comprising a plurality of frequency channels to obtain a frequency-domain data signal comprising a plurality of spectral coefficients, wherein each spectral coefficient of the plurality of spectral coefficients is assigned to one of the plurality of frequency channels. Moreover, the apparatus comprises an analysis module configured to determine the interference by determining one or more spectral interference coefficients, wherein each of the one or more spectral interference coefficients is assigned to one of the plurality of frequency channels. The analysis module configured to determine each of the one or more spectral interference coefficients depending on the plurality of spectral coefficients and depending on a transfer function wherein the transfer function is configured to receive two or more argument values, wherein each of the two or more argument values indicates one of the plurality of frequency channels, and wherein the transfer function is configured to return a return value depending on the two or more argument values.

A method for determining an interference in a transmission medium during a transmission of a data input signal according to an embodiment is provided. The method comprises:

Transforming the data input signal from a time domain to a frequency domain comprising a plurality of frequency channels to obtain a frequency-domain data signal comprising a plurality of spectral coefficients, wherein each spectral coefficient of the plurality of spectral coefficients is assigned to one of the plurality of frequency channels. And:

Determining the interference by determining one or more spectral interference coefficients, wherein each of the one or more spectral interference coefficients is assigned to one of the plurality of frequency channels.

Determining each of the one or more spectral interference coefficients is conducted depending on the plurality of spectral coefficients and depending on a transfer function, wherein the transfer function is configured to receive two or more argument values, wherein each of the two or more argument values indicates one of the plurality of frequency channels, and wherein the transfer function is configured to return a return value depending on the two or more argument values.

Moreover, computer programs are provided, wherein each of the computer programs is configured to implement one of the above-described methods when being executed on a computer or signal processor.

In embodiments, it is aimed to complement the view on T-spaced end-to-end channel models for optical transmission systems by an equivalent frequency-domain description. The time discretization translates to a 1/T-periodic representation in frequency. Remarkably, the frequency-matching which is imposed along with the general four wave mixing (FWM) process is still maintained in the periodic frequency domain. The structure of this paper is organized as follows. The notation is briefly introduced and the system model of coherent fiber-optical transmission is presented. Starting from the continuous-time end-to-end relation of the optical channel—an intermediate result following the perturbation approach—the discrete-time end-to-end relation is derived. We particularly highlight the relation between the time and frequency representation and point out the connection to other well-known channel models. The relevant system parameters, i.e., memory and strength, of the nonlinear response are identified which lead to design rules of practical schemes for fiber nonlinearity mitigation. For such schemes, a novel algorithm in 1/T-periodic frequency-domain is introduced well-suited also for systems operating at very high symbol rates. Similar to the pulse-collision picture, certain degenerate mixing products in frequency domain can be attributed to a pure phase and polarization rotation. This in turn motivates the extension of the original regular perturbation model to a combined regular-logarithmic model taking the multiplicative nature of certain distortions properly into account. The theoretical considerations are complemented by numerical simulations which are in accordance with results obtained by the split-step Fourier method (SSFM). Here, the relevant metric to assess the match between both models is the mean-squared error (MSE) between the two T-spaced output sequences for a given input sequence.

A discrete-time end-to-end fiber-optical channel model based on a first-order perturbation approach is provided. The model relates the discrete-time input symbol sequences of co-propagating wavelength channels to the received symbol sequence after matched filtering and T-spaced sampling. To that end, the interference from both self- and cross-channel nonlinear interactions of the continuous-time optical signal is represented by a single discrete-time perturbative term. Two equivalent models can be formulated—one in the discrete-time domain, the other in the 1/T-periodic continuous-frequency domain. The time-domain formulation coincides with the pulse-collision picture and its correspondence to the frequency-domain description is derived. The latter gives rise to a novel perspective on the end-to-end input/output relation of optical transmission systems. Both views can be extended from a regular, i.e., solely additive model to a combined regular-logarithmic model to take the multiplicative nature of certain degenerate distortions into consideration. An alternative formulation of the GN-model and a novel algorithm for application in low-complexity fiber nonlinearity compensation are provided. The derived end-to-end model entails only a single computational step and shows good agreement in a mean-squared error sense compared to the incremental split-step Fourier method.

BRIEF DESCRIPTION OF THE DRAWINGS

Embodiments of the present invention will be described below in more detail with reference to the appended drawings, in which.

DETAILED DESCRIPTION OF THE INVENTION

Figure 1A:
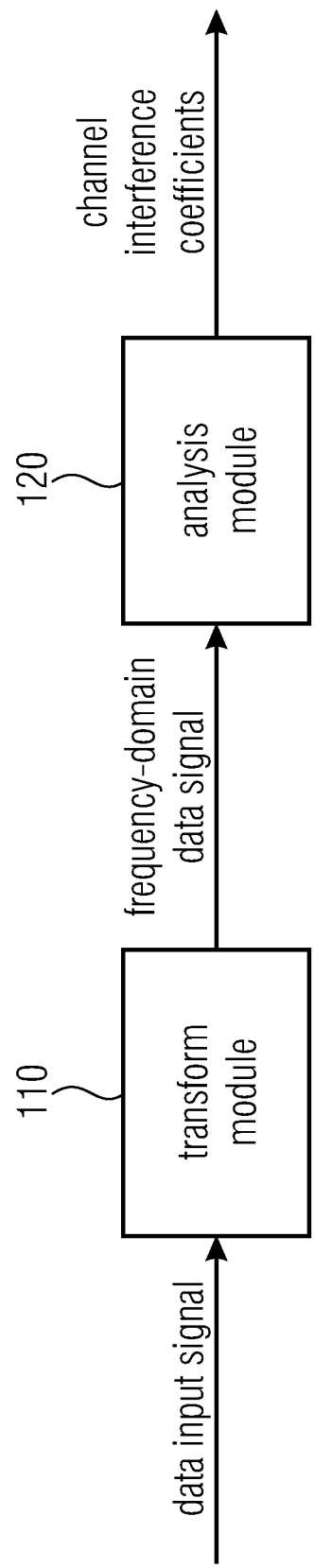
FIG. 1a illustrates an apparatus for determining an interference in a transmission medium during a transmission of a data input signal according to an embodiment.

FIG. 1a illustrates an apparatus for determining an interference in a transmission medium during a transmission of a data input signal according to an embodiment.

The apparatus comprises a transform module 110 configured to transform the data input signal from a time domain to a frequency domain comprising a plurality of frequency channels to obtain a frequency-domain data signal comprising a plurality of spectral coefficients ($A_\lambda[\mu], A_\lambda[\mu_1], A_\lambda[\mu_1], A_\lambda[\mu_2], A_\lambda[\mu_3], \ldots$), wherein each spectral coefficient of the plurality of spectral coefficients ($A_\lambda[\mu], A_\lambda[\mu_1], A_\lambda[\mu_2], A_\lambda[\mu_3], \ldots$), is assigned to one of the plurality of frequency channels.

Moreover, the apparatus comprises an analysis module 120 configured to determine the interference by determining one or more spectral interference coefficients (e.g., $\Delta A_\lambda^{SCI}[\mu]$), wherein each of the one or more spectral interference coefficients (e.g., $\Delta A_\lambda^{SCI}[\mu]$) is assigned to one of the plurality of frequency channels.

The analysis module 120 configured to determine each of the one or more spectral interference coefficients (e.g., $\Delta A_\lambda^{SCI}[\mu]$) depending on the plurality of spectral coefficients ($A_\lambda[\mu], A_\lambda[\mu_1], A_\lambda[\mu_2], A_\lambda[\mu_3], \ldots$), and depending on a transfer function ($H_\rho[\mu_1, \mu_2, \mu_3]; H_\nu(\omega_1, \omega_2, \omega_3)$) wherein the transfer function ($H_\rho[\mu_1, \mu_2, \mu_3]: (\omega_1, \omega_2, \omega_3)$) is configured to receive two or more argument values ($\mu_1, \mu_2, \mu_3; \omega_1, \omega_2, \omega_3$), wherein each of the two or more argument values ($\mu_1, \mu_2, \mu_3; \omega_1, \omega_2, \omega_3$) indicates one of the plurality of frequency channels, and wherein the transfer function is configured to return a return value depending on the two or more argument values ($\mu_1, \mu_2, \mu_3; \omega_1, \omega_2, \omega_3$).

In an embodiment, the transmission medium may, e.g., be a fiber-optical channel.

Figure 1B:
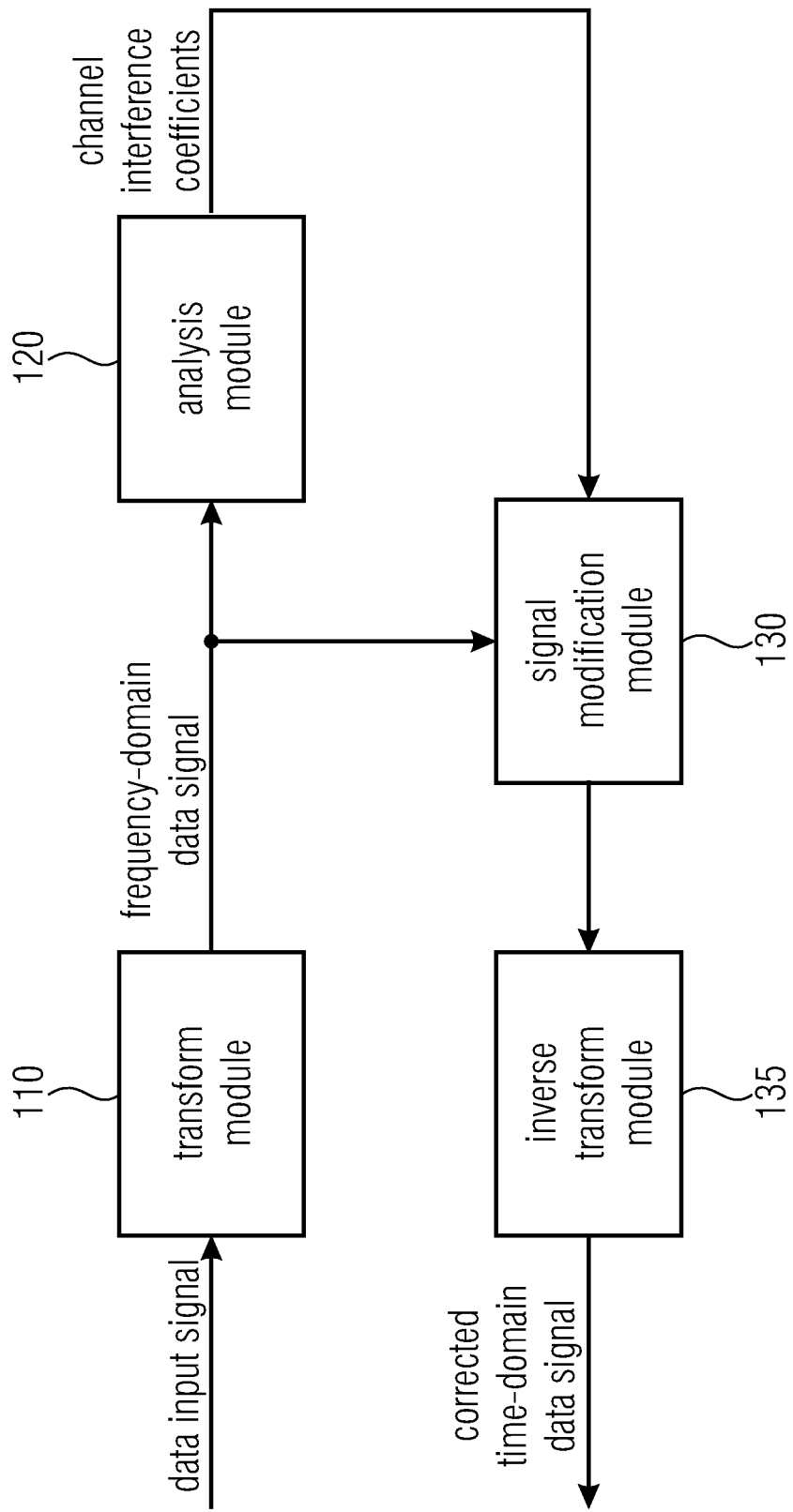
FIG. 1b illustrates another embodiment, wherein the apparatus further comprises a signal modification module and an inverse transform module.

FIG. 1b illustrates another embodiment, wherein the apparatus further comprises a signal modification module 130 being configured to modify the frequency-domain data signal using the one or more spectral interference coefficients to obtain a modified data signal. The apparatus of FIG. 1b further comprises an inverse transform module 135 configured to transform the modified data signal from the frequency domain to the time domain to obtain a corrected time-domain data signal.

According to an embodiment, the signal modification module 130 of FIG. 1b may, e.g., be configured to combine each one of the one or more spectral interference coefficients (e.g., $\Delta A_\lambda^{SCI}[\mu]$), or a value derived from said one of the one or more spectral interference coefficients (e.g., $\Delta A_\lambda^{SCI}[\mu]$), and one of the plurality of spectral coefficients ($A_\lambda[\mu], A_\lambda[\mu_1], A_\lambda[\mu_2], A_\lambda[\mu_3], \ldots$) to obtain the modified data signal. In a particular embodiment, the signal modification module 130 of FIG. 1b may, e.g., be configured to combine each one of the one or more spectral interference coefficients (e.g., $\Delta A_\lambda^{SCI}[\mu]$), or a value derived from said one of the one or more spectral interference coefficients (e.g., $\Delta A_\lambda^{SCI}[\mu]$), and one of the plurality of spectral coefficients ($A_\lambda[\mu], A_\lambda[\mu_1], A_\lambda[\mu_2], A_\lambda[\mu_3], \ldots$) to obtain the modified data signal by subtracting each one of the one or more spectral interference coefficients (e.g., $\Delta A_\lambda^{SCI}[\mu]$), or a value derived from said one of the one or more spectral interference coefficients (e.g., $\Delta A_\lambda^{SCI}[\mu]$), from one of the plurality of spectral coefficients ($A_\lambda[\mu], A_\lambda[\mu_1], A_\lambda[\mu_2], A_\lambda[\mu_3]), \ldots$);

or, in another embodiment, to obtain the modified receive signal/sequence by subtracting each one of the one or more spectral interference coefficients (e.g., $\Delta A_\lambda^{SCI}[\mu]$), or a value derived from said one of the one or more spectral interference coefficients (e.g., $\Delta A_\lambda^{SCI}[\mu]$), from one of the plurality of the spectral coefficients of the distorted receive sequence $Y_\lambda[\mu]$;

or, in a further embodiment, to inverse Discrete Fourier Transform the spectral interference coefficients $\Delta A_\lambda[k]$ to obtain time domain interference coefficients $\Delta a_\lambda[k]$, and to subtract the time domain interference coefficients $\Delta a_\lambda[k]$ from the (time-domain) receive sequence $y_\lambda[k]$;

or, in a yet further embodiment, to obtain the modified data or receive signal by subtracting each one of the one or more spectral interference coefficients (e.g., $\Delta A_\lambda^{SCI}[\mu]$), or a value derived from said one of the one or more spectral interference coefficients (e.g., $\Delta A_\lambda^{SCI}[\mu]$), and by multiplying each one of the one or more spectral phase and polarization coefficients $(\exp(-j\phi_\lambda I - j\vec{S}_\lambda))$ from one of the plurality of spectral coefficients ($A_\lambda[\mu]$, $A_\lambda[\mu_1]$, $A_\lambda[\mu_2]$, $A_\lambda[\mu_3]$, ... ) or from one of the plurality of the spectral coefficients of the distorted receive sequence $Y_\lambda[\mu]$.

In an embodiment, the transform module 110 of FIG. 1b may, e.g., be configured to transform the data input signal from the time domain to the frequency domain by transforming a plurality of overlapping blocks of the data input signal from the time domain to the frequency domain to obtain a plurality of blocks of the frequency-domain data signal. The inverse transform module 135 may, e.g., be configured to transform the modified data signal from the frequency domain to the time domain by transforming a plurality of blocks from the frequency domain to the time domain and by overlapping said plurality of blocks being represented in the time domain to obtain the corrected time-domain data signal.

Figure 1C:
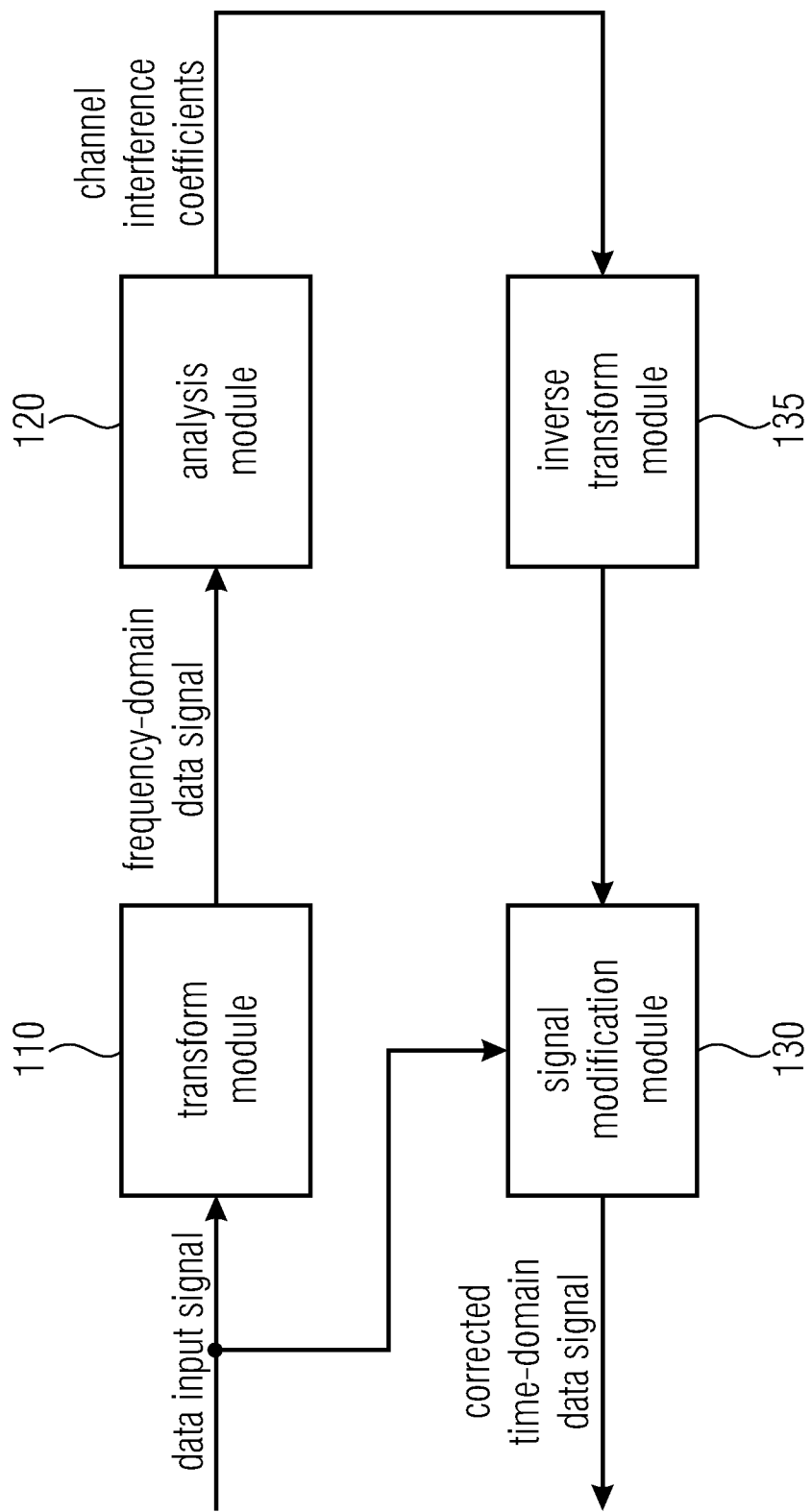
FIG. 1c illustrates a further embodiment, wherein the apparatus further comprises a signal modification module and an inverse transform module.

FIG. 1c illustrates a further embodiment, wherein the apparatus further comprises an inverse transform module 135 configured to transform the one or more spectral interference coefficients (e.g., $\Delta A_\lambda^{SCI}[\mu]$) from the frequency domain to the time domain. The apparatus of FIG. 1c further comprises a signal modification module 130 being configured to modify the data input signal being represented in the time domain using the one or more spectral interference coefficients being represented in the time domain to obtain a corrected time-domain data signal.

According to an embodiment, the signal modification module 130 of FIG. 1c may, e.g., be configured to combine each one of the one or more spectral interference coefficients being represented in the time domain, or a value derived from said one of the one or more spectral interference coefficients, and a time domain sample of a plurality of time domain samples of the data input signal being represented in the time domain to obtain the corrected time-domain data signal.

In a particular embodiment, the signal modification module 130 of FIG. 1c may, e.g., be configured to combine each one of the one or more spectral interference coefficients being represented in the time domain, or a value derived from said one of the one or more spectral interference coefficients, and a time domain sample of a plurality of time domain samples of the data input signal being represented in the time domain to obtain the corrected time-domain data signal by subtracting each one of the one or more spectral interference coefficients being represented in the time domain, or a value derived from said one of the one or more spectral interference coefficients, from a time domain sample of a plurality of time domain samples of the data input signal being represented in the time domain.

In an embodiment, the transform module 110 of FIG. 1c may, e.g., be configured to transform the data input signal from the time domain to the frequency domain by transforming a plurality of overlapping blocks of the data input signal from the time domain to the frequency domain to obtain a plurality of blocks of the frequency-domain data signal. The inverse transform module 135 may, e.g., be configured to transform a plurality of interference coefficients blocks from the frequency domain to the time domain, said plurality of blocks comprising the one or more spectral interference coefficients (e.g., $\Delta A_\lambda^{SCI}[\mu]$). The signal modification module 130 may, e.g., be configured to modify the overlapping blocks of the data input signal, being represented in the time domain, using the plurality of interference coefficients blocks to obtain a plurality of corrected blocks, wherein the signal modification module 130 is configured to overlap the plurality of corrected blocks to obtain the corrected time-domain data signal.

Figure 1D:
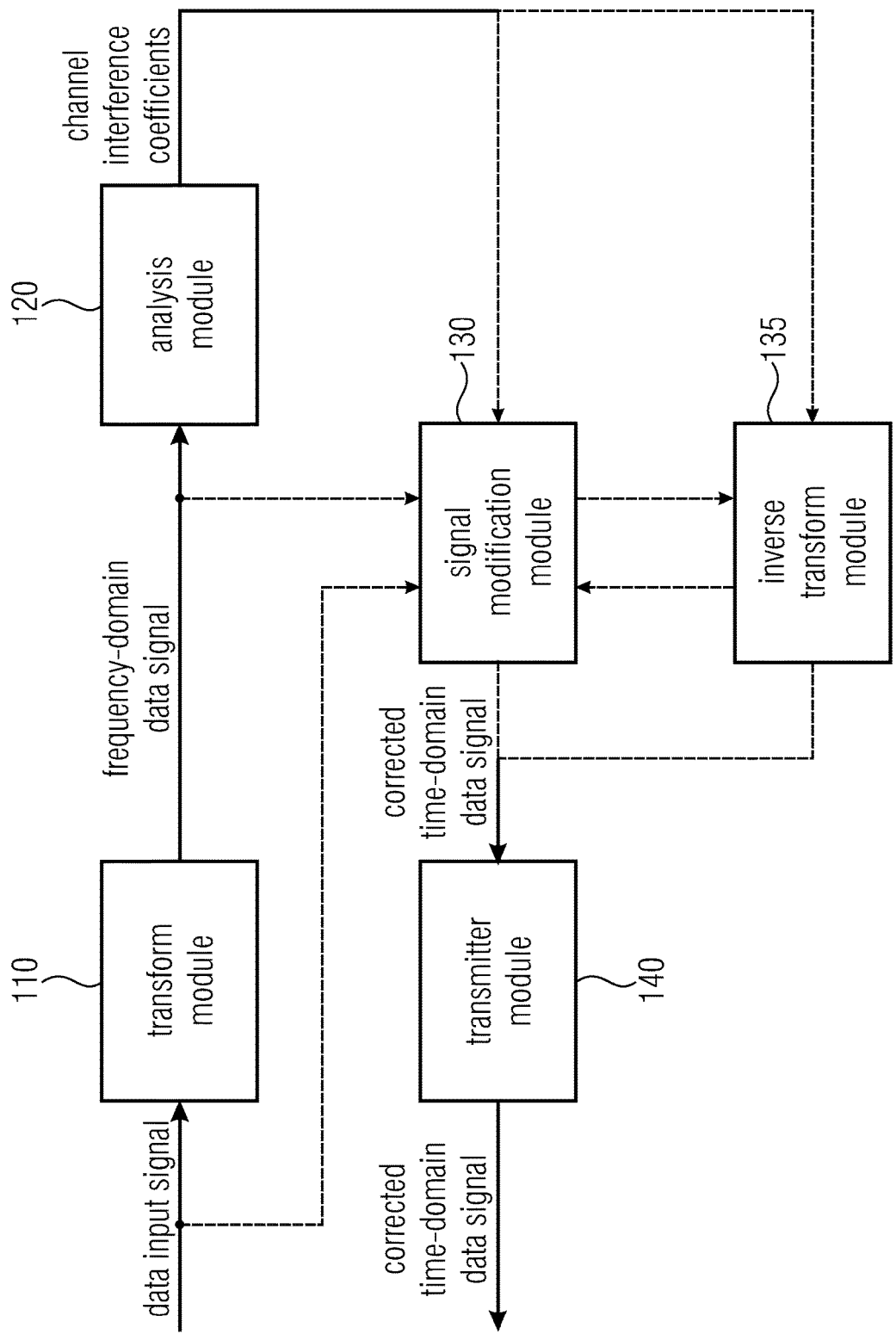
FIG. 1d illustrates another embodiment, wherein the apparatus further comprises a transmitter module configured to transmit the corrected time-domain data signal over the transmission medium.

FIG. 1d illustrates another embodiment, wherein the apparatus further comprises a transmitter module 140 configured to transmit the corrected time-domain data signal over the transmission medium.

Figure 1E:
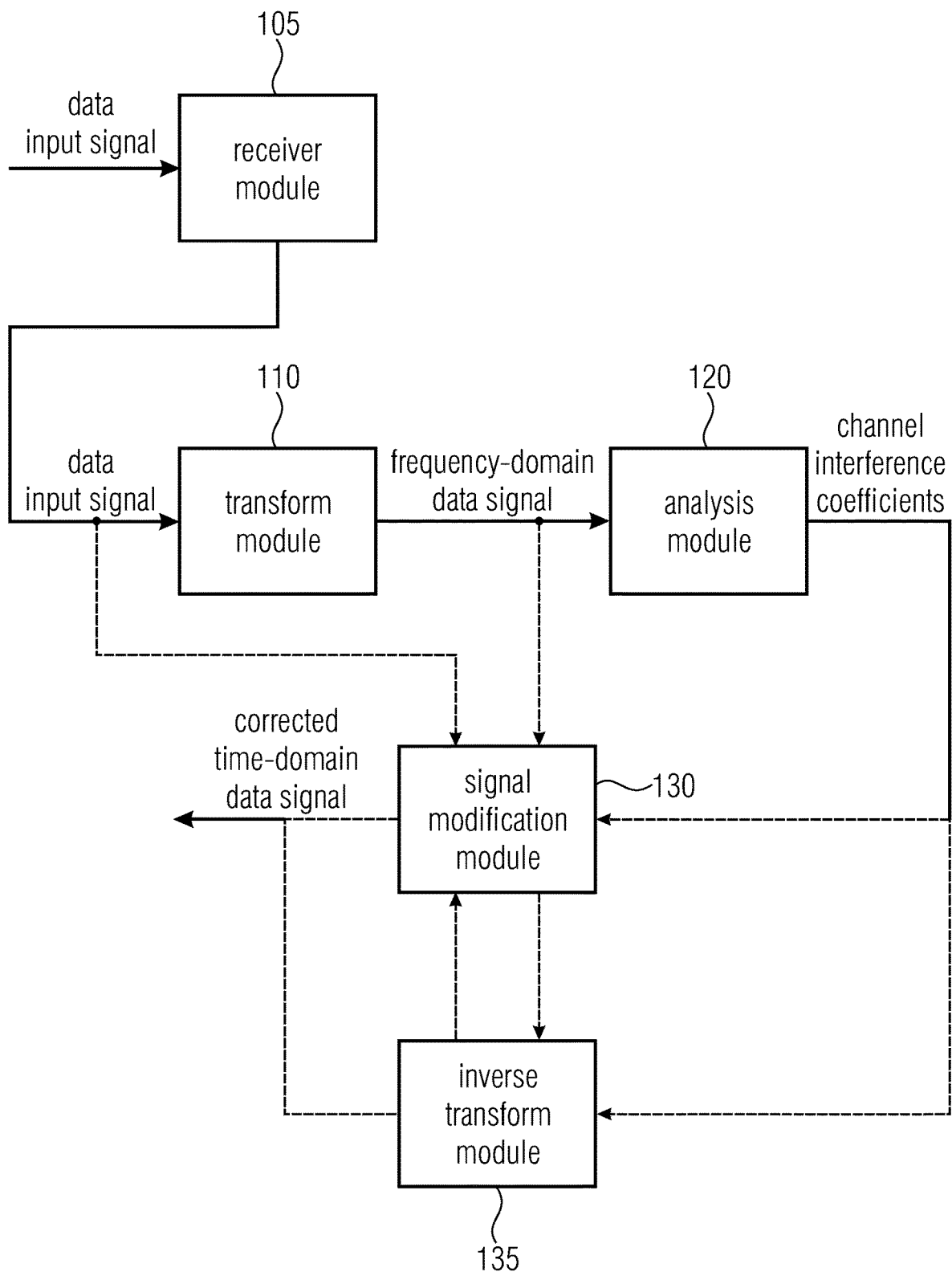
FIG. 1e illustrates a further embodiment, wherein the apparatus further comprises a receiver module configured to receive the data input signal being transmitted over the transmission medium.

FIG. 1e illustrates a further embodiment, wherein the apparatus further comprises a receiver module 105 configured to receive the data input signal being transmitted over the transmission medium.

In an embodiment, the analysis module 120 may, e.g., be configured to determine an estimation of a perturbated signal depending on the data input signal using the one or more spectral interference coefficients (e.g., $\Delta A_\lambda^{SCI}[\mu]$).

According to an embodiment, the analysis module 120 may, e.g., be configured to determine the estimation of the perturbated signal by adding each one of the one or more spectral interference coefficients (e.g., $\Delta A_\lambda^{SCI}[\mu]$) with one of the plurality of spectral coefficients ($A_\lambda[\mu]$, $A_\lambda[\mu_1]$, $A_\lambda[\mu_2]$, $A_\lambda[_3]$, ... ).

In an embodiment each of the two or more argument values may, e.g., be a channel index ($\mu_1$, $\mu_2$, $\mu_3$) being an index which indicates one of the plurality of frequency channels.

Or, in another embodiment, each of the two or more argument values is a frequency ($\omega_1$, $\omega_2$, $\omega_3$) which indicates one of the plurality of frequency channels, wherein said one of the plurality of frequency channels comprises said frequency.

In an embodiment, the analysis module 120 may, e.g., be configured to determine each spectral interference coefficient (e.g. $\Delta A_\lambda^{SCI}[\mu]$) of the one or more spectral interference coefficients (e.g., $\Delta A_\lambda^{SCI}[\mu]$) by determining a plurality of addends. The analysis module 120 may, e.g., be configured to determine each of the plurality of addends as a product of three or more of the spectral coefficients ($A_\lambda[\mu]$, $A_\lambda[\mu_1]$, $A_\lambda[\mu_2]$, $A_\lambda[\mu_3]$, ... ) and of the return value of the transfer function, the transfer function having three or more channel indices or three or more frequencies as the two or more argument values of the transfer function, which indicate three or more of the plurality of frequency channels to which said three or more of the spectral coefficients ($A_\lambda[\mu]$, $A_\lambda[\mu_1]$, $A_\lambda[\mu_2]$, $A_\lambda[\mu_3]$, ... ) are assigned.

In an embodiment, the analysis module 120 may, e.g., be configured to determine each spectral interference coefficient (e.g., $\Delta A_\lambda^{SCI}[\mu]$) of the one or more spectral interference coefficients (e.g., $\Delta A_\lambda^{SCI}[\mu]$) by determining a plurality of addends, wherein the analysis module 120 may, e.g., be configured to determine each of the plurality of addends as a product of three or more of the spectral coefficients ($A_\lambda[\mu]$, $A_\lambda[\mu_1]$, $A_\lambda[\mu_2]$, $A_\lambda[\mu_3]$, ... ) and of the return value of the transfer function, the transfer function having three or more channel indices or three or more frequencies as the two or more argument values of the transfer function, which indicate three or more of the plurality of frequency channels to which said three or more of the spectral coefficients ($A_\lambda[\mu]$, $A_\lambda[\mu_1]$, $A_\lambda[\mu_1]$, $A_\lambda[\mu_2]$, $A_\lambda[\mu_3]$, ...) are assigned.

According to an embodiment, the analysis module 120 may, e.g., be configured to determine each spectral interference coefficient (e.g., $\Delta A_\lambda^{SCI}[\mu]$) according to:

$$\Delta A_\lambda^{SCI}[\mu] = -j \frac{\phi_{NL,\rho}}{N_{DFT}^2} \times \sum_{\mu_1,\mu_2} A_\lambda[\mu_1] A_\lambda^H[\mu_2] A_\lambda[\mu_3] H_\rho[\mu_1, \mu_2, \mu_3]$$

wherein $\Delta A_\lambda^{SCI}[\mu]$ is said spectral interference coefficient, wherein $A_\lambda[\mu_1]$ is a first one of the three or more spectral coefficients, wherein $A_\lambda[\mu_2]$ is a second one of the three or more spectral coefficients, wherein $A_\lambda[\mu_3]$ is a third one of the three or more spectral coefficients, wherein $\mu_1$ is a first index which indicates a first one of the plurality of frequency channels, wherein $\mu_2$ is a second index which indicates a second one of the plurality of frequency channels, wherein $\mu_3$ is a third index which indicates a third one of the plurality of frequency channels, wherein $H_\rho[\mu_1,\mu_2\mu_3]$ indicates the transfer function, wherein $N_{DFT}^2$ indicates a square of a number of the plurality of frequency channels of the frequency domain, wherein $\phi NL,\rho$ is a number.

In an embodiment, the transfer function may, e.g., be normalized and nonlinear.

According to an embodiment, the analysis module 120 is configured to determine the interference by applying a regular perturbation approach (e.g., Algorithm 1).

In an embodiment, the analysis module 120 is configured to determine the interference by applying a regular logarithmic perturbation approach (e.g., Algorithm 2).

In an embodiment, the frequency domain may, e.g., be a regular-logarithmic frequency domain.

According to an embodiment, the transfer function may, e.g., depend on $$H_\nu(e^{j\omega T}) = \frac{1}{T^3} \sum_{m \in \mathbb{Z}^3} H_\nu\left(\omega - \frac{2\pi m}{T}\right).$$

In the following, embodiments of the present invention are described in more detail.

At first, the notation and the overall system model is introduced.

The notation and basic definitions are now described.

Sets are denoted with calligraphic letters, e.g., $\mathcal{A}$ is the set of data symbols, i.e., the symbol alphabet or signal constellation. A set of numbers or finite fields are typeset in blackboard bold typeface, e.g., the set of real numbers is $\mathbb{R}$. Bold letters, such as x, indicate vectors. If not stated otherwise, a vector $x=[x_1, x_2, \ldots, x_n]^T$ of dimension n is a column vector, and the set of indices to the elements of the vector is $$\mathcal{I} \stackrel{def}{=} \{1, \ldots, n\}.$$

Non-bold italic letters, like x, are scalar variables, whereas non-bold Roman letters refer to constants, e.g., the imaginary number is j with $j^2=-1$. $(\cdot)^T$ denotes transposition and $(\cdot)^H$ is the Hermitian transposition.

A real (bandpass) signal is typically described using the equivalent complex baseband (ECB) representation, i.e., we consider the complex envelope $x(t) \in \mathbb{C}$ with inphase (real) and quadrature (imaginary) component. The n-dimensional Fourier transform of a continuous-time signal $x(t)= x(t_1, t_2, \ldots, t_n)$ depending on the n-dimensional time vector $t=[t_1, t_2, \ldots, t_n]^T \in \mathbb{R}^n$ (in seconds) is denoted by $X(\omega)=\mathcal{F}\{x(t)\}$, and defined as [14, Ch. 4]

$$X(\omega) = \mathcal{F}\{x(t)\} \stackrel{def}{=} \int_{\mathbb{R}^n} x(t) e^{-j\omega \cdot t} d^n t \qquad (1)$$

$$x(t) = \mathcal{F}^{-1}\{X(\omega)\} = \frac{1}{(2\pi)^n} \int_{\mathbb{R}^n} X(\omega) e^{j\omega \cdot t} d^n \omega. \qquad (2)$$

Here, $X(\omega)$ is a continuous function of angular frequencies $\omega=[\omega_1, \omega_2, \ldots, \omega_n]^T \in \mathbb{R}^n$ with $\omega=2\pi f$ and frequency $f \in \mathbb{R}$ (in Hertz). In the exponential we made use of the dot product of vectors in $\mathbb{R}^n$ given by $\omega \cdot t = \omega_1 t_1 + \omega_2 t_2 + \ldots + \omega_n t_n$. The integral is an n-fold multiple integral over $\mathbb{R}^n$ and with integration boundaries at $-\infty$ and $\infty$ in each dimension. We use the expression $d^n t$ as shorthand for $dt_1 \, dt_2 \ldots dt_n$. For the one-dimensional case with n=1 the variable subscript is dropped. We may also write the correspondence as $x(t) \circ\!\!-\!\!\bullet X(\omega)$ for short.

The n-dimensional discrete-time Fourier transform (DTFT) of a discrete-time sequence $<x[k]>$ with $k=[k_1, k_2, \ldots, k_n]^T \in \mathbb{Z}^n$ with spacing T between symbols is periodic with 1/T in frequency domain and denoted as $X(e^{j\omega T})=\hat{\mathcal{F}}\{x|k|\}$, and defined as $$X(e^{j\omega T}) = \hat{\mathcal{F}}\{x[k]\} \stackrel{def}{=} \sum_{k \in \mathbb{Z}^n} x[k] e^{-j\omega \cdot kT} \qquad (3)$$

$$x[k] = \hat{\mathcal{F}}^{-1}\{X(e^{j\omega T})\} = \left(\frac{T}{2\pi}\right)^n \int_{\mathbb{T}^n} X(e^{j\omega T}) e^{j\omega \cdot kT} d^n \omega. \qquad (4)$$

The set of frequencies in the Nyquist interval is $$\mathbb{T} \stackrel{def}{=} \{\omega \in \mathbb{R} \mid -\omega_{Nyq} \leq \omega < \omega_{Nyq}\}$$

with the Nyquist (angular) frequency $$\omega_{Nyq} \stackrel{def}{=} 2\pi/(2T).$$

If a whole (finite-length) sequence is treated, this is indicated by the square bracket notation, i.e., $<x[k]>$ The notation $\Sigma_{k \in \mathbb{Z}^n}$ is short for $\Sigma_{k_1=-\infty}^{\infty} \Sigma_{k_2=-\infty}^{\infty} \ldots \Sigma_{k_n=-\infty}^{\infty}$.

Embodiments employ the so-called engineering notation of the Fourier transform with a negative sign in the complex exponential (in the forward, i.e., time-to-frequency, direction) is used. This has immediate consequences for the solution of the electro-magnetic wave equation (cf. Helmholtz equation), and therefore also for the NLSE. In the optical community, there exists no fixed convention with respect to the sign notation, e.g., some of the texts are written with the physicists' (e.g., [15, Eq. (2.2.8)] or [10]) and others with the engineering (e.g., [16], [17, Eq. (A.4)]) notation in mind. Consequently, the derivations shown here may differ marginally from some of the original sources.

Continuous-time signals are associated with meaningful physical units, e.g., the electrical field has typically units of volts per meter (V/m). The NLSE and the Manakov equation derived thereof are carried out in Jones space over a quantity $u(t)=[u_x(t), u_y(t)]^T \in \mathbb{C}^2$ called the optical field envelope. The optical field envelope has the same orientation as the associated electrical field but is renormalized s.t. $u^H u$ equals the instantaneous power given in watts (W). Here, signals are instead generally treated as dimensionless entities as this considerably simplifies the notation when we move between the various signal domains (see, e.g., discussion in [18, P. 11] or [19, P. 230]). To this end, the nonlinearity coefficient γ commonly given in $W^{-1}$ $m^{-1}$ is also renormalized to have units of $m^{-1}$, cf. II-B2.

To distinguish a two-dimensional complex vector $u=[u_x, u_y]^T \in \mathbb{C}^2$ in Jones space from its associated three-dimensional real-valued vector in Stokes space, we use decorated bold letters $\vec{u}=[u_1, u_2, u_3]^T \in \mathbb{R}^3$. The (permuted) set of Pauli matrices is given by [20]

$$\sigma_1 \stackrel{def}{=} \begin{bmatrix} 1 & 0 \\ 0 & -1 \end{bmatrix} \quad \sigma_2 \stackrel{def}{=} \begin{bmatrix} 0 & 1 \\ 1 & 0 \end{bmatrix} \quad \sigma_3 \stackrel{def}{=} \begin{bmatrix} 0 & -j \\ j & 0 \end{bmatrix}, \quad (5)$$

and the Pauli vector is $$\vec{\sigma} \stackrel{def}{=} [\sigma_1, \sigma_2, \sigma_3]^T$$

where each vector component is a 2×2 Pauli matrix. The relation between Jones and Stokes space can then be established by the concise (symbolic) expression $\vec{u}=u^H \vec{\sigma} u$ to denote the elementwise operation $u_i=u^H \sigma_i u$ for all Stokes vector components i=1, 2, 3. The Stokes vector $\vec{u}$ can also be expanded using the dot product with the Pauli vector to obtain the complex-valued 2×2 matrix with $$\vec{u} \cdot \vec{\sigma} = u_1 \sigma_1 + u_2 \sigma_2 + u_3 \sigma_3 = \begin{bmatrix} u_x u_x^* - u_y u_y^* & 2u_x u_y^* \\ 2u_x^* u_y & u_y u_y^* - u_x u_x^* \end{bmatrix} \quad (6)$$

which will later be used to describe the instantaneous polarization rotation around the Stokes vector $\vec{u}$ using the Jones formalism. We may also use the equality [20, Eq. (3.9)]

$$uu^H \frac{1}{2}(u^H u I + \vec{u} \cdot \vec{\sigma}) \quad (7)$$

with the identity matrix I and $\|u\|^2 = u^H u = u_x u_x^* + u_y u_y^*$.

In the following, a system model according to embodiments is considered.

Some embodiments provide a point-to-point coherent optical transmission over two planes of polarization in a single-mode fiber. This results in a complex-valued 2×2 multiple-input/multiple-output (MIMO) transmission which is typically used for multiplexing. One of the major constraints of today's fiber-optical transmission systems is the bandwidth of electronic devices which is orders of magnitude smaller than the available bandwidth of optical fibers. It is hence routine to use wavelength-division multiplexing (WDM), where a number of so-called wavelength channels are transmitted simultaneously through the same fiber. Each wavelength signal is modulated on an individual laser operated at different wavelengths such that the spectral support of neighboring signals is not overlapping.

Figure 2:
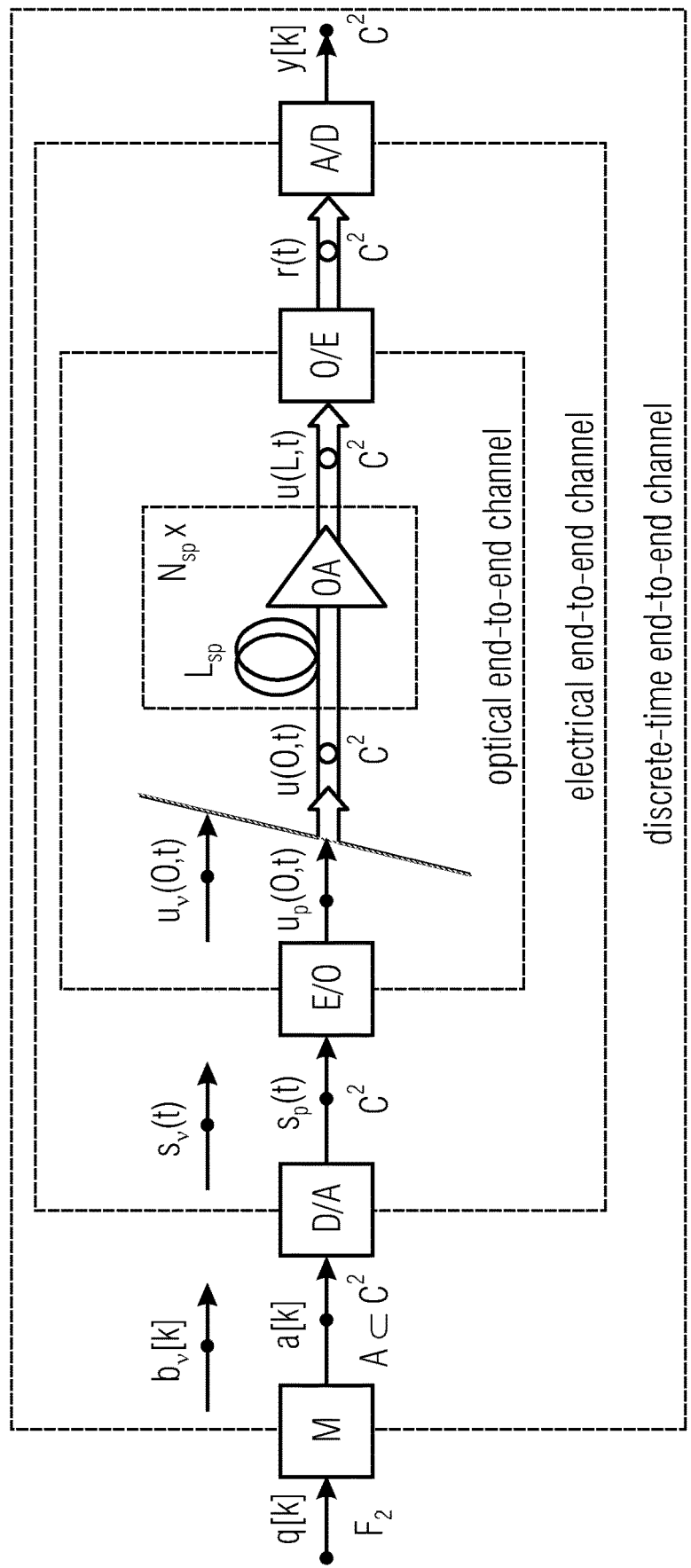
FIG. 2 illustrates a generic fiber-optical transmission system model.

FIG. 2 illustrates a generic fiber-optical transmission system model. In particular, FIG. 2 shows the block diagram of a coherent optical transmission system exemplifying the digital, analog, and optical domains of a single wavelength channel. Within the bandwidth of a wavelength channel, we can consider the optical end-to-end 2×2 MIMO channel as frequency-flat if we neglect the effects of bandlimiting devices (e.g., switching elements in a routed network). The nonlinear property of the fiber-optical transmission medium is the source of interference within and between different wavelength channels. In the following, we will call the channel under consideration the probe channel, while a co-propagating wavelength channel is called interferer. This allows us to discriminate between self-channel interference (SCI) and cross-channel interference (XCI). In FIG. 2 the probe channel in the optical domain is denoted by a subscript ρ, whereas interferers are labeled by the channel index ν with $\nu \in \{1, \ldots, N_{ch}|\nu \neq \rho\}$. The various domains and its entities are discussed in the following.

Figure 3A:
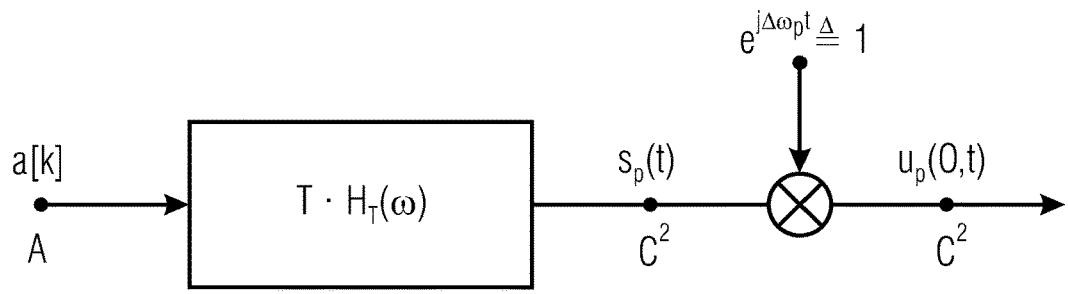
FIG. 3a illustrates a transmitter frontend of a generic fiber-optical transmission system model.

FIG. 3a illustrates a transmitter frontend of a generic fiber-optical transmission system model.

Figure 3B:
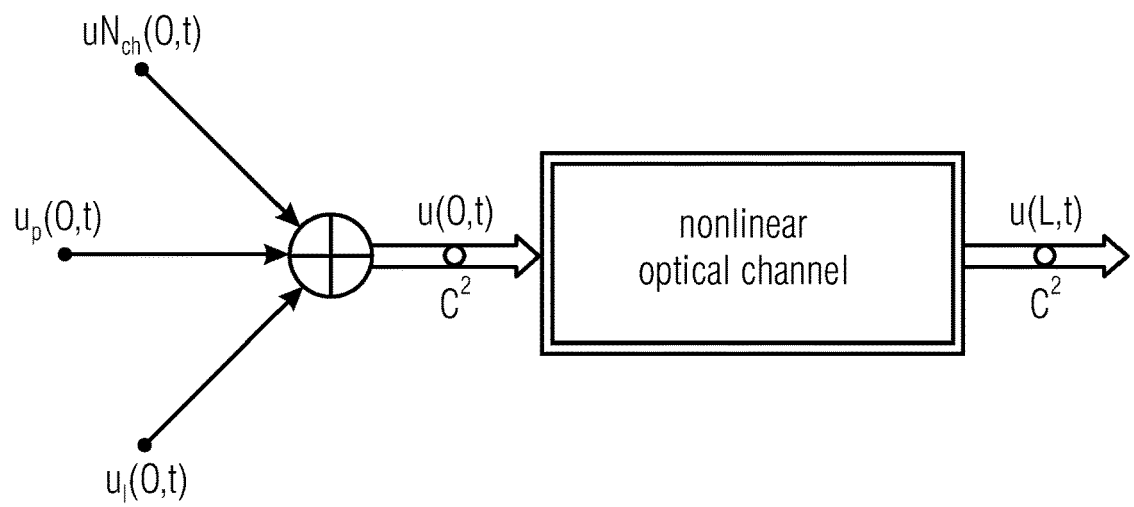
FIG. 3b illustrates an optical channel of the generic fiber-optical transmission system model.

FIG. 3b illustrates an optical channel of the generic fiber-optical transmission system model.

Figure 3C:
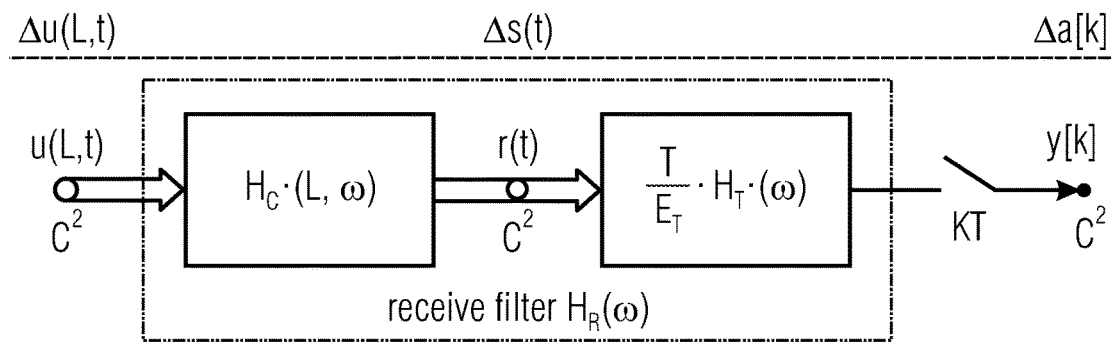
FIG. 3c illustrates an receiver frontend of the generic fiber-optical transmission system model and variables associated with the regular perturbation model.

FIG. 3c illustrates an receiver frontend of the generic fiber-optical transmission system model and variables associated with the regular perturbation model.

In the following the transmitter frontend of FIG. 3a is described. The transmission system is fed with equiprobable source bits of the probe (and interferer) channel. The binary source generates uniform i.i.d. information bits $q[K] \in \mathbb{F}_2$ at each discrete-time index $K \in \mathbb{Z}$. $\mathbb{F}_2$ denotes the Galois field of size two and $\mathbb{Z}$ is the set of integers. The binary sequence $<q[K]>$ is partitioned into binary tuples of length $R_m$, s.t. $q[k]=[q_1[k], \ldots q_{R_m}[k]] \in \{0, 1\}^{R_m}$, where $k \in \mathbb{Z}$ is the discrete-time index of the data symbols. Here, $R_m$ is called the rate of the modulation and will be equivalent to the number of bits per transmitted data symbol, if we assume that the size of the symbol set is a power of two. Each $R_m$-tuple is associated with one of the possible data symbols $a=[a_x,a_y]^T \in \mathcal{A} \subset \mathbb{C}^2$, i.e., with one of the constellation points. We say that the binary $R_m$-tuples are mapped to the data symbols $a \in A$ by a bijective mapping rule $\mathcal{M}:q \to a$.

The size of the data symbol set is $M=|\mathcal{A}|=2^{R_m}$ and we can write the alphabet as $$\mathcal{A} \stackrel{def}{=} \{a_1, \ldots, a_M\} \subset \mathbb{C}^2$$

The symbol set has zero mean if not stated otherwise, that is $E\{a\}=0$ and we deliberately normalize the variance of the symbol set to $$\sigma_a^2 \stackrel{def}{=} E\{\|a\|^2\} = 1$$

(the expectation is denoted by $E\{\bullet\}$ and the Euclidean vector norm is $\|\bullet\|$). For reasons of readability we denote the data symbols of the interfering channels by $b_\nu[k]$.

The discrete-time data symbols a[k] are converted to the continuous-time transmit signal s(t) by means of pulse-shaping constituting the digital-to-analog (D/A) transition, cf. FIG. 3a. We can express the transmit signal $s(t)=[s_1(t), s_2(t)]^T \in \mathbb{C}^2$ as a function of the data symbols with $$s(t) = T \cdot \sum_{k \in \mathbb{Z}} a[k] h_T(t - kT), \quad (8)$$

where s(t) is a superposition of a time-shifted (with symbol period T) basic pulses $h_T(t)$ weighted by the data symbols. The pre-factor T is used to preserve a dimensionless signal in the continuous-time domain (cf. [18, P. 11]). We assume that the transmit pulse has √Nyquist property, i.e., $|H_T(\omega)|^2$ has Nyquist property with the Fourier pair $h_T(t) \circ\!\!-\!\!\bullet\, H_T(\omega)$. To keep the following derivations tractable, all wavelength channels transmit at the same symbol rate $$R_s \stackrel{def}{=} 1/T$$

as the probe channel. the pulse energy $E_T$ of the probe channel is given by [18, Eq. (2.2.22)]

$$E_T = \int_{-\infty}^{\infty} |T \cdot h_T(t)|^2 dt = \frac{1}{2\pi}\int_{-\infty}^{\infty} |T \cdot H_T(\omega)|^2 d\omega. \tag{9}$$

The pulse energy $E_T$ has the unit seconds due to the normalization of the signals. Using the symbol energy $$E_s \stackrel{def}{=} \sigma_a^2 E_T,$$

the average signal power P calculates to [18, Eq. (4.1.1)]

$$P \stackrel{def}{=} \frac{1}{T}\int_0^T E\{\|s(t)\|^2\}dt = \frac{\sigma_a^2}{T}E_T = \frac{E_s}{T} \tag{10}$$

Since, see above, the variance of the data symbols $\sigma_a^2$ is fixed to 1, the transmit power P is directly adjusted via the pulse energy $E_T$. The corresponding quantities related to one of the interferers are indicated by the subscript v.

In the following, an optical channel according to FIG. 3b is described. The electrical-to-optical (E/O) conversion is performed by an ideal dual-polarization (DP) inphase-quadrature (IQ) converter. The two elements of the transmit signal $s_v(t)$ correspond to the modulated optical signals in the x- and y-polarization. The optical field envelope $u_v(z, t)$ of each wavelength channel $$u_v(0,t) = s_v(t)\exp(j\Delta\omega_v t), \tag{11}$$

is modulated at its angular carrier frequency $\omega_v = \omega_0 + \Delta\omega_v$ at the input of the optical transmission line z=0. Here, $\omega_0 = 2\pi f_0$ is the center frequency of the signaling regime of interest. For the probe channel, the carrier frequency $\omega_p$ is to coincide with $\omega_0$ such that $\Delta\omega_p = 0$ and $u_p(0, t) = s_p(t)$. The transmitter frontend of the probe channel is shown in FIG. 3a.

The $N_{ch}$ wavelength signals $u_v(0, t)$ at z=0 are combined by an ideal optical multiplexer to a single WDM signal, cf. FIG. 3b. The optical field envelope before transmission is then $$u(0,t) = \sum_{v=1}^{N_{ch}} u_v(0,t) = \sum_{v=1}^{N_{ch}} s_v(t)\exp(j\Delta\omega_v t) \tag{12}$$

$$U(0,\omega) = \sum_{v=1}^{N_{ch}} U_v(0,\omega) = \sum_{v=A}^{N_{ch}} S_v(\omega - \Delta\omega_v), \tag{13}$$

with the Fourier pairs $s_v(t) \circ\!\!-\!\!\bullet\, S_v(\omega)$ and $u(0, t) \circ\!\!-\!\!\bullet\, U(0, \omega)$. Any initial phase and laser phase noise (PN) are neglected to focus only on deterministic distortions. The optical field envelope is the ECB representation of the optical field $u_o(z, t)$ in the passband notation $$u_o(z,t) \stackrel{def}{=} u(z,t)\cdot\exp(j\omega_0 t - j\beta_0(z)z), \tag{14}$$

which is known as the slowly varying amplitude approximation [15, Eq. (2.4.5)]. For consistency of notation we treat the optical field envelope as a dimensionless entity (in accordance with the electrical signals). The optical field propagates in z-direction (the dimension z has units of meter) with the local propagation constant $\beta_0(z) = \beta(z, \omega_0)$, and $\beta(z, \omega)$ is the space and frequency-dependent propagation constant. A Taylor expansion of $\beta(z, \omega)$ is performed around $\omega_0$ with the derivatives of $\beta(z, \omega)$ represented by the coefficients [15, Eq. (2.4.4)]

$$\beta_n(z) \stackrel{def}{=} \left.\frac{\partial^n \beta(z,\omega)}{\partial \omega^n}\right|_{\omega=\omega_0}, n \in \mathbb{N}. \tag{15}$$

Here, we only consider coefficients up to second order, i.e., n ∈ {0, 1, 2}. We also introduce the path-average[4] dispersion length $$L_D \stackrel{def}{=} \frac{1}{2\pi|\beta_2|R_s^2}, \tag{16}$$

which denotes the distance after which two spectral components spaced B=$R_s$ Hertz apart, experience a differential group delay of T=1/$R_s$ due to chromatic dispersion (CD). We can equivalently define the walk-off length of the probe and one interfering wavelength channel as $$L_{wo,v} \stackrel{def}{=} \frac{1}{|\Delta\omega_v \beta_2|R_s}, \tag{17}$$

which quantifies the fiber length that must be propagated in order for the $v^{th}$ wavelength channel to walk off by one symbol from the probe channel.

[4]We discriminate between local (i.e., α(z), β(z), γ(z)) and path-average (i.e. α, β, ≠) properties of the transmission link. The latter are implicitly indicated if the z-argument of the local property is omitted, e.g., $$\bar{\beta}_2 \triangleq \frac{1}{L}\int_0^L \beta_2(\zeta)d\zeta.$$

Now, signal propagation is considered.

In the absence of noise, the two dominating effects governing the propagation of the optical signal in the fiber are dispersion-expressed by the z-profile of the fiber dispersion coefficient $\beta_2(z)$—and nonlinear signal-signal interactions. Generation of the so-termed local NLI depends jointly on the local fiber nonlinearity coefficient $\gamma(z)$ and the z-profile of the optical signal power. For ease of the derivation, we assume that all z-dependent variation in $\gamma(z)$ can be equivalently expressed in a variation of either a local gain g(z) or the local fiber attenuation $\alpha(z)$. We also neglect the time- (and frequency-) dependency of the attenuation, gain, and nonlinearity coefficient.

The interplay between the optical signal, dispersion, and nonlinear interaction is all combined in the noiseless Manakov equation. It is a coupled set of partial differential equations in time-domain for the optical field envelope u(z, t) in the ECB, and the derivative is taken w.r.t. propagation distance $z \in \mathbb{R}$ and to the retarded time $t \in \mathbb{R}$. The retarded time is defined as $$t \stackrel{def}{=} t' - z/v_g,$$

where t' is the physical time and $v_g$ is the (path-average) group velocity $v_g = 1/\beta_1$ of the probe channel [15, Eq. (2.4.8)]. It can be understood as a time frame that moves at the same average velocity as the probe to cancel out any group delay at the reference frequency $\omega_p = \omega_0$. All other frequencies experience a residual group delay relative to the reference frequency due to CD.

The propagation of u(z, t) in the signaling regime of interest is governed by [17, Eq. (6.26)]

$$\frac{\partial}{\partial z} u = j \frac{\beta_2(z)}{2} \frac{\partial^2}{\partial z^2} u + \frac{g(z) - \alpha(z)}{2} u - j\gamma(z) \frac{8}{9} \|u\|^2 u. \quad (18)$$

The space- and time-dependency of u(z, t) is omitted here for compact notation. By allowing the local gain coefficient g(z) to contain Dirac $\delta$-functions one can capture the z-dependence of an amplification scheme, i.e., based on lumped erbium-doped fiber amplifier (EDFA) or Raman amplification. Polarization-dependent effects such as birefringence and polarization mode dispersion (PMD) are neglected limiting the following derivations to the practically relevant case of low-PMD fibers. We also assume that all wavelength channels are co-polarized, i.e., modulated on polarization axes parallel to the ones of the probe channel.

Now, the dispersion profile is considered.

The accumulated dispersion is a function that satisfies [21, Eq. (8)]

$$\frac{d\mathcal{B}(z)}{dz} = \beta_2(z). \quad (19)$$

Here, B(z) can be used to express a z-dependency in the dispersion profile, i.e., lumped dispersion compensation by inline dispersion compensation or simply a transmission link with distinct fiber properties across multiple spans. We obtain $$\mathcal{B}(z) = \int_0^z \beta_2(\zeta) d\zeta + \mathcal{B}_0, \quad (20)$$

where $$\mathcal{B}_0 \stackrel{def}{=} \mathcal{B}(0)$$

is the amount of pre-dispersion (in units of squared seconds, typically given in $ps^2$) at the beginning of the transmission line.

Now, the power profile is considered.

To describe the power evolution of u(z, t), we introduce the normalized power profile P(z) as a function that satisfies the equation [21, Eq. (7)]

$$\frac{d\mathcal{P}(z)}{dz} = (g(z) - \alpha(z)) \mathcal{P}(z), \quad (21)$$

with boundary condition P(0)=P(L)=1, i.e., the last optical amplifier resets the signal power to the transmit power.

The z-dependence on $\alpha(z)$ allows for varying attenuation coefficients over different spans. In writing (21) we assumed that both the local gain coefficient and attenuation coefficient are frequency-independent. We may also define the logarithmic gain/loss profile as $$\mathcal{G}(z) \stackrel{def}{=} \mathcal{P}\ln((z)) = \int_0^z (g(\zeta) - \alpha(\zeta)) d\zeta. \quad (22)$$

The last expression in (22) is obtained by solving (21) for $\mathcal{P}(z) = e^{\mathcal{G}(z)}$. The boundary conditions on P(z) immediately give the boundary condition $\mathcal{G}(0) = \mathcal{G}(L) = 0$.

We can now define the impulse response and transfer function of the linear channel—that is, when the fiber nonlinearity coefficient is zero, i.e., $\gamma=0$ in (18). To that end, we define the optical field envelope $u_{LIN}(z, t) \circ\!\!-\!\!\bullet U_{LIN}(z, \omega)$ that propagates solely according to linear effects with the boundary condition $u_{LIN}(0, t) = u(0, t)$ at the input of the transmission link. The linear channel transfer function and impulse response is then given by $$H_C(z, \omega) \stackrel{def}{=} \exp\left(\frac{\mathcal{G}(z) - j\omega^2 \mathcal{B}(z)}{2}\right) \quad (23)$$

$$h_C(z, t) = \frac{1}{\sqrt{2\pi}} \frac{1}{\sqrt{j\mathcal{B}(z)}} \exp\left(\frac{\mathcal{G}(z) + jt^2/\mathcal{B}(z)}{2}\right), \quad (24)$$

which represents the joint effect of chromatic dispersion and the gain/loss variation along the link. We finally have the linear channel relation in time-domain $h_C(z, t) * u_{LIN}(0, t)$ and frequency-domain $U_{LIN}(z, \omega) = H_C(z, \omega) U_{LIN}(0, \omega)$, which will be used in the following to derive the first-order perturbation method.

In the following, a receiver frontend according to FIG. 3c is described. Again, we assume ideal optical-to-electrical (O/E) and analog-to-digital (A/D) conversion. The received continuous-time, optical signal u(L, t), is first matched filtered w.r.t. the linear channel response and transmit pulse and then sampled at the symbol period T, cf. FIG. 3 (c). The receiver frontend hence also compensates for any residual link loss and performs perfect CD compensation. Note, that the analog frontend is usually realized using an oversampled digital representation. E.g., CD compensation is typically performed in the (oversampled) digital domain. Here, we favour to conceptually incorporate it in the analog domain since it significantly simplifies notation in the derivation of the end-to-end channel model. The transfer function of the entire cascade of the receiver frontend is given by $$H_R(\omega) = \frac{T}{E_T} H_C^*(L, \omega) H_T^*(\omega). \tag{25}$$

The factor T/ET re-normalizes the received signal to the variance of the constellation $\sigma_a^2$. Since we only consider T-spaced sampling any fractional sampling phase-offset or timing synchronization is already incorporated as suited delay in the receive filter $h_R(t)$, s.t. the transmitted and received sequence of the probe are perfectly aligned in time.

Note, that the time delay $L/v_g$ at $\omega_0$ and any initial phase $\beta_0$ has already been canceled from the propagation equation.

In the following, first-order perturbation is considered.

A concept of fiber-optical channel models based on the perturbation method is to assume that nonlinear distortions are weak compared to its source, i.e., the linearly propagating signal. Starting from this premise the regular perturbation (RP) approach for the optical end-to-end channel is written as $$u(L,t) = u_{LIN}(L,t) + \Delta u(L,t), \tag{26}$$

where $u_{LIN}(z, t) \in \mathbb{C}^2$ is the signal propagating according to the linear effects, i.e., according to (23), (24). In this context, the nonlinear distortion $\Delta u(z, t) \in \mathbb{C}^2$ is termed perturbation, which is generated locally according to nonlinear signal-signal interaction and is then propagated linearly and independently of the signal $u_{LIN}(z, t)$ to the end of the optical channel at z=L. We assume that the optical perturbation at z=0 is zero, i.e., $\Delta u(0, t) = 0$. The received signal is then given as the sum of the solution for the linearly propagating signal and the accumulated perturbation representing the accumulated nonlinear effects. An objective here is to develop the input/output relation of the equivalent discrete-time end-to-end channel in the form of $$y[k] = a[k] + \Delta a[k], \tag{27}$$

where the total NLI is absorbed into a single discrete-time perturbative term $\Delta a[k]$, cf. FIG. 3 (c). To that end, we start with a known RP solution of the optical end-to-end relation and successively incorporate the used components according to FIG. 2 and FIG. 3.

Now, the optical end-to-end channel is considered.

Figure 4A:
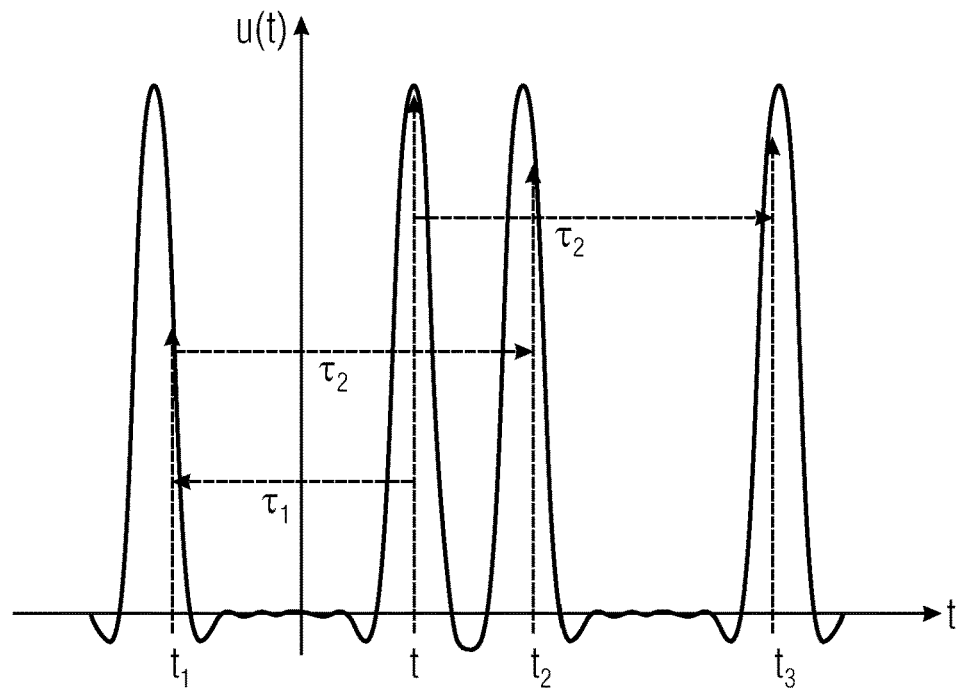
FIG. 4a illustrates definitions of variables in the time-domain.
Figure 4B:
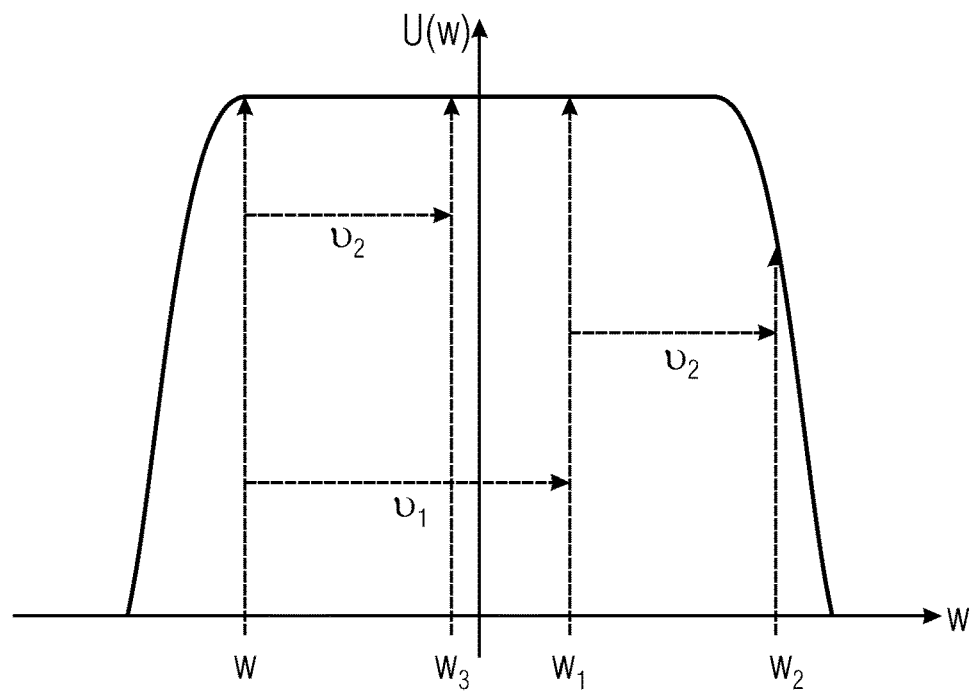
FIG. 4b illustrates definitions of variables in the frequency-domain.

The solution to the optical perturbation after transmission at z=L is given in frequency-domain by [4, Eq. (12)], [22, Eq. (2)], [23, Eq. (4)], [24, Eq. (24)-(27)], $$\Delta U(L, \omega) = -j\gamma \frac{8}{9} \frac{L_{eff}}{(2\pi)^2} H_C(L, \omega) \times \int_{\mathbb{R}^2} \underline{U}(\omega, v_1, v_2) H_{NL}(v_1, v_2) d^2 v, \tag{28}$$

with the normalized nonlinear transfer function $H_{NL}(v_1, v_2)$ and $$\underline{U}(\omega, v_1, v_2) \stackrel{def}{=} U(0, \omega + v_2) U^H(0, \omega + v_1 + v_2) U(0, \omega + v_1),$$

i.e., a term that depends on the optical field envelope at the input of the transmission system. Note, that we made use of the common variable substitution $$\omega_1 \stackrel{def}{=} \omega + v_1 \tag{29}$$

$$\omega_2 \stackrel{def}{=} \omega + v_1 + v_2 \tag{30}$$

$$\omega_3 \stackrel{def}{=} \omega - \omega_1 + \omega_2 = \omega + v_2, \tag{31}$$

to express the field U in terms of difference frequencies $v_1$ and $v_2$ relative to $\omega$. FIG. 4a and FIG. 4b summarizes definitions of the time- and frequency variables that are used throughout this text. The integral over $\mathbb{R}^2$ in (28) can also be performed w.r.t. $\omega_1$ and $\omega_2$.

FIG. 4a illustrates definitions of variables in the time-domain. FIG. 4b illustrates definitions of variables in the frequency-domain. Both $\tau_1$, $\tau_2$ and $v_1$, $v_2$ can take positive and negative values in $\mathbb{R}$.

Equation (28) shows that the first-order RP method can be understood as a FWM process with un-depleted pumps where three wavelengths affect a fourth. Equivalently, one can think of the joint annihilation and creation of two two-photon pairs (i.e., with four frequencies involved) preserving both energy (frequency matching) and momentum (phase matching) during the interaction [25, FIG. 7.2.5]. The conjugate field corresponds to the inverse process where photon creation and annihilation is interchanged.

$$\Delta S(\omega) = -j\gamma \frac{8}{9} L_{eff} \frac{1}{(2\pi)^2} \int_{\mathbb{R}^2} U(0, \underbrace{\omega + v_2}_{\omega_3 = \omega - \omega_1 + \omega_2}) U^H(0, \underbrace{\omega + v_1 + v_2}_{\omega_2}) U(0, \underbrace{\omega + v_1}_{\omega_1}) H_{NL}(v_1, v_2) d^2 v \tag{32}$$

$$\Delta s(t) = -j\gamma \frac{8}{9} L_{eff} \int_{\mathbb{R}^2} u(0, \underbrace{t + \tau_1}_{t_1}) u^H(0, \underbrace{t + \tau_1 + \tau_2}_{t_2}) u(0, \underbrace{t + \tau_2}_{t_3 = t - t_1 + t_2}) h_{NL}(\tau_1, \tau_2) d^2 \tau \tag{33}$$

Figure 5:
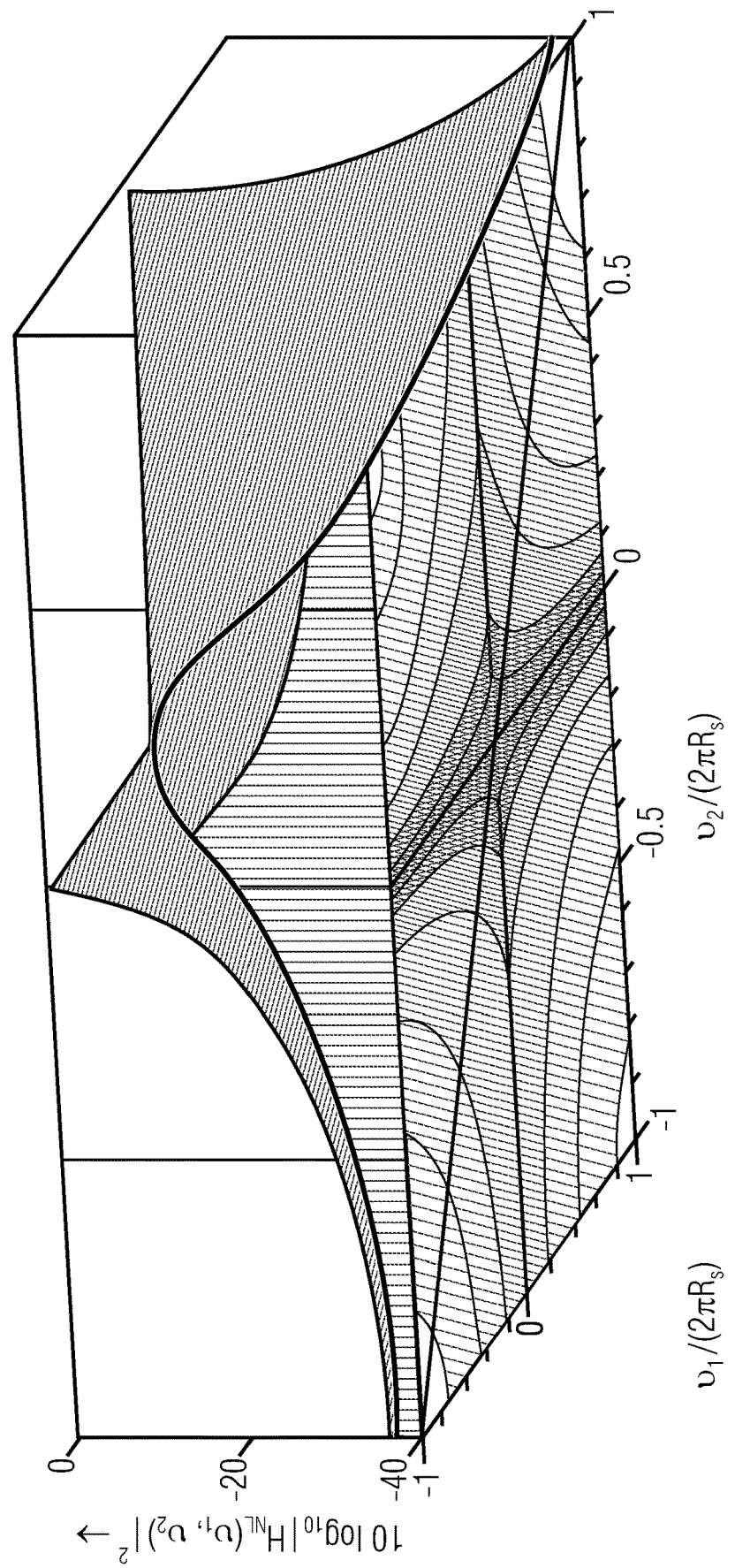
FIG. 5 illustrates a magnitude in logarithmic scale of a single-span nonlinear transfer function according to an embodiment.

FIG. 5 illustrates a magnitude in logarithmic scale of a single-span nonlinear transfer function for $\beta_2=-21$ ps$^2$/km, $\mathcal{B}_0=0$ ps$^2$, $10\log_{10} e^\alpha=0.2$ dB/km and $L_{sp}=100$ km over the difference frequencies $v_1$ and $v_2$ normalized to $R_s=64$ GBd. The red line denotes $H_{NL}(\xi)$ which only depends on the scalar $\xi=v_1 v_2$. (Part for $v_1 > v_2$ not shown).

The normalized nonlinear transfer function is a measure of the phase matching condition and defined as $$H_{NL}(v_1, v_2) \stackrel{def}{=} \frac{1}{L_{eff}} \int_0^L \exp(\mathcal{G}(\zeta) + jv_1 v_2 \mathcal{B}(\zeta)) d\zeta \qquad (34)$$
$$= \frac{1}{L_{eff}} \int_0^L H_C^+(\zeta, \sqrt{v_1 v_2})^2 d\zeta.$$

The pre-factor is the effective length of the whole transmission link defined as $$L_{eff} \stackrel{def}{=} \int_0^L \mathcal{P}(\zeta) d\zeta = \int_0^L \exp(\mathcal{G}(\zeta)) d\zeta, \qquad (35)$$

and acts as a normalization constant s.t. $H_{NL}(0, 0)=1$.

The phase mismatch $\Delta\beta$, i.e., the difference in the (path-average) propagation constant due to dispersion, is defined as [15, Eq. (6.3.19)]

$$\Delta\beta \stackrel{def}{=} \beta(\omega) - \beta(\omega_1) + \beta(\omega_2) - \beta(\omega_3) \qquad (36)$$
$$= \frac{\beta_2}{2}(\omega^2 - \omega_1^2 + \omega_2^2 - (\omega - \omega_1 + \omega_2)^2)$$
$$= \beta_2(\omega_1 - \omega)(\omega_2 - \omega_1) = \beta_2 v_1 v_2,$$

where the propagation constants at the four frequencies are developed in a second-order Taylor series according to (15). E.g., for transmission systems without inline dispersion compensation and zero pre-dispersion $B_0=0$, we have $B(z)=\beta_2 z$ and the phase mismatch $\Delta\beta$ can be found in the argument of the exponential in (34) with $v_1 v_2 \mathcal{B}(z) = \Delta\beta z$.

In the context of the equivalent approach following the regular VSTF [3], [4], [24], the nonlinear transfer function $H_{NL}(v_1, v_2)$ is also referred to as 3rd-order Volterra kernel. Closed form analytical solutions to (34) can be obtained for single-span or homogeneous multi-span systems [24], [26]. It is noteworthy, that $H_{NL}(v_1, v_2)$ contains all information about the transmission link characterized by the dispersion profile (including CD pre-compensation $\mathcal{B}_0$, cf. (20)) and the gain/loss profile.

FIG. 5 shows the magnitude of $H_{NL}(v_1, v_2)$ exemplifying a single-span standard single-mode fiber (SSMF) link. Note, that $H_{NL}(v_1, v_2)$ depends in fact on the product $$\xi \stackrel{def}{=} v_1 v_2$$

and is hence a hyperbolic function in two dimensions [27, Sec. VIII] (cf. the contour in FIG. 5). The bold red line drawn into the diagonal cross section in FIG. 5 is the corresponding nonlinear transfer function $H_{NL}(\xi)$ which only depends on the scalar variable $$\xi \stackrel{def}{=} v_1 v_2.$$

Figure 6:
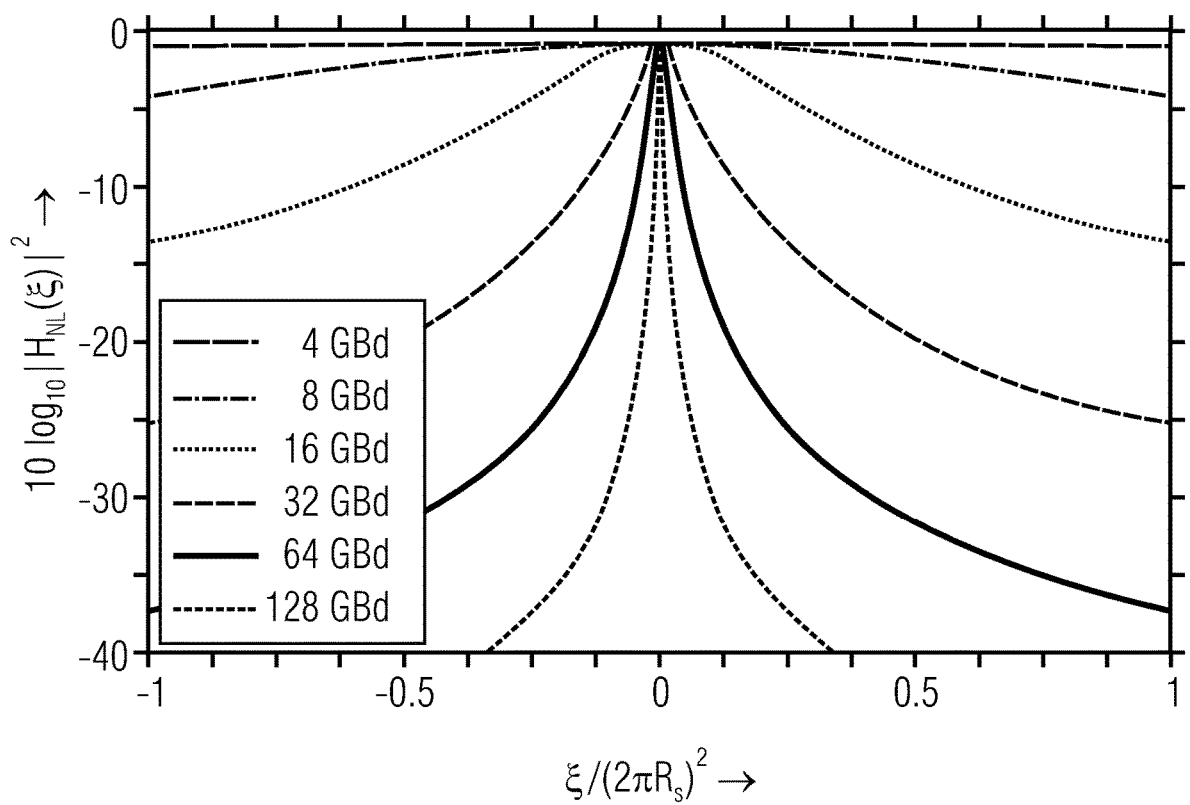
FIG. 6 illustrates a magnitude in logarithmic scale of a single-span nonlinear transfer function according to another embodiment.

FIG. 6 illustrates a magnitude in logarithmic scale of a single-span nonlinear transfer function for $\beta_2=-21$ ps$^2$/km, $\mathcal{B}_0$ ps$^2$, $10\log_{10} e^\alpha=0.2$ and $L_{sp}=100$ km over $\xi=v_1 v_2$. The normalization by $(2\pi R_s)^2$ relates $H_{NL}(\xi)$ to the probe's spectral width. The width of $|H_{NL}(\xi/R_s^2)|^2$ is then proportional to $1/\mathcal{S}_{T,\rho}=L_D/L_{eff} \propto R_s^{-2}$ i.e., doubling $R_s$ reduces the spectral width by a factor of 4.

FIG. 6 shows the $H_{NL}(\xi)$ over the normalized variable $\xi/(2\pi R_s)^2$ to relate the nonlinear transfer function to the spectral width of the probe channel. The spectral width of $|H_{NL}(\xi/(2\pi R_s)^2)|^2$ is proportional to the inverse dimensionless map strength $$1/\mathcal{S}_{T,\rho} \stackrel{def}{=} L_D/L_{eff}$$

closely related to the nonlinear diffusion bandwidth defined in [22]. Conversely, the map strength $\mathcal{S}_{T,\rho}$ quantifies the number of nonlinearly interacting pulses in time over the effective length $L_{eff}$ within the probe channel [28]. It is therefore a direct measure of intra-channel (i.e., SCI) nonlinear effects [29]. The relevant quantity for inter-channel (i.e., XCI) effects is given by $$\mathcal{S}_{T,\nu} \stackrel{def}{=} L_{eff}/L_{wo,\nu}$$

(with $\nu \neq \varphi$ where the temporal walk-off between wavelength channels is the relevant length scale. In [23] it was shown that $h_{NL}(\xi)$ is related to the power-weighted dispersion distribution (PWDD) by a (one-dimensional) Fourier transformation (w.r.t. the scalar variable $\xi$) and has a time-domain counterpart which is discussed in the next paragraph.

$$\Delta A^{SCI}(e^{j\omega T}) = \frac{T}{E_T} \text{ALIAS}\{\Delta S^{SCI}(\omega) \cdot H_T^*(\omega)\} = \qquad (37)$$
$$-j\frac{8}{9}\underbrace{\frac{L_{eff}}{L_{NL,\rho}}}_{\phi_{NL,\rho}} \frac{T^2}{(2\pi)^2} \int_{\pi^2} A(e^{j\omega_1 T}) A^H(e^{j\omega_2 T}) A(e^{j\omega_3 T}) H_\rho(e^{j\omega T}) d^2\omega$$
$$\omega = FOLD\{\omega - \omega_1 + \omega_2\} \in T$$

$$\Delta a^{SCI}[k] = \frac{T}{E_T} \Delta s^{SCI}(t) * h_T^*(-t)|_{t=kT} = \qquad (38)$$
$$-j\frac{8}{9}\frac{L_{eff}}{L_{NL,\rho}} \sum_{\kappa \in \mathbb{Z}^3} a[k+\kappa_1] a^H[k+\kappa_2] a[k+\kappa_3] h_\rho[\kappa]$$

In the following, the electrical end-to-end channel is considered.

To derive the discrete-time end-to-end channel model the filter cascade of the linear receiver frontend is subsequently applied to $\Delta U(L, \omega)$. The perturbation $\Delta S(\omega)$ (i.e., the perturbation in the electrical domain following our terminology, cf. FIG. 3c) is obtained by $$\Delta S(\omega) = H_C^*(L,\omega) \Delta U(L,\omega), \qquad (39)$$

which cancels out the leading term $H_C(L, \omega)$ in (28) since $|H_C(L, \omega)|=1$. The result is shown in (32) at the bottom of this page. Remarkably, there exists an equivalent time-domain representation $\Delta S(t) \circ\!\!-\!\!\bullet \Delta S(\omega)$ shown in (33) where the Fourier relation is derived in Appendix A. The time-domain perturbation $\Delta S(t)$ has the same form as its frequency-domain counterpart, i.e., the integrand is constituted by the respective time-domain representation of the optical signal and the double integral is performed over the time variables $\tau_1$ and $\tau_2$ (cf. FIG. 4 (a) and [23], [30]).

The frequency matching with $$t_3 \stackrel{def}{=} t - t_1 + t_2$$

is translated to a temporal matching8

$$\omega_3 \stackrel{def}{=} \omega - \omega_1 + \omega_2$$

(cf. [31]), i.e., the selection rules of FWM apply both in time and frequency. The temporal matching is not to be confused with the phase matching condition in (34), (36).

Remarkably, the time-domain kernel $h_{NL}(\tau_1, \tau_2)$ is related to $H_{NL}(v_1, v_2)$ by an inverse two-dimensional (2D) Fourier transform (cf. [30, Appx.] and [28, Eq. (6)]) which can be written as $$h_{NL}(\tau_1, \tau_2) = h_{NL}(\tau) = F^{-1}\{H_{NL}(v)\} \quad (40)$$

$$= \frac{1}{L_{eff}} \int_0^L \frac{1}{2\pi|\mathcal{B}(\zeta)|} \exp\left(G(\zeta) - j\frac{\tau_1\tau_2}{\mathcal{B}(\zeta)}\right) d\zeta$$

$$\stackrel{\mathcal{B}(z) \leq 0}{=} \frac{j}{L_{eff}} \int_0^L h_C^*(\zeta, \sqrt{\tau_1\tau_2})^2 d\zeta,$$

with the tuples $\tau=[\tau_1, \tau_2]$ and $v=[v_1, v_2]^T$. The time-domain kernel maintains its hyperbolic form as it is a function of the product $\tau_1\tau_2$. Also note the duality to (34), where in both representations the nonlinear transfer function can be understood as the path-average (cf. [32]) over an expression related to the linear channel response $h_c(z, t) \circ \!\!\!\! - \!\!\!\! \bullet H_c(z, w)$. Note, that in (40) the condition on $B(z) \leq 0$ (which is typically fulfilled in the anomalous dispersion regime with $\beta_2 < 0$) is used to obtain the simple result without cumbersome differentiation of the term $|B(z)|$.

The next step is to resolve the perturbation $\Delta_s(t) \circ \!\!\!\! - \!\!\!\! \bullet$. $\Delta S(w)$ into contributions originating from SCI, XCI or multichannel interference (MCI). We notice from FIG. 6 that, given $R_s$ is sufficiently large, $|H_{NL}(\xi)|^2$ vanishes if $\xi >> (2\pi R_s)^2$ i.e., if the phase matching condition is not properly met. Conversely, if the spectral width of $|H_{NL}(\xi/R_s^2)|^2$ (or equivalently the inverse map strength $1/S_{T,\rho}$) is small enough, the integrand in (32), (33) can be factored into a SCI and XCI term, i.e., mixing terms that originate either from within the probe channel (both $v_1 < 2\pi R_s$ and $v_2 < 2\pi R_s$) or from within the probe channel and a single interfering wavelength channel (either $v_1 < 2\pi R_s$ or $v_2 < 2\pi R_s$). Mixing terms originating from MCI are only relevant for small $R_s$. We hence neglect any FWM terms involving more than two wavelength channels.

The optical field envelope $u(0, t) \circ \!\!\!\! - \!\!\!\! \bullet U(0, w)$ in (32), (33) is now expanded according to (12), (13). By definition we have $\Delta_{\omega\rho}=0$ and we can expand the triple product of $U(0, w)$ in (32) as $$UU^H U = \underbrace{U_\rho U_\rho^H U_\rho}_{SCI} + \underbrace{\sum_{v \neq \rho} \left(U_v U_v^H U_\rho + U_\rho U_v^H U_v\right)}_{XCI} \quad (41)$$

where the frequency-dependency of $U(0, w)$ is omitted for short notation. The XCI term has two contributions—the first results from an interaction where $w_3$ and $w_2$ are from the $v^{th}$ interfering wavelength channel and w and $w_1$ are within the probe's support ($v_2 \rightarrow \Delta\omega_v$ in FIG. 4 (b)). The second involves an interaction where $w_2$ and $w_1$ are from the interfering wavelength channel and w and $w_3$ are from the probe channel ($v_1 \rightarrow \Delta\omega_v$).

We can exploit the symmetry of the nonlinear transfer function $H_{NL}(v_1, v_2)=H_{NL}(v_2, v_1)$ to simplify the XCI expression in (41). Since $U_v^H U_v$ is a scalar, we have $U_\rho U_v^H U_v = U_v^H U_v U_\rho$. The 2×2 identity matrix I is used to factor the XCI expression in a v- and ρ-dependent term. We obtain with the definition of the electrical signal of each wavelength channel (cf. (12), (13)) after rearranging some terms $$U(0, \omega_3)U^H(0, \omega_2)U(0, \omega_1)H_{NL}(\omega_2 - \omega_3, \omega_2 - \omega_1) = \quad (42)$$

$$S_\rho(\omega_1)S_\rho^H(\omega_2)S_\rho(\omega_3)H_{NL}(\omega_2 - \omega_1, \omega_2 - \omega_3) +$$

$$\sum_{v \neq \rho} \left(S_v(\omega_1)S_v^H(\omega_2) + S_v^H(\omega_2)S_v(\omega_1)I\right)$$

$$S_\rho(\omega_3) \times H_{NL}(\underbrace{\omega_2 - \omega_1}_{v_2}, \underbrace{\omega_2 - \omega_3}_{v_1} - \Delta w_v),$$

which now corresponds to the case that $w_3$ always lays in the support of the probe 10. The signals of the interfering wavelength channels are now represented in their respective ECB and the relative frequency offset $\Delta\omega_v$ is accounted for in the modified nonlinear transfer function $H_{NL}$.

At this point, considering (32) and (42), we formulated the relation between the perturbation at the probe $\Delta S(w)$ after chromatic dispersion compensation and the transmit spectra $S_v(w)$ of the probe and the interferers in their respective baseband. The remaining operation in the receiver cascade is to perform matched filtering w.r.t. the transmit pulse and then to perform T-spaced sampling. An alternative formulation with ω1 in the support of the probe is obtained by exchanging the subscripts of ω1 and ω3 in frequency-domain and t1 and t3 in time-domain.

Now, the discrete-time end-to-end channel is considered.

We recap that the periodic spectrum $X(e^{j\omega T})$ of the sampled signal $$x[k] \stackrel{def}{=} x(kT)$$

is related to the aliased spectrum of the continuous-time signal x(t) over the Nyquist interval $\mathbb{T}$ by $$X(e^{j\omega T}) \stackrel{def}{=} \text{ALIAS}\{X(\omega)\} = \frac{1}{T}\sum_{m \in \mathbb{Z}} X\left(\omega - \frac{2\pi m}{T}\right). \quad (43)$$

The matched filter $H_T^*(\omega)$ and the aliasing operator are used to translate (32), (33) to the equivalent discrete-time form in (37), (38) exemplarily for the SCI contribution $\Delta a^{SCI}$. The total perturbation inflicted on the probe channel is $\Delta a[k]=\Delta a^{SCI}[k]+\Delta a^{XCI}[k]$. In (37), (38) we use the 1/T-periodic spectrum $A(e^{j\omega T})$ which is related to the discrete-time sequence <a[k]> by a DTFT $A(e^{j\omega T})=\mathcal{F}\{a[k]\}$. The channel-dependent nonlinear length is $$L_{NL,v} \stackrel{def}{=} 1/(\gamma P_v)$$

and $P_v$ is the optical launch power of the $v^{th}$ wavelength channel. The normalized nonlinear end-to-end transfer function $H_v(\omega)=H_v(\omega_1, \omega_2, \omega_3)$ characterizes the nonlinear crosstalk from the $v^{th}$ wavelength channel to the probe channel. In particular, $H_v(\omega)$ describes SCI and $H_v(\omega)$ with $v \neq \rho$ describes XCI. It is defined as $$H_v(\omega) \stackrel{def}{=} T \cdot H_{T,v}(\omega_1) T \cdot H_{T,v}^*(\omega_2)/P_v \times T \cdot H_{T,\rho}(\omega_3) \qquad (44)$$
$$T \cdot H_{T,\rho}^*(\omega_1 - \omega_2 + \omega_3)/E_T \times H_{NL}(\omega_2 - \omega_1, \omega_2 - \omega_3 - \Delta\omega_v),$$

and its periodic continuation, i.e., the aliased discrete-time equivalent is given by $$H_v(e^{j\omega T}) = \frac{1}{T^3}\sum_{m \in \mathbb{Z}^3} H_v\left(\omega - \frac{2\pi m}{T}\right), \qquad (45)$$

where the three-fold aliasing is done along each frequency dimension with $\omega=[\omega_1, \omega_2, \omega_3]^T$ and $m=[m_1, m_2, m_3]^T$ The normalization in (44) is done s.t. $H_v(e^{j0T})=1$ and dimensionless. Note, that by definition the optical launch power $P_v$ of the $v^{th}$ wavelength channel is related to the pulse energy of $H\,\tau_{,v}(\omega)$ in (9), (10).

The nonlinear end-to-end transfer function in (44) depends on the characteristics of the transmission link, comprised by $H_{NL}(\bullet, \bullet)$, the characteristics of the pulse-shapes of the probe and interfering wavelength channel (assuming matched filtering w.r.t. the channel and the probe's transmit pulse) and the frequency offset $\Delta\omega_1$, between probe and interferer.

It is remarkable that the integration in (37) is over the twofold tuple $[\omega_1, \omega_2]^T \in \mathbb{T}^2$ while the time-domain summation in (38) is over three independent variables $\kappa=[\kappa_1, \kappa_2, \kappa_3]^T \in \mathbb{Z}^3$ This is a consequence of the time-frequency relation between convolution and element-wise multiplication. The temporal matching used for the optical field in (33) is now canceled in (38) due to the convolution with the matched filter $h_T^*(-t)$ i.e., $\Theta_3$ does not depend on $\kappa_1$ and $\kappa_2$ unlike $$t_3 \stackrel{def}{=} t - t_1 + t_2.$$

Note, that the frequency variable $w_3$ in (37) still complies with the frequency matching $\omega_3=\omega-\omega_1+\omega_2$ but may be outside the Nyquist interval $\mathbb{T}$. Due to the 1/T-periodicity of the spectrum $A(e^{j\omega T})$ any frequency component outside $\mathbb{T}$ is effectively folded back into the Nyquist interval by addition of integer multiples of $\omega_{Nyq}$ (denoted by the FOLD{•} operation in (37)).

The XCI complement to (37) reads $$\Delta A^{XCI}(e^{j\omega T}) = -j\sum_{v \neq \rho}\frac{8}{9}\frac{L_{eff}}{L_{NL,v}}\frac{T^2}{(2\pi)^2}\int_{\mathbb{T}^2} \times \qquad (46)$$

-continued
$$(B_v(e^{j\omega_1 T})B_v^H(e^{j\omega_2 T}) + B_v^H(e^{j\omega_2 T})B_v(e^{j\omega_1 T})I) \times A(e^{j\omega_3 T})H_v(e^{j\omega T})d^2\omega.$$

The time-domain description of the T-spaced channel model in (38) is equivalent to the pulse-collision picture (cf. [13, Eq. (3-4)] and [33, Eq. (3-4)]) and the XCI result is repeated here for completeness $$\Delta a^{XCI}[k] = -j\sum_{v \neq \rho}\frac{8}{9}\frac{L_{eff}}{L_{NL,v}} \qquad (47)$$
$$\sum_{\kappa \in \mathbb{Z}^3}(b_v[k+\kappa_1]b_v^H[k+\kappa_2] + b_v^H[k+\kappa_2]b_v[k+\kappa_1]I)a[h+\kappa_3]h_v[\kappa].$$

The time-domain and aliased frequency-domain kernel are related by a three-dimensional (3D) DTFT according to $$h_v[\kappa]=\mathcal{F}^{-1}\{H_v(e^{j\omega T})\}. \qquad (48)$$

The kernel $h_v[\kappa]=h_v[\kappa_1, \kappa_2, \kappa_3]$ is equivalent to the kernel derived via an integration overtime and space in [10, Eq. (61), (62)] and used in [13].

Now, the relation to the GN-model and to system design rules is explained.

Parseval's theorem applied to (48) yields $$E_{h,v} \stackrel{def}{=} \sum_{\kappa \in \mathbb{Z}^3}|h_v[\kappa]|^2 = \left(\frac{T}{2\pi}\right)^3\int_{\mathbb{T}^3}|H_v(e^{j\omega T})|^2 d^3\omega, \qquad (49)$$

where the right-hand side can be interpreted as an alternative formulation of the (frequency-domain) Gaussian noise (GN)-model [27] in 1/T-periodic continuous-frequency domain. In (49) the common pre-factor $$\left(\frac{8}{9}\frac{L_{eff}}{L_{NL,v}}\right)^2$$

is omitted here and the energy in time- and frequency domain is calculated over the whole support of the probe and interfering wavelength channel, whereas [27, Eq. (1)] is evaluated only at a single frequency $\omega$. Beyond that, to include all SCI and XCI contributions one needs to sum over all v—the GN-model in its standard form also includes MCI. This is the dual representation to the original work where the optical signal is constructed as a continuous-time signal with period $T_0$ and discrete frequency components (c.f. the Karhunen-Loève formula in [26], [34]). In other words, the discretization in one domain and the periodicity in the other is exchanged in (49) compared to the GN-model. In this view, the result obtained by the GN-model corresponds to the kernel energy $E_{h,v}$ of the corresponding end-to-end channel.

At the same time, the (system relevant) variance of the perturbation $$\sigma_{\Delta a}^2 \stackrel{def}{=} E\{\|\Delta a\|^2\}$$

depends as well on the properties of the modulation format A which in turn is a problem addressed by the extended Gaussian noise (EGN)-model [34], cf. also the discussion in [5, Sec. F and Appx.]. Note, that the derivation of (49) does not require any assumptions on the signal (albeit its pulse-shape)—in particular no Gaussian assumption.

We can identify three relevant system parameters that characterize the nonlinear response: the map strength $\mathcal{S}_{T,v}=L_{eff}/L_D$, (or equivalently the v-dependent $\mathcal{S}_{T,v}=L_{eff}/L_{wo,v}$) which is a measure of the temporal extent, i.e., the memory of the nonlinear interaction. Secondly, the (v-dependent) nonlinear phase shift $$\phi_{NL,v} \stackrel{def}{=} \frac{8}{9}\frac{L_{eff}}{L_{NL,v}}$$

that depends via $L_{NL,v}$ linearly on the launch power $P_v$ and essentially acts as a scaling factor to the nonlinear distortion $\Delta a[k]$. And at last, the total kernel energy $E_{h,v}$ which characterizes the strength of the nonlinear interaction-independent of the launch power.

Now, applications to fiber nonlinearity compensation according to embodiments is described.

The derived channel models also finds applications for fiber nonlinearity compensation, where implementation complexity is of particular interest. An experimental demonstration of intra-channel fiber nonlinearity compensation based on the time-domain model in (38) has been presented in [35]. In terms of computational efficiency a frequency-domain implementation can be superior to the time-domain implementation, in particular, for cases where the number of nonlinear interacting pulses is large.

This is typically the case for large map strengths $\mathcal{S}_{T,p}$, large relative frequency offsets $\Delta\omega_v$ i.e., large $\mathcal{S}_{T,v}$ and pulse shapes $h_T(t)$ that extend over multiple symbol durations, e.g., a root-raised cosine (RRC) shape with small roll-off factor $\rho$. Then, the number of coefficients of the time-domain kernel $h_v[\kappa]$ exceeding a relevant energy level grows very rapidly leading to a large number of multiplications and summations. The frequency-domain picture comprises only a double integral instead of a triple sum and can be efficiently implemented using standard signal processing techniques.

---

Algorithm 1: REG-PERT-FD for the SCI contribution

1  $a_\lambda[k]$ = overlapSaveSplit($\langle a[k] \rangle$, $N_{DFT}$, K)
2  k, μ, $μ_1$, $μ_2$ ∈ {0, 1, . . . , $N_{DFT}$ − 1}
3  $H_\rho[\mu_1, \mu_2, \mu_3] = H_\rho[\mu] = H_\rho\left(e^{j\frac{2\pi}{N_{DFT}}\mu}\right)$
4  forall λ do
5    $A_\lambda[\mu]$ = DFT{$a_\lambda[k]$}
6    forall μ do

---

Algorithm 1: REG-PERT-FD for the SCI contribution

7  $\mu_3 = \text{mod}_{N_{DFT}}(\mu - \mu_1 + \mu_2)$
8  $\Delta A_\lambda^{SCI}[\mu] = -j\frac{\phi_{NL,\rho}}{N_{DFT}^2} \times \sum_{\mu_1,\mu_2} A_\lambda[\mu_1]A_\lambda^H[\mu_2]A_\lambda[\mu_3]H_\rho[\mu_1, \mu_2, \mu_3]$
9  $Y_\lambda^{PERT}[\mu] = A_\lambda[\mu] + \Delta A_\lambda^{SCI}[\mu]$
10  end
11  $y_\lambda^{PERT}[k] = \text{DFT}^{-1}\{Y_\lambda^{PERT}[\mu]\}$
12  end
13  $\langle y^{PERT}[k] \rangle$ = overlapSaveAppend($y_\lambda^{PERT}[k]$, $N_{DFT}$, K)

---

Exemplarily for the SCI contribution, Algorithm 1 realizes the regular perturbation (REG-PERT) procedure in 1/T-periodic discrete frequency-domain (FD) corresponding to the continuous-frequency relation in (38). Here, the overlap-save algorithm is used to split the sequence $\langle a[5] \rangle$ into overlapping blocks $a_\lambda[k] \circ\!\!-\!\!\bullet A_\lambda[\mu]$ of size $N_{DFT}$ enumerated by the subindex $\lambda \in \mathbb{N}$ [36]. The block size is equal to the size of the discrete Fourier transform (DFT) and the overlap between successive blocks is K. The one-dimensional DFT is performed on each vector component of $a_\lambda[k]$ and the correspondence always relates the whole blocks of length NDFT.

The aliased frequency-domain kernel is discretized to obtain the coefficients $$H_\rho[\mu_1, \mu_2, \mu_3] = H_\rho[\mu] \stackrel{def}{=} H_\rho\left(e^{j\frac{2\pi}{N_{DFT}}\mu}\right) \quad (50)$$

where $N_{DFT}$ is the number of discrete-frequency samples. The discrete-frequency indices $\mu_1$ and $\mu_2$ are elements of the set {0, 1, . . . . . $N_{DFT}$−1} whereas $\mu_3$ must be (modulo) reduced to the same number set due to the 1/T-periodicity of $\omega_3$ in (37). The number of coefficients can be decreased by pruning, similar to techniques already applied to VSTF models [37]. However, note that in contrast to VSTF models the proposed algorithm operates on the 1/T-periodic spectrum of blocks of transmit symbols $a_\lambda[k]$ and the filter coefficients are taken from the aliased frequency-domain kernel. Line 8 of the algorithm effectively realizes equation (37) where the (double) sum is performed over all $\mu_1$ and $\mu_2$. After frequency-domain processing the blocks of perturbed receive symbols $Y_\lambda^{PERT}[\mu] \circ\!\!-\!\!\bullet y_\lambda^{PERT}[k]$ are transformed back to time-domain where the $N_{DFT}$−K desired output symbols of each block are appended to obtain the perturbed sequence $\langle y_{PERT}[k] \rangle$. Algorithm 1 can be generalized to XCI analogously to (46).

According to an embodiment, Algorithm 1 for XCI reads as follows:

---

Algorithm 1: REG-PERT-FD for the XCI contribution of the $v^{th}$ wavelength channel 1  $a_\lambda[k]$ = overlapSaveSplit($\langle a[k] \rangle$, $N_{DFT}$, K)
2  $b_\lambda[k]$ = overlapSaveSplit($\langle b_v[k] \rangle$, $N_{DFT}$, K)
3  k, μ, $μ_1$, $μ_2$ ∈ {0, 1, . . . , $N_{DFT}$ − 1}
4  $H_v[\mu_1, \mu_2, \mu_3] = H_v[\mu] = H_v\left(e^{j\frac{2\pi}{N_{DFT}}\mu}\right)$
5  forall λ do
6    $A_\lambda[\mu]$ = DFT{$a_\lambda[k]$}
7    $B_\lambda[\mu]$ = DFT{$b_\lambda[k]$}

Algorithm 1: REG-PERT-FD for the XCI contribution of the $v^{th}$ wavelength channel 8   forall µ do
9   $\mu_3 = \mathrm{mod}_{N_{DFT}}(\mu - \mu_1 + \mu_2)$
10  $\Delta A_\lambda^{XCI}[\mu] = -j \dfrac{\phi_{NL,v}}{N_{DFT}^2} \times \sum_{\mu_1,\mu_2} (B_\lambda[\mu_1]B_\lambda^H[\mu_2] + B_\lambda^H[\mu_2]B_\lambda[\mu_1]I) \times A_\lambda[\mu_3]H_v[\mu_1,\mu_2,\mu_3]$
11  $Y_\lambda^{PERT}[\mu] = A_\lambda[\mu] + \Delta A_\lambda^{XCI}[\mu]$
12  end
13  $y_\lambda^{PERT}[k] = \mathrm{DFT}^{-1}\{Y_\lambda^{PERT}[\mu]\}$
14  end
15  $\langle y^{PERT}[k]\rangle = \mathrm{overlapSaveAppend}(y_\lambda^{PERT}[k], N_{DFT}, K)$ The time- and frequency-domain picture of the regular perturbation approach are equivalent due to the DTFT in (37), (38) which interrelates both representations. Algorithm 1 represents a practical realization in discrete-frequency which produces the same (numerical) results as the discrete-time model as long as $N_{DFT}$ and K are chosen sufficiently large for a given system scenario. To that end, below, the regular discrete-time and -frequency model and the reference channel model implemented via the SSFM are compared. Then, the regular model is extended to a combined regular-logarithmic model where a subset of the perturbations are considered as multiplicative, i.e., perturbations that cause a rotation in phase or in the state of polarization (SOP).

Now, a regular-logarithmic model in the discrete-time domain is provided.

It was already noted in [38] that the regular VSTF approach (or the equivalent RP method) in (26) reveals an energy-divergence problem if the optical launch power P is too high—or more precisely if the nonlinear phase shift $\phi_{NL}$ is too large.. Using a first-order RP approach, a pure phase rotation is approximated by $\exp(j\phi)\approx 1+j\phi$. While multiplication with $\exp(j\phi)$ is an energy conserving transformation (i.e., the norm is invariant under phase rotation), the RP approximation is obviously not energy conserving. In the context of optical transmission, already a trivial (time-constant) average phase rotation due nonlinear interaction is not well modeled by the RP method.

This inconsistency was first addressed in the early 2000s [4], [39] and years later revived in the context of intra-channel fiber nonlinearity mitigation. E.g. in [40], [41] it turned out that a certain subset of symbol combinations in the time-domain RP model deterministically creates a perturbation oriented into the −j-direction from the transmit symbol a[k]. Similarly, in the pulse-collision picture [11]-[13] a subset of degenerate cross-channel pulse collisions were properly associated to distortions exhibiting a multiplicative nature. In the same series of contributions, these subsets of degenerate, in the sense that not all four interacting pulses are distinct, distortions were first termed two- and three-pulse collisions, i.e., symbol combinations $\kappa \in \mathbb{Z}^3$ in (47) with $\kappa_3 = 0$ in our terminology. While the pulse collision picture covers only cross-channel effects, we will extent the analysis also to intra-channel effects.

In this context, we review some properties of the kernel coefficients relevant for inter-channel ($v \neq \rho$) two- and three-pulse collisions [13]

$$h_v[\kappa_1,\kappa_2,0]\in \mathbb{R}, \text{ if } \kappa_1=\kappa_2 \tag{51}$$

$$h_v[\kappa_1,\kappa_2,0]=h_v^*[\kappa_2,\kappa_1,0]\in \mathbb{C} \text{ if } \kappa_1\neq\kappa_2, \tag{52}$$

where two-pulse collisions with $\kappa_1=\kappa_2$ in (51) are doubly degenerate and the kernel is real-valued. The transmit pulse-shape $h_T(t)$ is assumed to be a real-valued (root) raised-cosine.

In case of three-pulse collisions, the kernel is generally complex-valued but due to its symmetry property in (52) and the double sum over all (nonzero) pairs of $[\kappa_1, \kappa_2]^T$ in (47) the overall effect is still multiplicative.

Additionally, for intra-channel contributions ($v=\rho$) we find the following symmetry properties of the kernel $$h_\rho[\kappa_1,\kappa_2,\kappa_3]=h_\rho[\kappa_3,\kappa_2,\kappa_1] \tag{53}$$

$$h_\rho[\kappa_1,\kappa_2,\kappa_3]=h_\rho[-\kappa_1,-\kappa_2,-\kappa_3], \tag{54}$$

and we identify a second degenerate case with $\kappa_1=0$ as source for multiplicative distortions, cf. the symmetric form of (38) w.r.t. $\kappa_1$ and $\kappa_3$.

In the following, the original RP solution is modified such that perturbations originating from certain degenerate mixing products are associated with a multiplicative perturbation. Similar to [13], [41], [42], we extend the previous RP model to a combined regular-logarithmic model. It takes the general form of $$y[k]=\exp(j\Phi[k]+j\vec{s}[k]\cdot\vec{\sigma})(a[k]+\Delta a[k]). \tag{55}$$

In addition to the regular, additive perturbation $\Delta a[k]$ we now also consider a phase rotation by $\exp(j\Phi[k])$ and a rotation in the state of polarization by $\exp(j\vec{s}[k]\cdot\vec{\sigma})$. Here, $\exp(\cdot)$ denotes the matrix exponential. All perturbative terms combine both SCI and XCI effects, i.e., the additive perturbation $\Delta a[k]\in \mathbb{C}^2$ is the sum of SCI and XCI contributions. The time-dependent phase rotation is given by $\exp(j\Phi[k])$ with the diagonal matrix $\Phi[k]\in \mathbb{R}^{2\times 2}$ defined as $$\Phi[k] \overset{def}{=} \phi^{SCI}[k]I + \phi^{XCI}[k]I, \tag{56}$$

i.e., we find a common phase term for both polarizations originating from intra- and inter-channel effects. The combined effect of intra- and inter-channel cross-polarization modulation (XPolM) is expressed by the Pauli matrix expansion $\vec{s}[k]\cdot\vec{\sigma}\in \mathbb{C}^{2\times 2}$ using (6), with the notation adopted from [20] and [43]. The expansion defines a unitary rotation in Jones space of the perturbed vector $a[k]+\Delta a[k]$ around the time-dependent Stokes vector $\vec{s}[k]$ and is explained in more detail in the following.

1) SCI Contribution: TAT o discuss the SCI contribution we first introduce the following symbol sets $$\mathcal{K}^{SCI} = \{[k_1, k_2, k_3]^T \in \mathbb{Z}^3 | \|h_\rho[k]/h_\rho[0]\|^2 < \Gamma^{SCI}\} \quad (57)$$

$$\mathcal{K}_\phi^\oplus \stackrel{def}{=} \{\mathcal{K}^{SCI} | k_1 = 0 \wedge k_2 \neq 0 \wedge k_3 \neq 0\} \quad (58)$$

$$\mathcal{K}_\phi^\ominus \stackrel{def}{=} \{\mathcal{K}^{SCI} | k_3 = 0 \wedge k_2 \neq 0 \wedge k_1 \neq 0\} \quad (59)$$

$$\mathcal{K}_\phi^{SCI} \stackrel{def}{=} \mathcal{K}_\phi^\oplus \cap \mathcal{K}_\phi^\ominus \cap \{k = 0\} \quad (60)$$

$$\mathcal{K}_\Delta^{SCI} \stackrel{def}{=} \mathcal{K}^{SCI} \setminus \mathcal{K}_\phi^{SCI}, \quad (61)$$

where (57) defines the base set including all possible symbol combinations that exceed a certain energy level $\Gamma^{SCI}$ normalized to the energy of the center tap at $\kappa=0$. In (58), (59) the joint set of degenerate two- and three-pulse collisions for SCI are defined which follow directly from the kernel properties in (51),(52) for $\kappa_3=0$, and (53),(54) for $\kappa_1=0$. The set of indices for multiplicative distortions $\mathcal{K}_\phi^{SCI}$ in (60) also includes the singular case $\kappa=0$. Then, the additive set is simply the complementary set of $\mathcal{K}_\phi^{SCI}$) w.r.t. the base set $\mathcal{K}^{SCI}$.

We start with the additive perturbation defined above in (38) which now reads $$\Delta a^{SCI}[k] = -j\phi_{NL,\rho} \sum_{\mathcal{K}_\Delta^{SCI}} a[k+\kappa_1]a^H[k+\kappa_2]a[k+\kappa_3]h_\rho[\kappa], \quad (62)$$

where the triple sum is now restricted to the set $K_\Delta^{SCI}$ excluding all combinations which result in a multiplicative distortion, cf. (61).

To calculate the common phase $\phi^{SCI}[k]$ and the intra-channel Stokes rotation vector $\vec{s}^{SCI}[k]$ we first analyse the expression $a[k+\kappa_1]a^H[k+\kappa_2]a[k+\kappa_3]$ from the original equation in (38). For the set with $K_\phi^a$ with $\kappa_1=0$ the triple product factors into the respective transmit symbol $a[k]$ and a scalar value $a^H[k+\kappa_2]a[k+\kappa_3]$. After multiplication with $h_\rho[0, \kappa_2, \kappa_3]$ and summation of all $\kappa \in K_\phi^a$ the perturbation is strictly imaginary-valued (cf. symmetry properties in (53),(54)).

On the other hand, for $K_\phi^a$ with $\kappa_3=0$ we have to rearrange the triple product using the matrix expansion from (7) to factor the expression accordingly as 16

$$aa^H a = \frac{1}{2}(a^H a I + (a^H \vec{\sigma} a) \cdot \vec{\sigma})a. \quad (63)$$

(multiplication with $h_\rho[\kappa]$ and summation over $\kappa \in K_\phi^{SCI}$ are implied)

The first term $a^H a I$ also contributes to a common phase term, whereas the second term $(a^H \vec{\sigma} a) \cdot \vec{\sigma} \in \mathbb{C}^{2 \times 2}$ is a traceless and Hermitian matrix $\exp(j(a^H \vec{\sigma} a) \cdot \vec{\sigma})$ is a unitary polarization rotation. Since the Pauli expansion $\vec{u} \cdot \vec{\sigma}$ in (6) is Hermitian, the expression $\exp(j\vec{u} \cdot \vec{\sigma})$ is unitary.

The multiplicative perturbation $\exp(j_\phi^{SCI}[k])$ with $\phi^{SCI}[k] \in \mathbb{R}$ is then given by $$\phi^{SCI}[k] = -\phi_{NL,\rho} \sum_{\mathcal{K}_\phi^\oplus} a^H[k+\mathcal{K}_2]a[k+\mathcal{K}_3]h_\rho[\mathcal{K}] \quad (64)$$

$$-\frac{1}{2}\phi_{NL,\rho} \sum_{\mathcal{K}_\phi^\ominus} a^H[k+\mathcal{K}_2]a[k+\mathcal{K}_1]h_\rho[\mathcal{K}]$$

$$-\phi_{NL,\rho}\|a[k]\|^2 h_\rho[0]$$

$$= -\frac{3}{2}\phi_{NL,\rho} \sum_{\mathcal{K}_\phi^\ominus} a^H[k+\mathcal{K}_2]a[k+\mathcal{K}_1]h_\rho[\mathcal{K}] \quad (65)$$

$$-\phi_{NL,\rho}\|a[k]\|^2 h_\rho[0].$$

Given a wide-sense stationary transmit sequence $\langle a[k] \rangle$, the induced nonlinear phase shift has a time-average value $\overline{\phi}^{SCI}$ around which the instantaneous phase $\phi^{SCI}[k]$ may fluctuate (cf. also [44]).

The instantaneous rotation of the SOP due to the expression $\exp(j\vec{s}^{SCI}[k] \cdot \vec{\sigma}) \in \mathbb{C}^{2 \times 2}$ causes intra-channel XPolM [45]. It is given by $$\vec{s}^{SCI}[k] \cdot \vec{\sigma} = -\frac{1}{2}(\phi_{NL,\rho}) \sum_{\mathcal{K}_\phi^\ominus} (2a[k+\kappa_1]a^H[k+\kappa_2] - \quad (66)$$

$$a^H[k+\kappa_2]a[k+\kappa_1]I)h_\rho[\kappa],$$

where we made use of the relation in (6). The rotation matrix $\exp(j\vec{s}^{SCI}[k] \cdot \vec{\sigma})$ is unitary and $\vec{s}^{SCI}[k] \cdot \vec{\sigma}$ is Hermitian and traceless. The physical meaning of the transformation described in (66) is as follows: The perturbed transmit vector $(a[k]+[k])$ in (55) is transformed into the polarization eigenstate $\vec{s}^{SCI}[k]$ (i.e., into the basis defined by the eigenvectors of $\vec{s}^{SCI}[k] \cdot \vec{\sigma}$. There, both vector components receive equal but opposite phase shifts and the result is transformed back to the x/y-basis of the transmit vector. In Stokes space, the operation can be understood as a precession of $(a[k]+\Delta a[k])$ around the Stokes vector $\vec{s}^{SCI}[k]$ by an angle equal to its length $\|\vec{s}^{SCI}[k]\|$. The intra-channel Stokes vector $\vec{s}^{SCI}[k]$ depends via the nonlinear kernel $h_\rho[\kappa]$ on the transmit symbols within the memory of the nonlinear interaction $\mathcal{S}_{T,\rho}$ around $a[k]$. Similar to the nonlinear phase shift—for a wide-sense stationary input sequence—the Stokes vector $\vec{s}^{SCI}[k]$ has a time-constant average value around which it fluctuates over time.

2) XCI Contribution: The same methodology is now applied to cross-channel effects. The symbol set definitions for XCI follow from the considerations described above.

$$\mathcal{K}_\nu^{XCI} = \{[k_1, k_2, k_3]^T \in \mathbb{Z}^3 | \|h_\nu[k]/h_\nu[0]\|^2 > \Gamma_\nu^{XCI}\} \quad (67)$$

$$\mathcal{K}_{\phi,\nu}^{XCI} \stackrel{def}{=} \{\mathcal{K}_\nu^{XCI} | k_3 = 0 \wedge k_2 \neq 0 \wedge k_1 \neq 0\}$$

$$\cap \{k = 0\} \quad (68)$$

$$\mathcal{K}_{\Delta,\nu}^{XCI} \stackrel{def}{=} \mathcal{K}_\nu^{XCI} \setminus \mathcal{K}_{\phi,\nu}^{XCI}, \quad (69)$$

where the subscript $\nu$ indicates the channel number of the respective interfering channel. For $K_{\phi,\nu}^{XCI}$, only the degenerate case $\kappa_3=0$ has to be considered due to the kernel properties of $h_\nu[\kappa_1, \kappa_2, 0]$ in (51),(52). Similar to (63), the expression $bb^H + b^H bI$ from (47) is rearranged to obtain $$\underbrace{\frac{3}{2}-\begin{bmatrix} b_x b_x^* + b_y b_y^* & 0 \\ 0 & b_y b_y^* + b_x b_x^* \end{bmatrix}}_{b^H b I} + \underbrace{\frac{1}{2}\begin{bmatrix} b_x b_x^* + b_y b_y^* & 2b_x b_y^* \\ 2b_y b_x^* & b_y b_y^* + b_x b_x^* \end{bmatrix}}_{2bb^H - b^H b I = (b^h \vec{\sigma} b)\vec{\sigma}}, \quad (70)$$

where the argument and subscript v is omitted for concise notation. The multiplicative cross-channel contribution is again split into a common phase shift in both polarizations and an equal but opposite phase shift in the basis given by the instantaneous Stokes vector of the $v^{th}$ interferer. We define the total, common phase shift due to cross-channel interference as $$\phi^{XCI}[k] = -\sum_{v \neq \rho} \frac{3}{2} \phi_{NL,v} \sum_{\mathcal{K}_{\phi,v}^{XCI}} b_v^H[k+\kappa_1] b_v[k+\kappa_2] h_v[\kappa] \quad (71)$$

which depends on the instantaneous sum over all interfering channels and the sum of $b_v^H b_v$ by over $[k_1, k_2]^T$. The effective, instantaneous cross-channel Stokes vector $\vec{s}^{XCI}[k]$ is given by $$\vec{s}^{XCI}[k] \cdot \vec{\sigma} = -\sum_{v \neq p} \frac{1}{2} \phi_{NL,v} \sum_{\mathcal{K}_{\phi,v}^{XCI}} \big(2 b_v[k+\kappa_1] b_v^H[k+\kappa_2] - \quad (72)$$

$$b_v^H[k+\kappa_2] b_v[k+\kappa_1] I\big) h_v[\kappa].$$

Note, that the expressions in (71), (72) include both contributions from two- and three pulse collisions (cf. [13, Eq. (10)-(13)]).

3) Energy of Coefficients in Discrete-Time Domain: The energy of the kernel coefficients is defined according to Parseval's theorem in (49) for the subsets given in (57-61). We find for the different symbol sets $$E_h^{SCI} \stackrel{def}{=} \sum_{\mathcal{K}_\phi^{SCI}} |h_\rho[\kappa]|^2 \quad (73)$$

$$E_{h,\Delta}^{SCI} \stackrel{def}{=} \sum_{\mathcal{K}_\Delta^{SCI}} |h_\rho[\kappa]|^2 \quad (74)$$

$$E_{h,\phi}^{SCI} \stackrel{def}{=} \sum_{\mathcal{K}_\phi^{SCI}} |h_\rho[\kappa]|^2, \quad (75)$$

with the clipping factor $\Gamma^{SCI}$ in (57) equal to zero. The energy for cross-channel effects is defined accordingly with the sets from (67-69). Since the subsets for additive and multiplicative effects are always disjoint we have $E_h = E_{h,\Delta} + E_{h,\phi}$.

Now, a regular-logarithmic model in frequency domain is provided.

Similar to the above, we first review some kernel properties of the aliased frequency-domain kernel coefficients $$H_v(e^{j\omega T}) \in \mathbb{R}, \text{ if } \omega_2 = \omega_1 \Leftrightarrow \omega_3 = \omega \Leftrightarrow v_2 = 0, \quad (76)$$

$$H_\rho(e^{j\omega T}) \in \mathbb{R}, \text{ if } \omega_2 = \omega_1 \Leftrightarrow \omega_3 = \omega \Leftrightarrow v_2 = 0 \quad (77)$$

$$\vee \omega_2 = \omega_3 \Leftrightarrow \omega_1 = \omega \Leftrightarrow v_1 = 0,$$

where the two (doubly) degenerate cases $\omega_1 = \omega_2$ and $\omega_3 = \omega_2$ correspond to classical inter- and intra-channel cross-phase modulation (XPM). Accordingly, the frequency domain model is now modified such that these contribution will be associated with multiplicative distortions. However, due to the multiplicative nature, only average values can be incorporated into the frequency-domain model as they are both constant over time and frequency and can be treated as a common pre-factor in both pictures. We will see in the following that this already leads to significantly improved results compared to the regular model. Note that, in contrast to the regular models, the regular-logarithmic model in time and frequency are no longer equivalent.

The general form of the combined regular-logarithmic model in frequency is given by $$Y(e^{j\omega T}) = \exp(j\overline{\Phi} + j\vec{S} \cdot \vec{\sigma}) \times (A(e^{j\omega T}) + \Delta A(e^{j\omega T})), \quad (78)$$

where the phase- and polarization-term take on a frequency-constant value, i.e., independent of $e^{j\omega T}$ and vice-versa independent of k in the time-domain picture). Following the same terminology as before, we introduce the average multiplicative perturbation of the common phase term $$\overline{\Phi} \stackrel{def}{=} \overline{\phi}^{SCI} I + \overline{\phi}^{XCI} I, \quad (79)$$

as the sum of the intra-channel contribution $\overline{\phi}^{SCI} \in \mathbb{R}$ and the inter-channel contribution $\overline{\phi}^{XCI} \in \mathbb{R}$. Similarly, for the average polarization rotation we have $$\vec{S} \cdot \vec{\sigma} \stackrel{def}{=} \vec{S}^{SCI} \cdot \vec{\sigma} + \vec{S}^{XCI} \cdot \vec{\sigma}, \quad (80)$$

where $\vec{S} \cdot \vec{\sigma}$ is again Hermitian and traceless, which in turn makes the matrix exponential $\exp(j\vec{S} \cdot \vec{\sigma})$ unitary.

1) SCI Contribution: The two degenerate frequency conditions in (77) are used in the expression (37) to obtain the average, intra-channel phase distortion. To that end, the triple product $AA^H A$ in (37) is rearranged similar to (63). First, the general frequency-dependent expression $\phi^{SCI}(e^{j\omega T})$ is given by $$\phi^{SCI} = -\phi_{NL,p} \frac{T}{(2\pi)^2} \int_{\mathbb{T}} \|A(e^{j\omega_2 T})\|^2 H_\rho(e^{j[\omega,\omega_2,\omega_2]^T T}) d\omega_2 - \quad (81a)$$

$$\frac{1}{2}\phi_{NL,p} \frac{T}{(2\pi)^2} \int_{\mathbb{T}} \|A(d^{j\omega_1 T})\|^2 H_\rho(e^{j[\omega_1,\omega_1,\omega]^T T}) d\omega_1,$$

where the first term on the right-hand side in (81) corresponds to the degeneracy $\omega_2 = \omega_3 \Leftrightarrow \omega_1 = \omega$ and the second term corresponds to $\omega_2 = \omega_1 \Leftrightarrow \omega_3 = \omega$. We simplify the expression using the RRC $\rho = 0$ approximation to obtain the average, intra-channel phase distortion $$\overline{\phi}^{SCI} = \frac{3}{2} \phi_{NL,p} \frac{T}{(2\pi)^2} \int_{\mathbb{T}} \|A(e^{j\omega T})\|^2 d\omega, \quad (81b)$$

which does no longer depend on the power or dispersion profile of the transmission link (given a fixed $L_{eff}$).

Similarly, the average intra-channel XPolM contribution can be simplified to $$\vec{S}^{SCI} \cdot \vec{\sigma} = \frac{1}{2}\phi_{NL,\rho}\frac{T}{(2\pi)^2}\int_{\mathbb{T}}\left(2A(e^{j\omega T})A^H(e^{j\omega T}) - A^H(e^{j\omega T})A(e^{j\omega T})I\right)d\omega. \quad (88)$$

In Algorithm 2 the used modifications to the regular perturbation model (REG-PERT) are highlighted to arrive at the regular-logarithmic perturbation model (REGLOG-PERT)-again exemplarily for the SCI contribution. Lines 6,7 of Algorithm 2 translate Eq. (81a), (81b), (82) to the discrete-frequency domain where the integral over all $\omega \in \mathbb{T}$ becomes a sum over all $\mu$ of the $\lambda^{th}$ processing block. The average values, here, are always associated to the average values of the $\lambda^{th}$ block. In Lines 10,11, the double sum to obtain $\Delta A_\lambda^{SCI}[\mu]$ is restricted to all combinations u of the discrete frequency pair $[\mu_1, \mu_2]^T$ excluding the degenerate cases corresponding to Eq. (76), (77). The perturbed receive vector $Y_\lambda^{PERT}$ is then calculated according to (78) before it is transformed back to the discrete-time domain.

2) XCI Contribution: The cross-channel contributions follow from the considerations above and we obtain for the degenerate case in (76) the total, average XCI phase shift $$\bar{\phi}^{XCI} = -\sum_{\nu \neq \rho}\frac{3}{2}\phi_{NL,\nu}\frac{T}{(2\pi)^2}\int_{\mathbb{T}}\|B_\nu(d^{j\omega T})\|^2 d\omega \quad (83)$$

and analogously for the total, average XCI Stokes vector we find $$\vec{S}^{XCI} \cdot \vec{\sigma} = -\sum_{\nu \neq \rho}\frac{1}{2}\phi_{NL,\nu}\frac{T}{(2\pi)^2}\int_{\mathbb{T}}\left(2B_\nu(e^{j\omega T})B_\nu^H(e^{j\omega T}) - B_\nu^H(e^{j\omega T})B_\nu(e^{j\omega T})I\right)d\omega. \quad (84)$$

3) Energy of Coefficients in Discrete-Frequency Domain: With the notation of the discrete-frequency kernel $$H_\nu[\mu_1, \mu_2, \mu_3] = H_\nu[\mu] = H_\nu\left(e^{j\frac{2\pi}{N_{DFT}}\mu}\right)$$

we have the following definitions $$E_H^{SCI} \stackrel{def}{=} \frac{1}{N_{DFT}^3}\sum_{u^{SCI}}|H_\rho[\mu]|^2 \quad (85)$$

$$E_{H,\Delta}^{SCI} \stackrel{def}{=} \frac{1}{N_{DFT}^3}\sum_{u_\Delta^{SCI}}|H_\rho[\mu]|^2 \quad (86)$$

$$E_{H,\phi}^{SCI} \stackrel{def}{=} \frac{1}{N_{DFT}^3}\sum_{u_\phi^{SCI}}|H_\rho[\mu]|^2, \quad (87)$$

Following the regular-logarithmic approach, some of the degenerate distortion should be associated to multiplicative distortions. In the context of fiber nonlinearity compensation, these terms correspond to a nonlinear-induced phase distortion or a nonlinear-induced distortion of the state of polarization. These distortions can be compensated for by applying the inverse operation on the transmit or receive-side, e.g., mathematically speaking by changing the sign in the exponential in (55). The (frequency-domain) intra-channel phase distortion term can be calculated according to (81a) and (81b) while the polarization distortion term is calculated according to (82). The inter-channel terms are given in (83) and (84).

In the following, Algorithm 2 (REGLOG-PERT-FD) for the SCI contribution is provided:

---

Algorithm 2: REGLOG-PERT-FD for the SCI contribution

1  $a_\lambda[k]$ = overlapSaveSplit($\langle a[k]\rangle$, $N_{DFT}$, K)

2  k, $\mu$, $\mu_1$, $\mu_2 \in \{0, 1, \ldots, N_{DFT} - 1\}$

3  $$H_\rho[\mu_1, \mu_2, \mu_3] = H_\rho[\mu] = H_\rho\left(e^{j\frac{2\pi}{N_{DFT}}\mu}\right)$$

4  forall $\lambda$ do

5  $\quad A_\lambda[\mu]$ = DFT$\{a_\lambda[k]\}$

6  $\quad \bar{\phi}_\lambda^{SCI} = -\frac{3}{2}\frac{\phi_{NL,\rho}}{N_{DFT}^2}\sum_\mu \|A_\lambda[\mu]\|^2$ 7  $\quad \vec{S}_\lambda^{SCI}\cdot\vec{\sigma} = -\frac{1}{2}\frac{\phi_{NL,\rho}}{N_{DFT}^2}\sum_\mu 2A_\lambda[\mu]A_\lambda^H[\mu] - \|A_\lambda[\mu]\|^2 I$ 8  $\quad$ forall $\mu$ do 9  $\quad\quad \mu_3 = \text{mod}_{N_{DFT}}(\mu - \mu_1 + \mu_2)$ 10 $\quad\quad U = \{[\mu_1, \mu_2]^T \mid \mu_2 \neq \mu_1 \wedge \mu_2 \neq \mu_3\}$ 11 $\quad\quad \Delta A_\lambda^{SCI}[\mu] = -j\frac{\phi_{NL,\rho}}{N_{DFT}^2}\times\sum_u A_\lambda[\mu_1]A_\lambda^H[\mu_2]A_\lambda[\mu_3]H_\rho[\mu_1, \mu_2, \mu_3]$ 12 $\quad\quad Y_\lambda^{PERT}[\mu] = \exp(j\bar{\phi}_\lambda^{SCI}I + j\vec{S}_\lambda^{SCI}\cdot\vec{\sigma})\times (A_\lambda[\mu] + \Delta A_\lambda^{SCI}[\mu])$ 13 $\quad$ end 14 $\quad y_\lambda^{PERT}[k]$ = DFT$^{-1}\{Y_\lambda^{PERT}[\mu]\}$ 15 end 16 $\langle y^{PERT}[k]\rangle$ = overlapSaveAppend($y_\lambda^{PERT}[k]$, $N_{DFT}$, K)

--- with the sets according to (77)

$$u_{SCI} = \{\mu = [\mu_1, \mu_2, \mu_3]^T \in \{0, 1, \ldots, N_{DFT}-1\}^3\} \quad (88)$$

$$u_\Delta^{SCI} = \{u^{SCI} | \mu_2 \neq \mu_1 \wedge \mu_2 \neq \mu_3\} \quad (89)$$

$$u_\phi^{SCI} = \{u^{SCI} | \mu_2 = \mu_1 \vee \mu_2 = \mu_3\}. \quad (90)$$

Note, that we have again $E_H^{SCI} = E_{H,\Delta}^{SCI} + E_{H,\phi}^{SCI}$ and due to Parseval's theorem $E_h^{SCI} = E_H^{SCI}$ for $N_{DPT} \to \infty$. The cardinalities of the sets are $|u_{SCI}| = N_{DFT}^3$, $|u_\phi^{SCI}| = 2N_{DFT}^2$ and $|u_\Delta^{SCI}| = |u_{SCI}| - |u_\phi^{SCI}|$. The cross-channel sets are defined according to (76) with only a single degeneracy.

In an embodiment, algorithm 2 for XCI reads as follows:

---
Algorithm 2: REGLOG-PERT-FD for the XCI contribution
of the $v^{th}$ wavelength channel
---

1  $a_\lambda[k]$ = overlapSaveSplit($\langle a[k] \rangle$, $N_{DFT}$, K)
2  $b_\lambda[k]$ = overlapSaveSplit($\langle b_v[k] \rangle$, $N_{DFT}$, K)
3  $k, \mu, \mu_1, \mu_2 \in \{0, 1, \ldots, N_{DFT} - 1\}$ 4  $$H_v[\mu_1, \mu_2, \mu_3] = H_v[\mu] = H_v\left(e^{j\frac{2\pi}{N_{DFT}}\mu}\right)$$

5  forall $\lambda$ do
6     $A_\lambda[\mu]$ = DFT$\{a_\lambda[k]\}$
7     $B_\lambda[\mu]$ = DFT$\{b_\lambda[k]\}$ 8  $$\overline{\phi}_\lambda^{XCI} = -\frac{3}{2} \frac{\phi_{NL,v}}{N_{DFT}^2} \sum_\mu \|B_\lambda[\mu]\|^2$$

9  $$\vec{S}_\lambda^{XCI} \cdot \vec{\sigma} = -\frac{1}{2} \frac{\phi_{NL,v}}{N_{DFT}^2} \sum_\mu 2 B_\lambda[\mu] B_\lambda^H[\mu] - \|B_\lambda[\mu]\|^2 I$$

10    forall $\mu$ do
11      $\mu_3 = \mathrm{mod}_{N_{DFT}}(\mu - \mu_1 + \mu_2)$
12      $U = \{[\mu_1, \mu_2]^T \mid \mu_2 \neq \mu_1\}$ 13 $$\Delta A_\lambda^{XCI}[\mu] = -j \frac{\phi_{NL,v}}{N_{DFT}^2} \times \sum_u (B_\lambda[\mu_1] B_\lambda^H[\mu_2] + B_\lambda^H[\mu_2] B_\lambda[\mu_1] I) \times A_\lambda[\mu_3] H_v[\mu_1, \mu_2, \mu_3]$$

14      $Y_\lambda^{PERT}[\mu] = \exp(j\overline{\phi}_\lambda^{XCI} I + j\vec{S}_\lambda^{XCI} \cdot \vec{\sigma}) \times (A_\lambda[\mu] + \Delta A_\lambda^{XCI}[\mu])$
15    end
16    $y_\lambda^{PERT}[k]$ = DFT$^{-1}\{Y_\lambda^{PERT}[\mu]\}$
17 end
18 $\langle y^{PERT}[k] \rangle$ = overlapSaveAppend($y_\lambda^{PERT}[k]$, $N_{DFT}$, K)

---

In the following, numerical results are provided.

The following complements the general considerations of the above by numerical simulations. To this end, we compare the simulated received symbol sequence $\langle y[k] \rangle$ obtained by the perturbation-based (PERT) end-to-end channel models to the sequence obtained by numerical evaluation via the SSFM (in the following indicated by the superscript SSFM).

The evaluated metric is the normalized MSE between the two output sequences for a given input sequence $\langle a[k] \rangle$, i.e., we have $$\sigma_e^2 \stackrel{\text{def}}{=} E\{\|y^{SSFM} - y^{PERT}\|^2\}, \quad (91)$$

where the expectation takes the form of a statistical average over the time of the received sequence. The MSE is already normalized due to the fixed variance $\sigma_n^2 = 1$ of the symbol alphabet and the receiver-side re-normalization in (25), s.t. the received sequence has (approximately 19) the same fixed variance as the transmit sequence.

19In the numerical simulation via SSFM signal depletion takes place due to an energy transfer from signal to NLI. For simplicity, this additional signal energy loss is not accounted for by additional receiver-side re-normalization.

The simulation parameters are summarized in Table I. A total number of $N_{SYM} = 2^{16}$ transmit symbols $\langle a[k] \rangle$ are randomly drawn from a polarization-division multiplex (PDM) 64-ary quadrature amplitude modulation (QAM) symbol alphabet $\mathcal{A}$ with (4D) cardinality $M = |\mathcal{A}| = 4096$, i.e., 64-QAM per polarization. The transmit pulse shape $h_T(t)$ is a RRC with roll-off factor $\rho$ and energy $E_T$ to vary the optical launch power P. Above, signals have been treated as dimensionless entities, but by convention we will still associate the optical launch power P with units of [W] and the nonlinearity coefficient $\gamma$ with $[1/(W_m)]$.

Two different optical amplification schemes are considered: ideal distributed Raman amplification (i.e., lossless transmission) and transparent end-of-span lumped amplification (i.e., lumped amplification where the effect of signal-gain depletion [5, Sec. II B.] is neglected in the derivation of the perturbation model). For lumped amplification we consider homogeneous spans of SSMF with fiber attenuation 10 $\log_{10} e^\alpha = 0.2$ dB/km and a span length of $L_{sp} = 100$ km. In case of lossless transmission we have 10 $\log_{10} e^\alpha = 0$ dB/km and span length $L_{sp} = 21.71$ km corresponding to the asymptotic effective length $$L_{eff,a} \stackrel{\text{def}}{=} 1/\alpha$$

of a fictitious fiber with infinite length and attenuation 10 $\log_{10} e^\alpha = 0.2$ dB/km. The dispersion profile $\mathcal{B}(z) = \beta_2 z$ conforms with modern dispersion uncompensated (DU) links, i.e., without optical inline dispersion compensation and bulk compensation at the receiver-side (typically performed in the digital domain). Dispersion pre-compensation at the transmit-side can be easily incorporated via $\mathcal{B}_0$. The dispersion coefficient $\beta_2 = -21$ ps$^2$/km and the nonlinearity coefficient is $\gamma = 1.1$ W$^{-1}$ km$^{-1}$, both constant over z and $\omega$. Additive noise due to amplified spontaneous emission (ASE) and laser PN are neglected since we only focus on deterministic signal-signal NLI.

The numerical reference simulation is a full-vectorial field simulation implemented via the symmetric split-step Fourier method [46] with adaptive step size and a maximum non-linear phase-rotation per step of $\phi_{NL}^{max}=3.5\times10^{-4}$ rad. The simulation bandwidth is $B_{SIM}=8R_s$ for single-channel and $16R_s$ for dual-channel transmission. All filter operations (i.e., pulse-shaping, linear step in the SSFM, linear channel matched filter) are performed at the full simulation bandwidth via fast convolution and regarding periodic boundary conditions.

The known fiber nonlinearity compensation schemes operating in the frequency-domain are typically some sort of Volterra-based compensators (cf. [37,38,39]). All results following the Volterra approach operate at a fractional sampling rate (usually at two samples-per-symbol) and are typically performed on the receive side (before linear equalization) jointly with (or instead of) chromatic dispersion compensation. Those approaches hence do not incorporate the channel matched filter and do not establish and end-to-end relation between transmit and receive symbol sequences. Those approaches also suffer from a higher implementation complexity due to the higher sampling, i.e., processing rate and must run on the receive samples at a potentially high fixed point resolution. Run-time adaptation of the equalizer coefficients is also hard to implement since the used control loop for the adaption of the coefficients has a long feedback cycle.

Derived from the frequency-domain description, a novel class of algorithms is provided which effectively compute the end-to-end relation between transmit and receive sequences over discrete frequencies from the (periodic) Nyquist interval. Remarkably, the frequency-matching in (31) which is imposed along with the general four wave mixing (FWM) process in the optical domain is still maintained in the periodic frequency-domain.

For application in fiber nonlinearity compensation this scheme can be well applied at the transmit-side during pulse-shaping (usually on the transmit-side, pulse-shaping can be well combined with linear pre-compensation of transmitter components—typically done in the frequency-domain anyway) or on the receive side after matched filtering. Moreover, while the time-domain implementation (cf. pulse collision picture) uses a triple summation per time-instance, the frequency-domain implementation involves only a double summation per frequency index. Similar as for linear systems, this characteristic allows for very efficient implementations using the fast Fourier transform when the time-domain kernel comprises many coefficients. Since the proposed algorithm only uses frequencies from within the Nyquist interval, it can be implemented at the same rate as the symbol rate. In [35] it was shown, that symbol pre-decisions (cf. decision-directed adaptation) can be used to calculate the perturbative terms using the time-domain implementation of the model. Symbol pre-decisions are also desirable since they use only a low fixed-point resolution. Similarly, symbol pre-decisions can be used for the frequency-domain implementation (cf. symbol pre-decisions instead of the known symbols in Algorithm 1 and 2).

In the following, a discussion of the results is provided.

Figure 7A:
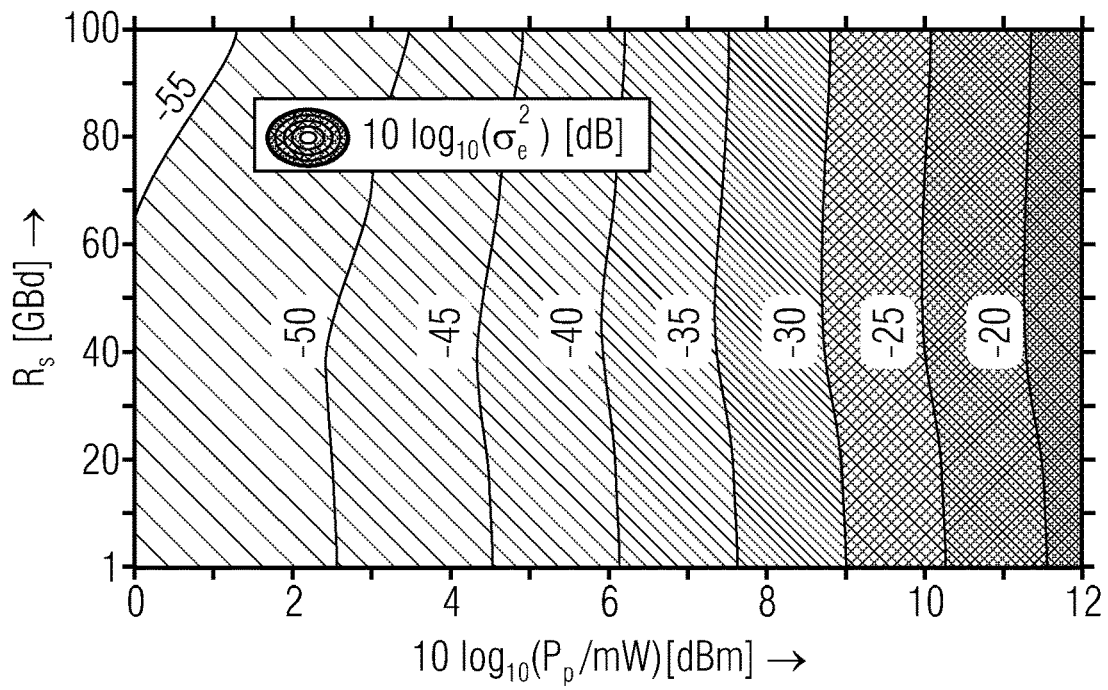
FIG. 7a illustrates a contour plot for a single-channel, single-span, lossless fiber scenario in the regular time-domain model according to an embodiment.
Figure 7B:
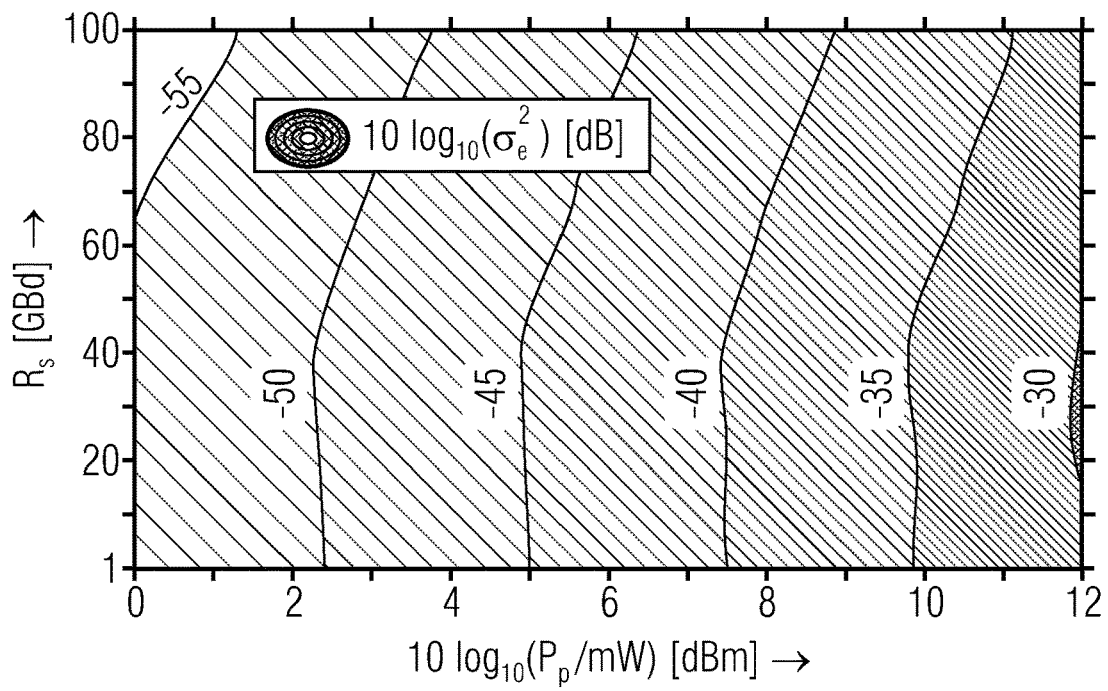
FIG. 7b illustrates a contour plot for a single-channel, single-span, lossless fiber scenario in the regular-logarithmic model according to another embodiment.

FIG. 7a and FIG. 7b illustrate contour plots of the normalized mean-square error $\sigma_e^2=R\{\|y^{SSPM}-y^{PERT}\|^2\}$ in dB between the perturbation-based (PERT) end-to-end model and the split-step Fourier method (SSFM).

In particular, FIG. 7a illustrates a contour plot for a single-channel, single-span, lossless fiber scenario in the regular (REG) time-domain (TD) model (REG-PERT-TD) which is carried out as in (38).

FIG. 7b illustrates a contour plot for a single-channel, single-span, lossless fiber scenario in the regular-logarithmic (REGLOG) model (REGLOG-PERT-TD) which is carried out as in (55).

The results are shown w.r.t. the symbol rate $R_s$ and the optical launch power of the probe $P_\rho$ in dBm. Parameters as in Table I with roll-off factor $\rho=0.2$, $N_{sp}=1$, $10\log_{10}e^\alpha=0$ dB/km and $L_{sp}=21.71$ km.

In FIG. 7a, we start our evaluation with the most simple scenario, i.e., single-channel, single-span, and lossless fiber. The MSE is shown in logarithmic scale $10\log_{10}\sigma_e^2$ in dB over the symbol rate $R_s$ and the launch power of the probe $10\log_{10}(P_\rho/mW)$ in dBm. The results are obtained from the regular (REG) perturbation-based (PERT) end-to-end channel model in discrete time-domain (TD), corresponding to (38).

For the given effective length $L_{eff}$ and dispersion parameter $\beta_2$, the range of the symbol rate between 1 GBd and 100 GBd corresponds to a map strength $S_{T,\rho}$ between 0.003 and 28.7. This amounts to virtually no memory of the intra-channel nonlinear interaction for small symbol rates (hence only very few coefficients $h_\rho[\kappa]$ exceeding the minimum energy level of $10\log_{10}\Gamma^{SCI}=-60$ dB) to a very broad intra-channel nonlinear memory for high symbol rates (with coefficients $h_\rho[\kappa]$ covering a large number of symbols). Likewise, the launch power of the probe $P_\rho$ spans a nonlinear phase shift $\phi_{NL,\rho}$ from 0.02 to 0.34 rad. We can observe a gradual increase in $\sigma_e^2$ of about 5 dB per 1.5 dBm launch power in the nonlinear transmission regime. We deliberately consider a MSE $10\log_{10}\sigma_e^2>-30$ dB as a poor match between the perturbation-based model and the full-field simulation, i.e., here for $P_\rho$ larger than $$9 dBm \left(\stackrel{\Delta}{=} 0.168 \text{ rad} \approx 10°\right)$$

independent of $R_s$

TABLE I

| SIMULATION PARAMETERS | | |
|---|---|---|
| $a, b \in A$ | PDM 64-QAM | |
| M | 4096 ($\stackrel{\Delta}{=}$ 64-QAM per polarization) | |
| $h_T(t)$ | $h_{RRC}(t)$ with roll-off factor $\rho$ | |
| $\gamma$ | 1.1 W$^{-1}$km$^{-1}$ | |
| $\beta_2$ | −21 ps$^2$/km | |
| $B_0$ | 0 ps$^2$ | |
| $B(z)$ | $\beta_2 z$ | |
| $10\log_{10}e^\alpha$ | 0 dB/km | 0.2 dB/km |
| $L_{sp}$ | 21.71 km | 100 km |
| $g(z)$ | 0 | $-\alpha z + \alpha L_{sp} \Sigma_{i=1}^{N_{sp}} \delta(z-iL_{sp})$ |
| $N_{SYM}$ | $2^{16}$ | |
| $N_{DFT}$ | max(2$^{\lceil\log_2 S_{T,\nu}\rceil+1}$, 64) | |
| $10\log_{10}\Gamma$ | −60 dB | |

In FIG. 7b the same system scenario is considered but instead of the regular model, now, the regular-logarithmic (REGLOG) model is employed according to (55). The gradual increase in $\sigma_e^2$ with increasing $P_\rho$ is now considerably relaxed to about 5 dB per 2.5 dBm launch power. The region of poor model match with $10\log_{10}\sigma_e^2>-30$ dB is now only approached for launch powers larger than 12 dBm. We can also observe that $\sigma_e^2$ improves with increasing symbol rate $R_s$, in particular for rates $R_s>40$ GBd. This is explained by the fact that the kernel energy $E_h^{SCI}$ in (73) depends on the symbol rate $R_s$, s.t. $\sigma_e^2$ is reduced for higher symbol rates.

Figure 8A:
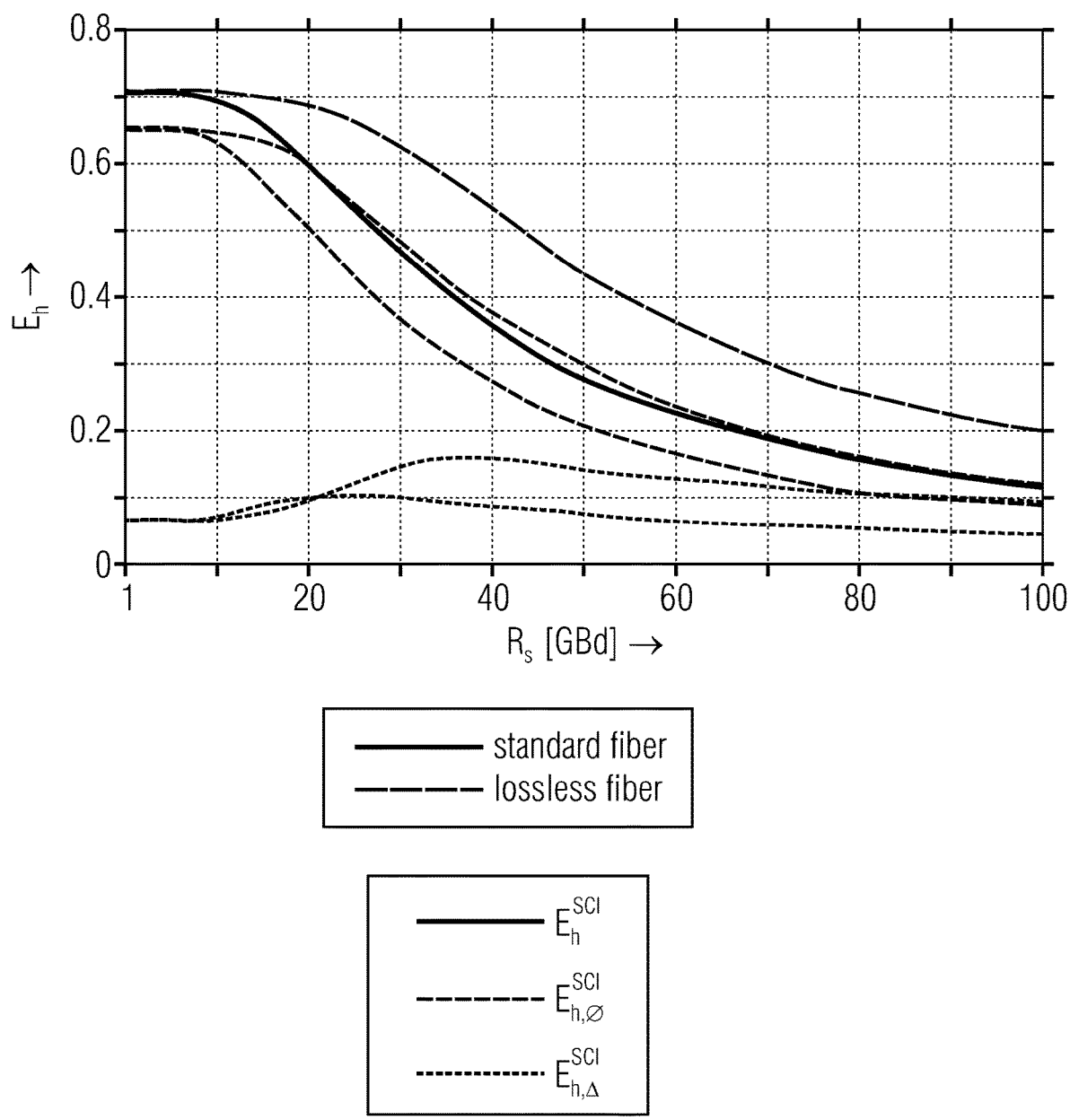
FIG. 8a illustrates an energy of the kernel coefficients in time-domain over the symbol rate according to an embodiment.

FIG. 8a illustrates an energy of the kernel coefficients in a time-domain $E_h$ over the symbol rate $R_s$ (PERT-TD, single-channel, single-span).

Figure 8B:
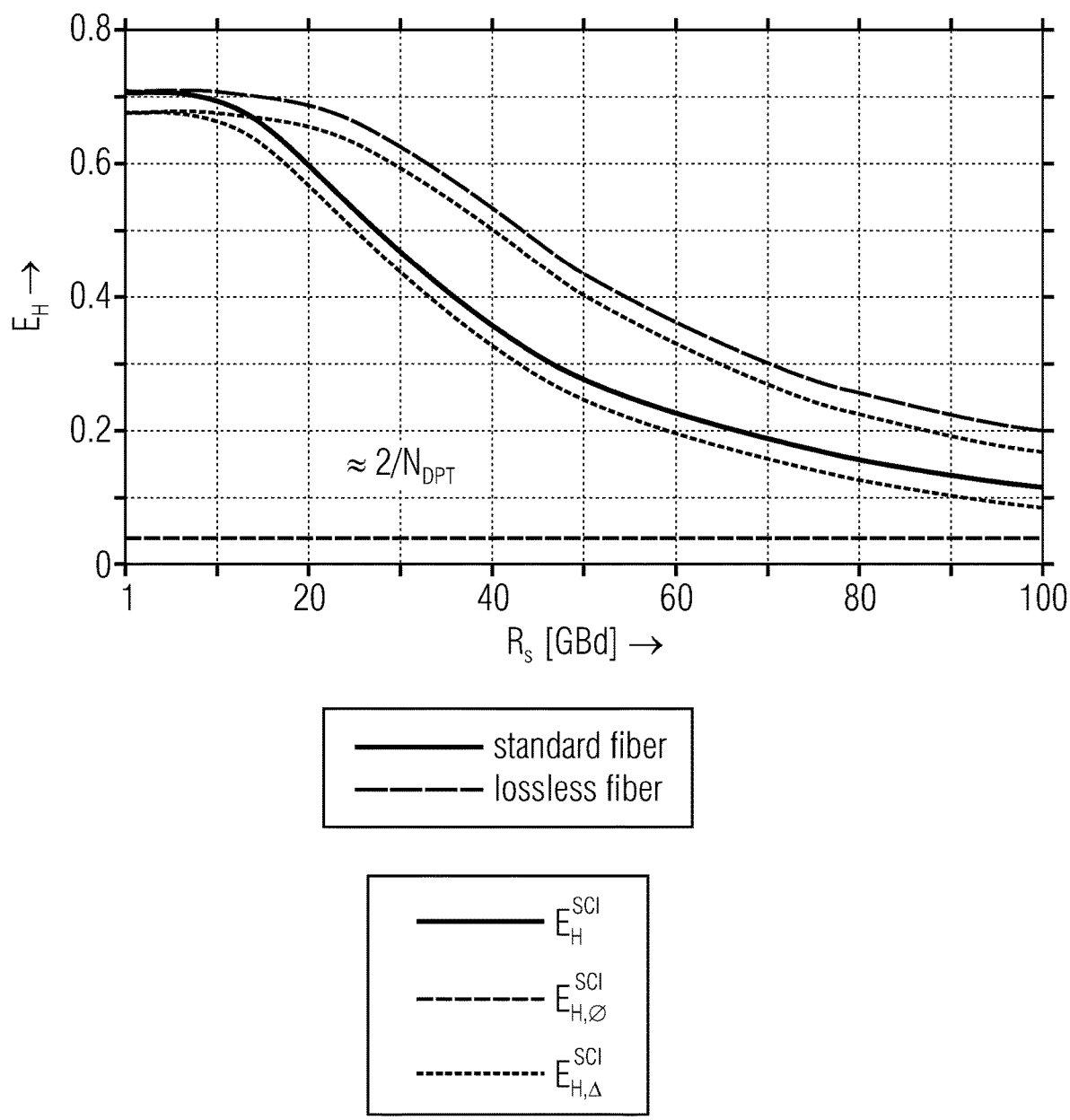
FIG. 8b illustrates an energy of the kernel coefficients in a frequency-domain over the symbol rate according to a further embodiment.

FIG. 8b illustrates an energy of the kernel coefficients in a frequency-domain $E_H$ over the symbol rate $R_s$ (PERT-FD, single-channel, single-span).

The results are obtained from the regular-logarithmic (REGLOG) model for a single-channel ($\rho=0.2$) over a standard single-mode fiber (10 $\log_{10} e^\alpha=0.2$ dB/km and $L_{sp}=100$ km) or a lossless fiber (10 $\log_{10} e^\alpha=0$ dB/km and $L_{sp}=21.71$ km). The subscript $\Delta$ denotes the subset of all coefficients associated with additive and the subscript $\varnothing$ denotes the subset of all coefficients with multiplicative perturbations.

In particular, FIG. 8a shows the energy of the (time-domain) kernel coefficients $E_h^{SCI}$ over $R_s$ for a single-span SSMF with $L_{sp}=100$ km and for a lossless fiber with $L_{sp}=21.71$ km.

Generally, we see that $E_h^{SCI}$ is constant for small $R_s$ and then curves into a transition region towards smaller energies before it starts to saturate for large $R_s$. For transmission over SSMF this transition region is shifted to smaller $R_s$, e.g., $E_h^{SCI}$ drops from 0.7 to 0.6 around 33 GHz for lossless transmission and at around 20 GHz for transmission over SSMF. We also present the kernel energies $E_{h,\Delta}^{SCI}$, associated with additive perturbations, and $E_{h,\varnothing}^{SCI}$ associated with multiplicative perturbations.

Most of the energy is concentrated in $E_{h,\varnothing}^{SCI}$, i.e., corresponding to the degenerate symbol combinations with $\kappa_1=0$ or $\kappa_3=0$ defined in (58)-(60). Interestingly, while the total energy $E_h^{SCI}$ decreases monotonically with $R_s$, the additive contribution $E_h^{SCI}$ increases in the transition region and then decreases again for large $R_s$. This behaviour is also visible in the results presented in FIGS. 7 (a) and (b).

FIG. 8b shows the energy of the kernel coefficients $E_H^{SCI}$ in frequency-domain for the same system scenario as in (a). The total energies are the same (cf. Parseval's theorem), however, the majority of the energy is now contained in the regular, i.e., additive, subset of coefficients. Only, the amount of $1/N_{DFT}$ independent of $R_s$ is contained in the degenerate, i.e., multiplicative, subset of coefficients.

Figure 9A:
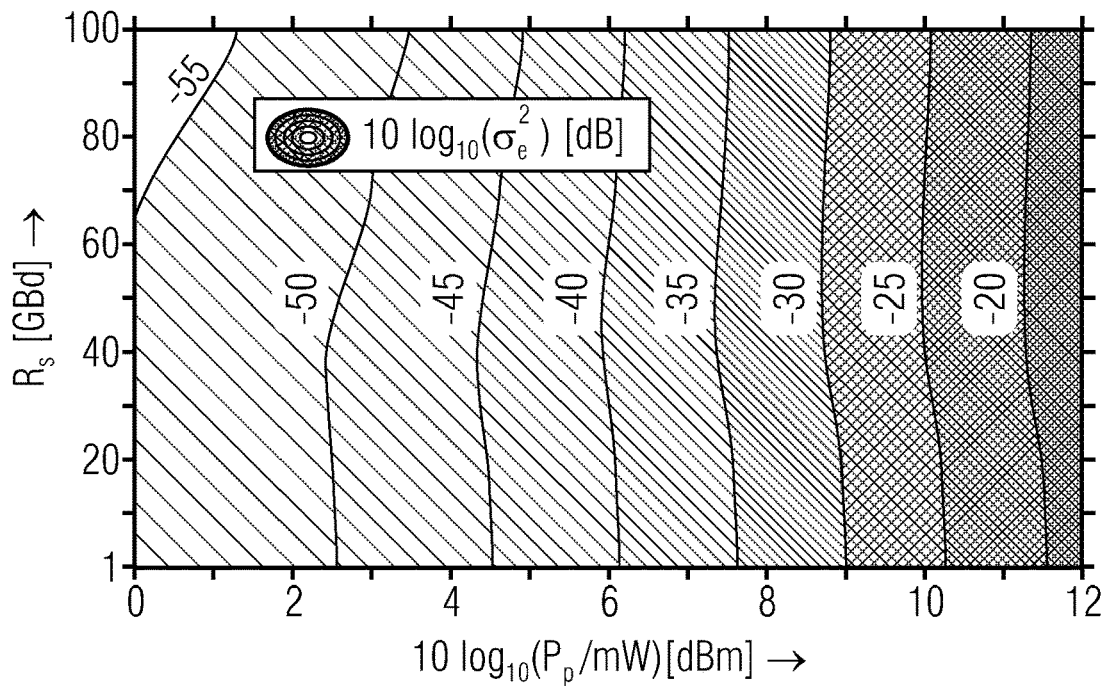
FIG. 9a illustrates a contour plot in the regular model in the frequency domain of the normalized mean-square error in dB for a single-channel, single-span, lossless fiber according to an embodiment.

FIG. 9a illustrates a contour plot in the regular model in the frequency domain of the normalized mean-square error $\sigma_e^2$ in dB for a single-channel, single-span, lossless fiber (REG-PERT-FD) according to an embodiment.

Figure 9B:
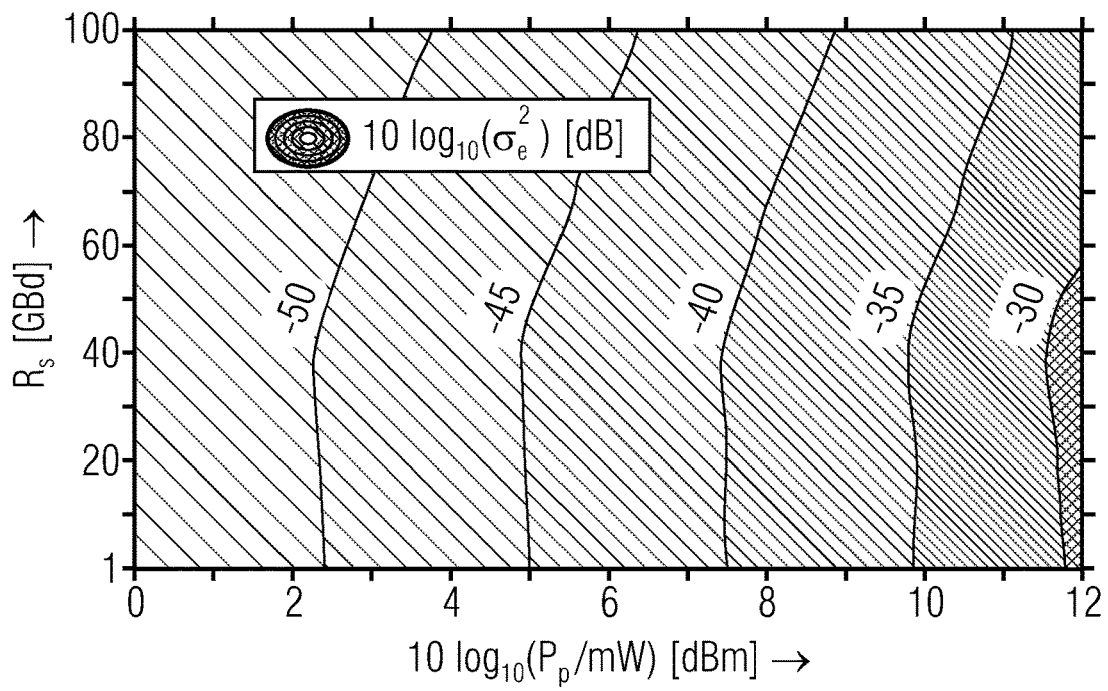
FIG. 9b illustrates a contour plot in the regular-logarithmic model in the frequency domain of the normalized mean-square error in dB for a single-channel, single-span, lossless fiber according to an embodiment.

FIG. 9b illustrates a contour plot in the regular-logarithmic model in the frequency domain of the normalized mean-square error $\sigma_e^2$ in dB for a single-channel, single-span, lossless fiber (REGLOG-PERT-FD) according to an embodiment.

The results are shown w.r.t. the symbol rate $R_s$ and the optical launch power of the probe $P_\rho$ in dBm. Parameters as in Table I with roll-off factor $\rho=0.2$, $N_{sp}=1$, 10 log $e^\alpha=0$ dB/km and $L_{sp}=21.71$ km. In (a) the regular (REG) frequency-domain (FD) model is carried out as in Algorithm 1 and in (b) the regular-logarithmic (REGLOG) model is carried out as in Algorithm 2.

In FIG. 9a and FIG. 9b the respective results on $\sigma_e^2$ using the discrete frequency-domain (FD) model according to Algorithm 1 and 2 are shown. We can confirm our previous statement that the regular perturbation model in time and frequency are equivalent considering that the results shown in FIG. 7a and FIG. 9b are (virtually) the same. We also conclude that the REGLOG-FD performs very similar to the corresponding TD model despite the fact that only average terms can truly be considered as multiplicative distortions. This may motivate the application of the FD over the TD model for fiber nonlinearity mitigation when an implementation in frequency-domain is computationally more efficient.

Figure 10A:
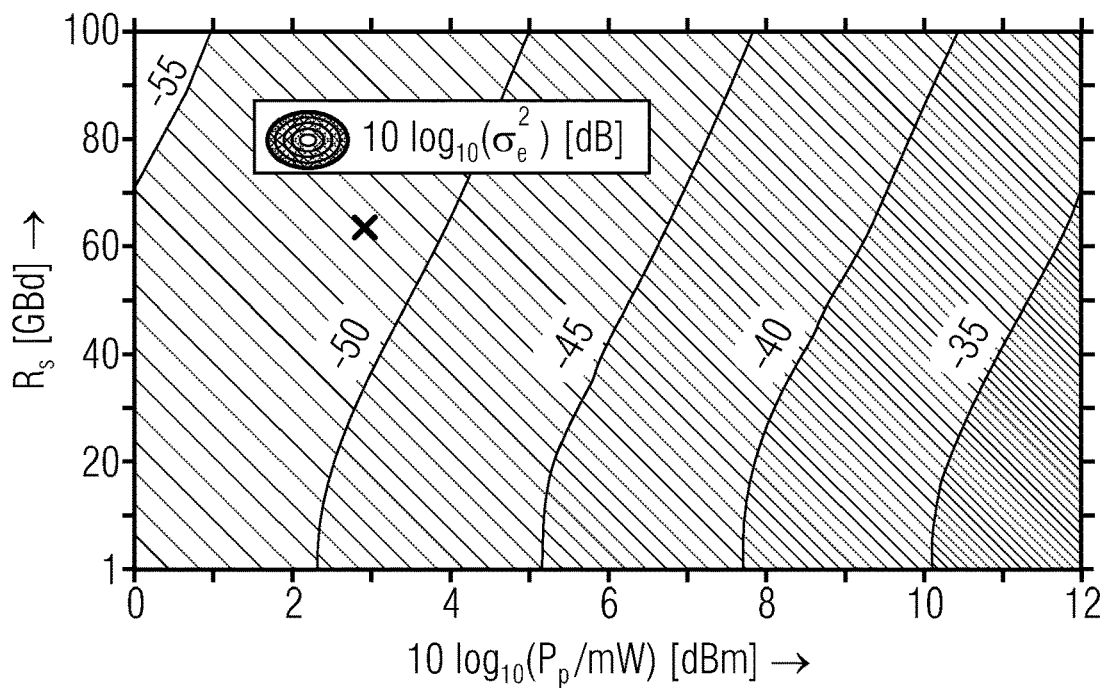
FIG. 10a illustrates contour plots of the normalized mean-square error $\sigma_e^2$ in dB according to an embodiment, wherein the results are obtained from the regular-logarithmic time-domain model over a standard single-mode fiber with end-of-span lumped amplification, and wherein the symbol rate and the optical launch power are varied for single-span transmission having a fixed roll-off factor.
Figure 10B:
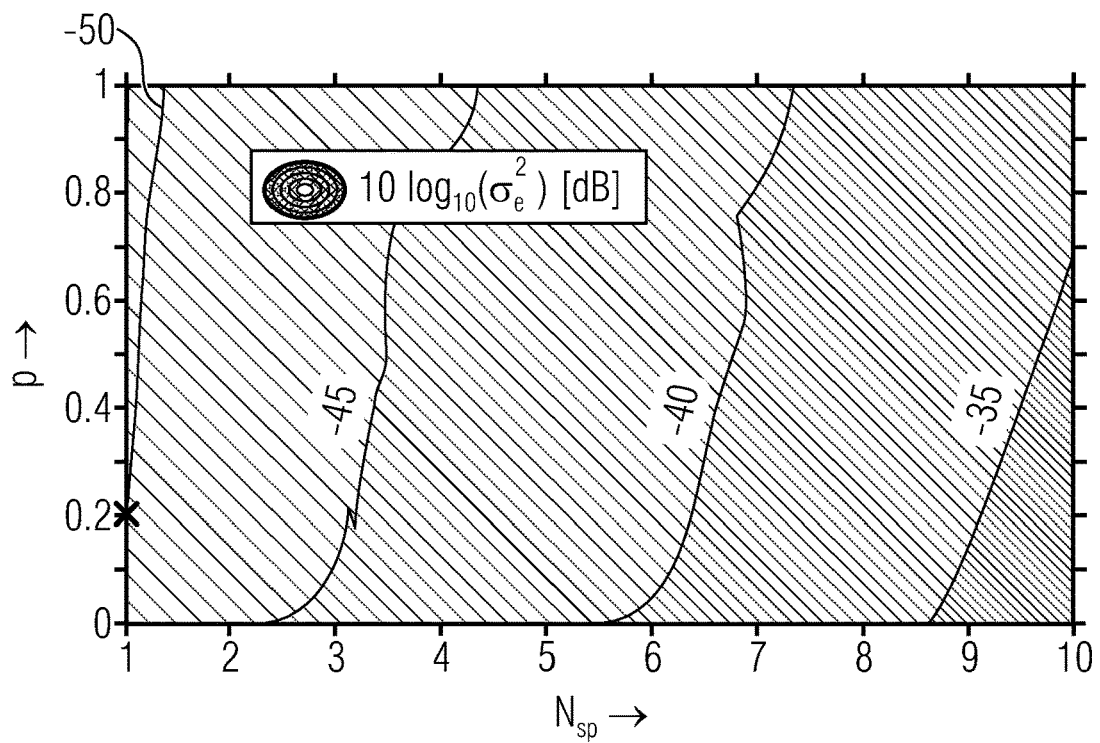
FIG. 10b illustrates contour plots of the normalized mean-square error $\sigma_e^2$ in dB according to an embodiment, wherein the results are obtained from the regular-logarithmic time-domain model over a standard single-mode fiber with end-of-span lumped amplification, and wherein the roll-off factor and number of spans $N_{sp}$ are varied with fixed symbol rate having fixed launch power.

FIG. 10a and FIG. 10b illustrate contour plots of the normalized mean-square error $\sigma_e^2$ in dB, wherein the results are obtained from the regular-logarithmic (REGLOG) time-domain (TD) model over a standard single-mode fiber with end-of-span lumped amplification (10 $\log_{10} e^\alpha=0.2$ dB/km and $L_{sp}=100$ km).

In FIG. 10a, the symbol rate $R_s$ and the optical launch power $P_\rho$ are varied for single-span ($N_{sp}=1$) transmission and fixed roll-off factor ($\rho=0.2$). (REGLOG-PERT-TD, single-channel, single-span, standard fiber).

In FIG. 10b, the roll-off factor $\rho$ and number of spans $N_{sp}$ are varied with fixed symbol rate ($R_s=64$ GBd) and fixed launch power (10 $\log_{10}(P_\rho/mW)=3$ dBm). (REGLOG-PERT-TD, single-channel, multi-span, standard fiber).

The black cross in FIG. 10a and FIG. 10b indicates the point with a common set of parameters. We can see a dependency on the roll-off factor $\rho$ which is due to a dependency of $E_h^{SCI}$ on $\rho$ (not shown here). With increasing $\rho$ the kernel energy $E_h^{SCI}$ decreases and hence does ae too.

FIG. 10a and FIG. 10b show $\sigma_e^2$ for a single-channel over standard singlemode fiber ($L_{sp}=100$ km and 10 $\log_{10} e^\alpha=0.2$ dB/km) and lumped end-of-span amplification. In the full-field simulation, the lumped amplifier is operated in constant-gain mode compensating for the exact span-loss of 20 dB. The results over a single-span in FIG. 10a are slightly better compared to the lossless case in FIG. 7b and the dependency on the symbol rate is even more pronounced. In FIG. 10b, $\sigma_e^2$ is shown over the roll-off factor $\rho$ and the number of spans $N_{sp}$ for a fixed symbol rate of $R_s=64$ GBd and fixed launch power of 10 $\log_{10}(P_\rho/mW)=3$ dBm. The black cross in FIGS. 10 (a) and (b) marks the point with common set of parameters.

For dual-channel transmission the transmit symbols of the interferer (b[k]) are drawn from the same symbol set A. For both wavelength channels, the symbol rate is fixed to $R_s=64$ GBd and the roll-off factor of the RRC shape is $\rho=0.2$. The transmit power of the probe is set to 10 $\log_{10}(P_\rho/mW)=0$ dBm while the transmit power of the interferer $P_1$ is varied together with the relative frequency offset $\Delta\omega/(2\pi)$ ranging from 76.8 GHz (i.e., no guard interval with 1.2×64 GHz) to 200 GHz.

Figure 11A:
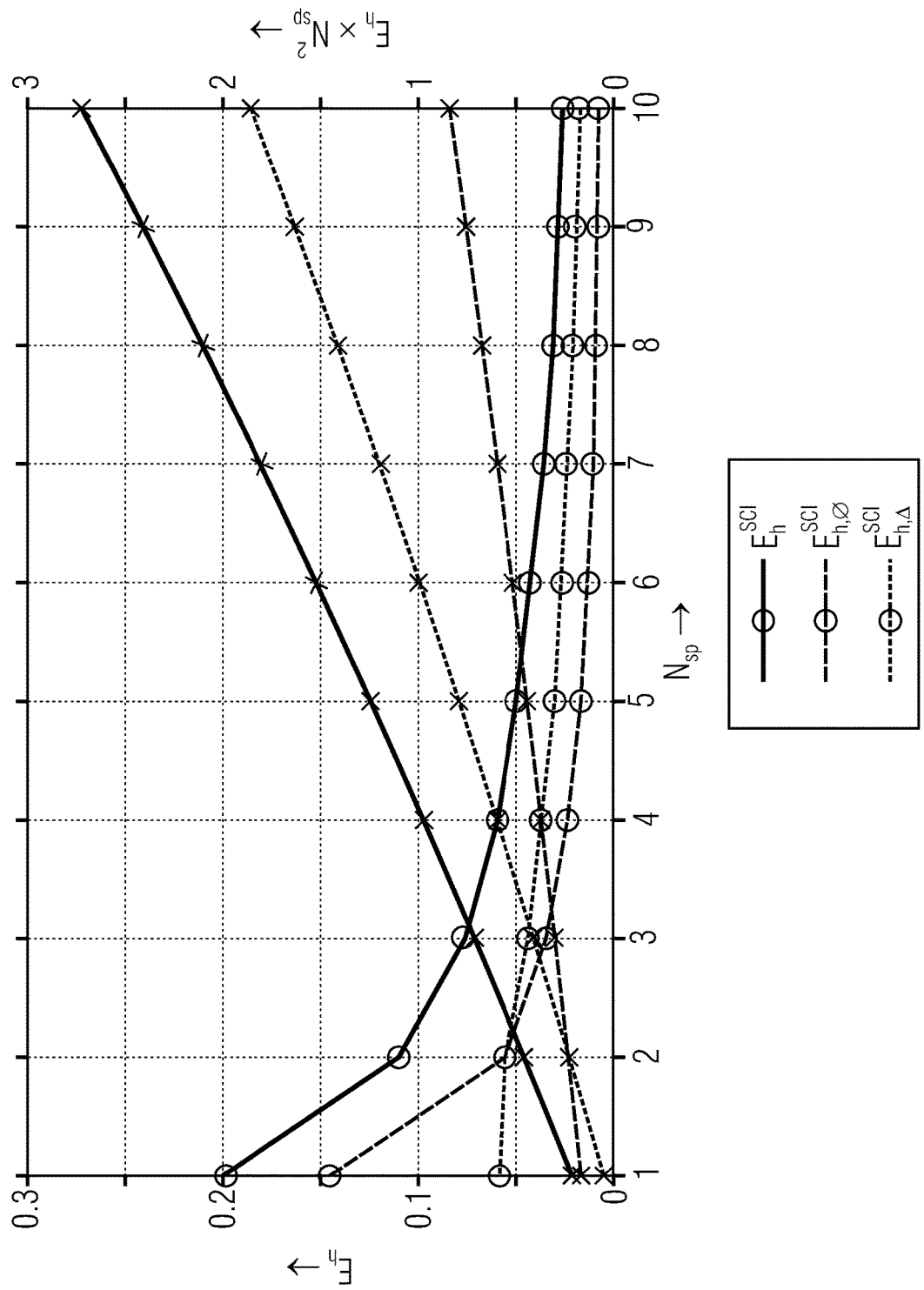
FIG. 11a illustrates an energy of the kernel coefficients in the time-domain.

In FIG. 11a, an energy of the kernel coefficients (black lines, bullet markers, left y-axis) in time-domain $E_h$ over $N_{sp}$ spans of standard single-mode fiber (10 $\log_{10} e^\alpha=0.2$ dB/km and $L_{sp}=100$ km, $\rho=0.2$) is illustrated (PERT-TD, single-channel, multi-span, standard fiber). Additionally, the kernel energies are shown scaled with $N_{sp}^2 \propto \varnothing_{NL,\rho}^2$ (gray lines, cross markers, right y-axis) to indicate the general growth of nonlinear distortions with increasing $N_{sp}$ (similar to the GN-model).

Figure 11B:
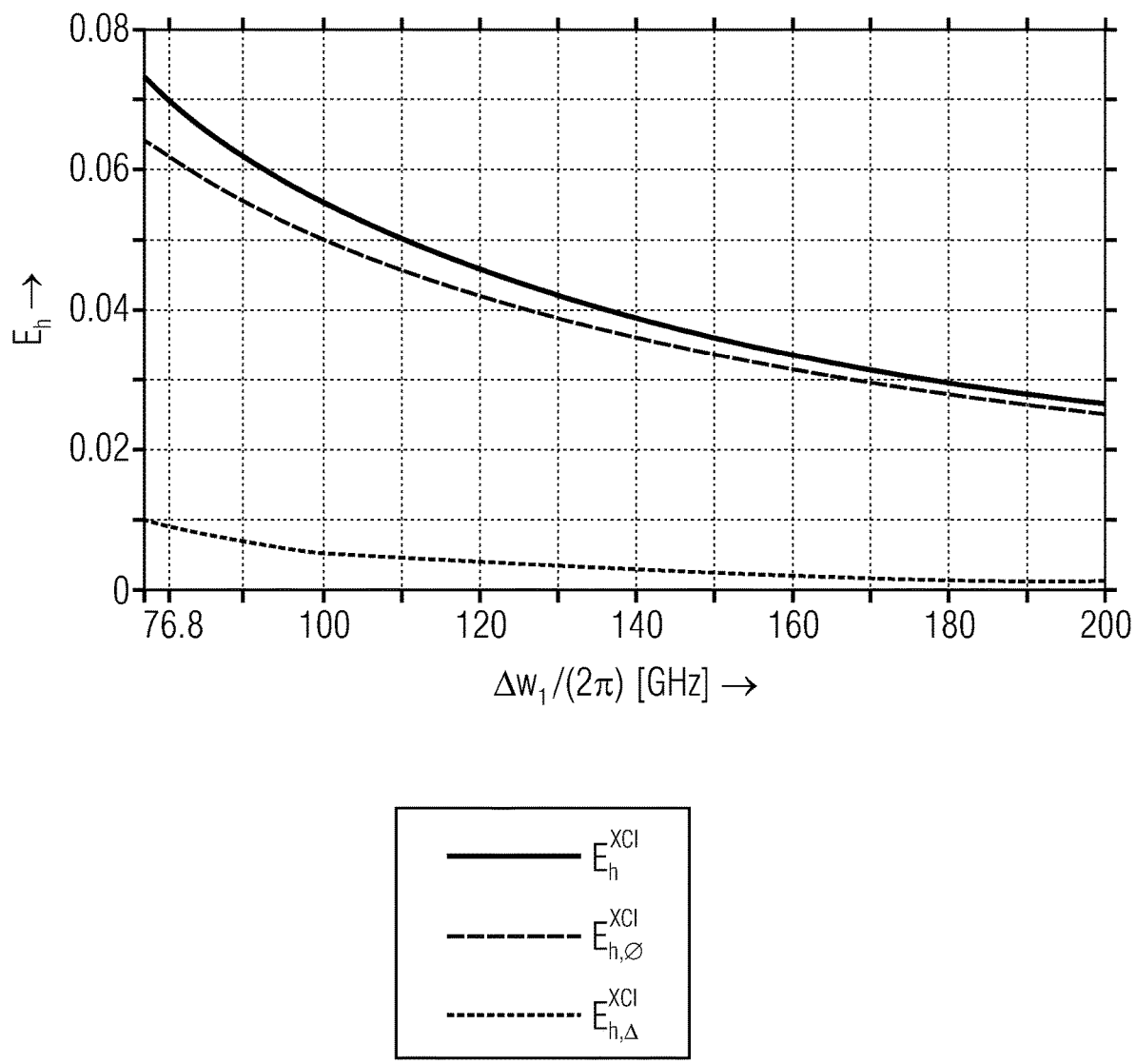
FIG. 11b illustrates kernel energies Eh for cross-channel interference (XCI) imposed by a single wavelength channel.

In FIG. 11b, kernel energies $E_h$ for cross-channel interference (XCI) imposed by a single wavelength channel spaced at $\Delta\omega_1/(2\pi)$ GHz over a single span of lossless fiber. Both probe and interferer have $R_s=64$ GBd and $\rho=0.2$ are illustrated (PERT-TD, dual-channel, single-span, lossless fiber).

The scaling laws of $\sigma_e^2$ with $N_{sp}$ are complemented in FIG. 11a by the energy of the kernel coefficients $E_h^{SCI}$ for the same system scenario as in FIG. 10b (with $\rho=0.2$). It is interesting to see that (for this particular system scenario) $E_{h,\Delta}^{SCI}$ and $E_{h,\varnothing}^{SCI}$ intersect at $N_{sp}=2$. We can conclude that after the second span more energy is comprised within the additive subset of coefficients than in the multiplicative one. With increasing $N_{sp}$, the relative contribution of $E_{h,A}^{SCI}$ to the total energy $E_h^{SCI}$ is increasing. Note, while $E_h^{SCI}$ is actually monotonically decreasing with $N_{sp}$, the common prefactor $\emptyset_{NL,\rho}$ has to be factored in as it effectively scales the nonlinear distortion. Since for heterogeneous spans we have $\emptyset_{NL,\rho} \propto L_{eff} \propto N_{sp}$, the same traces are shown scaled by $N_{sp}^2$ to illustrate how the energy of the total distortion accumulates with increasing transmission length. In this respect, similar results can be obtained from the presented channel model as from the GN-model (given proper scaling with $\emptyset_{NL,\rho}^2$ instead of just $N_{sp}^2$, and similarly taking all other wavelength channels into account). Additionally, qualitative statements can be derived, e.g., whether the nonlinear distortion is predominantly additive or multiplicative or on which time scale nonlinear distortions are still correlated.

Figure 12A:
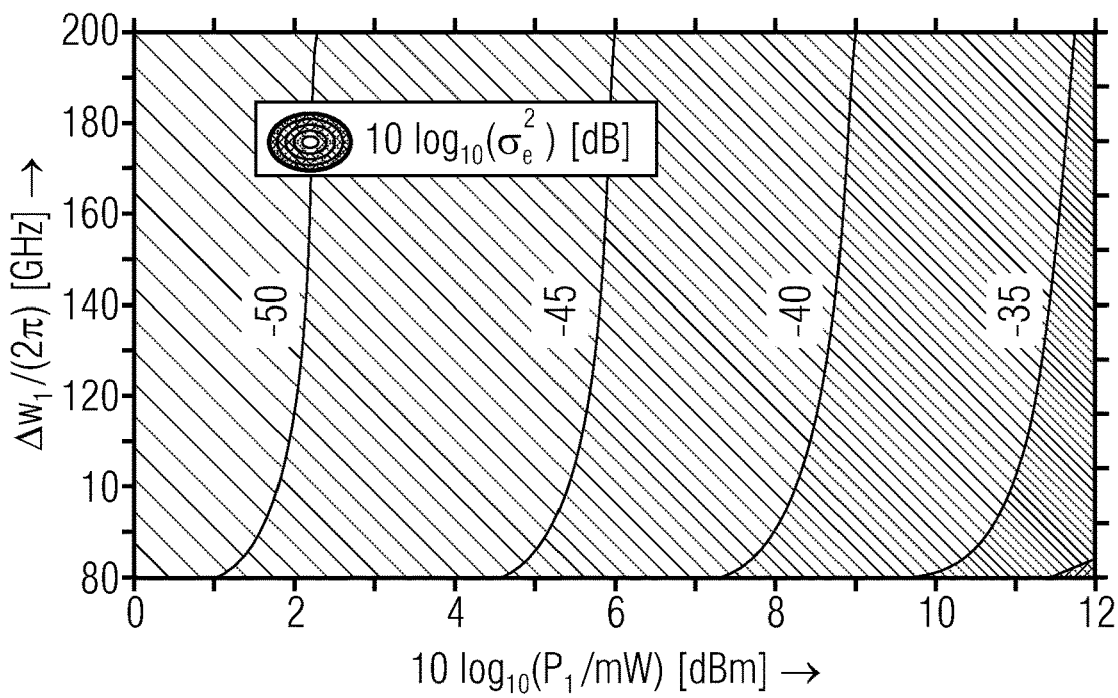
FIG. 12a illustrates a contour plot of the normalized mean-square error in dB in a time domain, for dual-channel, single-span, lossless fiber according to an embodiment.
Figure 12B:
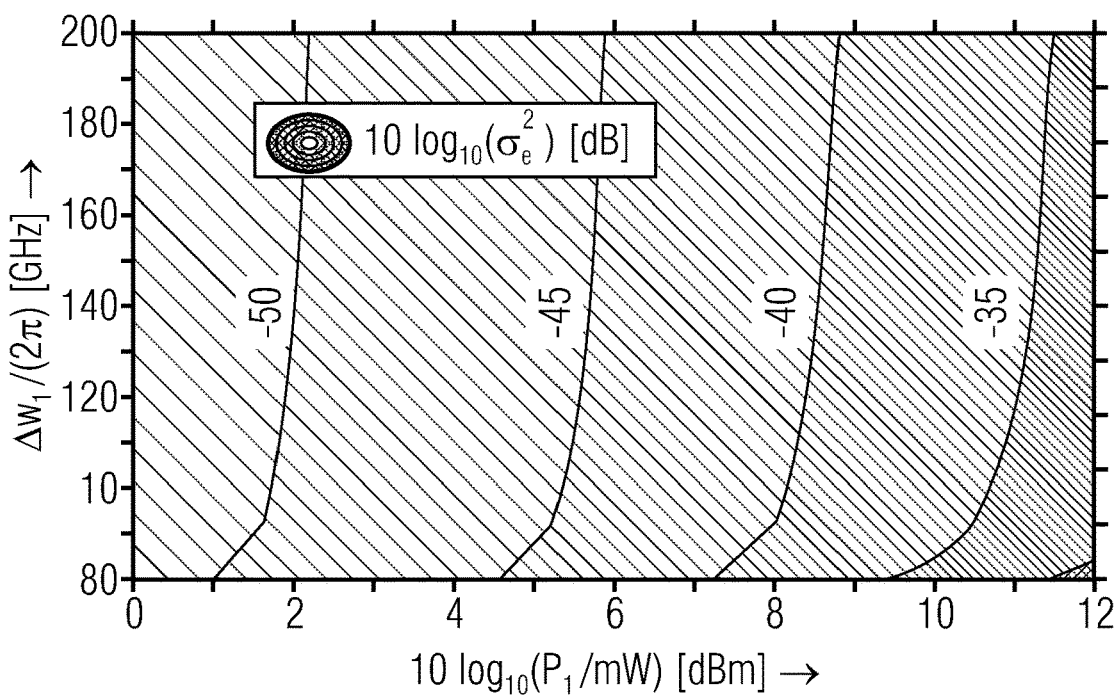
FIG. 12b illustrates a contour plot of the normalized mean-square error in dB in a frequency domain, for dual-channel, single-span, lossless fiber according to another embodiment.

FIG. 12a and FIG. 12b illustrate contour plots of the normalized mean-square error $\sigma_e^2$ in dB.

In particular, FIG. 12a illustrates a contour plot in a time domain, for dual-channel, single-span, lossless fiber, (REGLOG-PERT-TD).

FIG. 12b illustrates a contour plot in a frequency domain, for dual-channel, single-span, lossless fiber, (REGLOG-PERT-FD).

In FIG. 12a and FIG. 12b, the results are obtained from two co-propagating wavelength channels with PDM 64-QAM and a symbol rate of 64 GBd and roll-off factor $\rho=0.2$. The launch power of the probe is fixed at 10 $\log_{10}(P_\rho/mW)=0$ dBm while the power of the interferer $P_1$ and the relative frequency offset $\Delta\omega_1$ are varied. In (a) the regular-logarithmic (REGLOG) time-domain (TD) model for both SCI and XCI is carried out as in (55) and in (b) the REGLOG frequency-domain (FD) model is carried out as in Algorithm 2 and (78) for both SCI and XCI.

FIG. 12a and FIG. 12b show the $\sigma_e^2$ for dual-channel transmission using the REGLOG time-domain in FIG. 12a and the frequency-domain model in FIG. 12b. The transmit symbols of the interferer <b[k]> are drawn from the same symbol set A, e.g., 64-QAM per polarization. For both wavelength channels, the symbol rate is fixed to $R_s=64$ GBd and the roll-off factor of the RRC shape is $\rho=0.2$. The transmit power of the probe is set to 10 $\log_{10}(P_\rho/mW)=0$ dBm while the transmit power of the interferer $P_v$ with channel number $v=1$ is varied together with the relative frequency offset $\Delta\omega_1/(2\pi)$ ranging from 76.8 GHz (i.e., no guard interval with $(1+\varphi)\times64$ GHz) to 200 GHz. In case of the end-to-end channel model both contributions from intra- and inter-channel distortions are combined into a single perturbative term (cf. (55) and (78)). The baseline error $\sigma_e^2$ is therefore approximately −55 dB considering the respective case with $R_s=64$ GBd and $P_\rho=0$ dBm in FIG. 7b. It is seen that the time- and frequency-domain model perform very similar. The dependency on the channel spacing $\Delta\omega_1$ is explained considering FIG. 11b. Here, the energy of the cross-channel coefficients $h_1[\kappa]$ is shown over $\Delta\omega_1$. Generally, with increasing $\Delta\omega_1$, $E_h^{SCI}$ decreases and additionally the relative contribution of the degeneracy at $\kappa_3=0$, i.e., $E_{h,\emptyset}^{SCI}$ is growing. Ultimately, the main distortion caused by an interferer spaced far away from the probe channel is a distortion in phase and state of polarization.

Summarizing the above, a comprehensive analysis of end-to-end channel models for fiber-optic transmission based on a perturbation approach is provided. The existing view on nonlinear interference following the pulse collision picture is described in a unified framework with a novel frequency-domain perspective that incorporates the time-discretization via an aliased frequency-domain kernel. The relation between the time- and frequency-domain representation is elucidated and we show that the kernel coefficients in both views are related by a 3D discrete-time Fourier transform. The energy of the kernel coefficients can be directly related to the GN-model.

While the pulse collision picture is a theory developed particularly for inter-channel nonlinear interactions, a generalization to intra-channel nonlinear interactions is presented. An intra-channel phase distortion term and an intra-channel XPolM term are introduced and both correspond to a subset of degenerate intra-channel pulse collisions. In analogy to the time-domain model, the frequency-domain model is modified to treat certain degenerate mixing products as multiplicative distortions. As a result, we have established a complete formulation of strictly regular (i.e., additive) models, and regular-logarithmic (i.e., mixed additive and multiplicative) models, both in time- and in frequency-domain, both for intra- and inter-channel nonlinear interference.

Provided from the frequency-domain description, a novel class of algorithms is implemented which effectively computes the end-to-end relation between transmit and receive sequences over discrete frequencies from the Nyquist interval. In fiber nonlinearity compensation this scheme can be well applied at the transmit-side during pulse-shaping or on the receive side after matched filtering. Moreover, while the time-domain implementation uses a triple summation per time-instance, the frequency-domain implementation involves only a double summation per frequency index. Similar as for linear systems, this characteristic allows for very efficient implementations using the fast Fourier transform when the time-domain kernel comprises many coefficients.

The provided algorithms were compared to the (over-sampled and inherently sequential) split-step Fourier method using the mean-squared error between both output sequences. We show that, in particular, the regular-logarithmic models have good agreement with the split-step Fourier method over a wide range of system parameters. The presented results are further supported by a qualitative analysis involving the kernel energies to quantify the relative contributions of either additive or multiplicative distortions.

In the following, a proof of the relation in (32), (33) is provided.

The Fourier transform of $\Delta s(t)$ in (33) similarly computed as in [30, Appx.].

We start our derivation by expressing the optical field envelope $u(0, t)$ by its inverse Fourier transform of $U(0, \omega)$ to obtain $$\Delta s(t) = -j\gamma \frac{8}{9} L_{eff} \int_{\mathbb{R}^2} h_{NL}(\tau_1, \tau_2) \times \qquad (92)$$

$$u(0, t+\tau_1) u^H(0, t+\tau_1+\tau_2) u(t+\tau_2) d^2\tau$$

$$= -j\gamma \frac{8}{9} L_{eff} \frac{1}{(2\pi)^3} \int\int_{-\infty}^{+\infty} d\tau_1 d\tau_2 h_{NL}(\tau_1, \tau_2) \times$$

$$\int_{-\infty}^{\infty} d\omega_3 U(0, \omega_3) \exp(j\omega_3 \tau_1) \times$$

-continued $$\int_{-\infty}^{\infty} d\omega_2 U^H(0, \omega_2) \exp(-j\omega_2(\tau_1 + \tau_2)) \times$$

$$\int_{-\infty}^{\infty} d\omega_1 U(0, \omega_1) \exp(j\omega_1 \tau_2) \times$$

$$\exp(j(\omega_3 - \omega_2 + \omega_1)t).$$

The Fourier transform of the former expression yields $$\Delta S(\omega) = -j\gamma \frac{8}{9} L_{eff} \frac{1}{(2\pi)^3} \int\int\int_{-\infty}^{+\infty} dt d\tau_1 d\tau_2 h_{NL}(\tau_1, \tau_2) \times \quad (93)$$

$$\int_{-\infty}^{\infty} d\omega_3 U(0, \omega_3) \exp(j\omega_3 \tau_1) \times$$

$$\int_{-\infty}^{\infty} d\omega_2 U^H(0, \omega_2) \exp(-j\omega_2(\tau_1 + \tau_2)) \times$$

$$\int_{-\infty}^{\infty} d\omega_1 U(0, \omega_1) \exp(j\omega_1 \tau_2) \times$$

$$\exp(j(\omega_3 - \omega_2 + \omega_1 - \omega)t).$$

We now use the identity $\int_{-\infty}^{\infty} exp(j(\omega_3-\omega_2+\omega_1)t)dt = 2\pi\delta(\omega_3-\omega_2+\omega_1-\omega)$ to obtain $$\Delta S(\omega) = -j\gamma \frac{8}{9} L_{eff} \frac{1}{(2\pi)^2} \int\int_{-\infty}^{+\infty} d\tau_1 d\tau_2 h_{NL}(\tau_1 \cdot \tau_2) \times \quad (94)$$

$$U(0, \omega - \omega_1 + \omega_2) \exp(j(\omega - \omega_1 + \omega_2)\tau_1) \times$$

$$\int_{-\infty}^{\infty} d\omega_2 U^H(0, \omega_2) \exp(-j\omega_2(\tau_1 + \tau_2)) \times$$

$$\int_{-\infty}^{\infty} d\omega_1 U(0, \omega_1) \exp(j\omega_1 \tau_2).$$

After re-arranging the order of integration, we have $$\Delta S(\omega) = -j\gamma \frac{8}{9} L_{eff} \frac{1}{(2\pi)^2} \int\int_{-\infty}^{+\infty} d\omega_1 d\omega_2 \times \quad (95)$$

$$U(0, \omega - \omega_1 + \omega_2) U^H(0, \omega_2) U(0, \omega_1) \times$$

$$\int\int_{-\infty}^{\infty} d\tau_1 d\tau_2 h_{NL}(\tau_1, \tau_2) \exp(j\omega_1 \tau_2) \times$$

$$\exp(-j\omega_2(\tau_1 + \tau_2)) \exp(j(\omega - \omega_1 + \omega_2)\tau_1).$$

And finally a change of variables with $v_1=\omega_1-\omega$ and $v_2=\omega_2-\omega_1$ yields $$\Delta S(\omega) = -j\gamma \frac{8}{9} L_{eff} \frac{1}{(2\pi)^2} \int\int_{-\infty}^{+\infty} dv_1 dv_2 \times \quad (96)$$

$$U(0, \omega + v_2) U^H(0, \omega + v_1 + v_2) U(0, \omega + v_1) \times$$

$$\underbrace{\int\int_{-\infty}^{+\infty} d\tau_1 d\tau_2(\tau_1, \tau_2) \exp(-jv_1\tau_1 - jv_2\tau_2)}_{H_{NL}(v_1,v_2)=\mathcal{F}\{h_{NL}(\tau_1,\tau_2)\}},$$

which is equivalent to the expression in (32).

Although some aspects have been described in the context of an apparatus, it is clear that these aspects also represent a description of the corresponding method, where a block or device corresponds to a method step or a feature of a method step. Analogously, aspects described in the context of a method step also represent a description of a corresponding block or item or feature of a corresponding apparatus. Some or all of the method steps may be executed by (or using) a hardware apparatus, like for example, a microprocessor, a programmable computer or an electronic circuit. In some embodiments, one or more of the most important method steps may be executed by such an apparatus.

Depending on certain implementation requirements, embodiments of the invention can be implemented in hardware or in software or at least partially in hardware or at least partially in software. The implementation can be performed using a digital storage medium, for example a floppy disk, a DVD, a Blu-Ray, a CD, a ROM, a PROM, an EPROM, an EEPROM or a FLASH memory, having electronically readable control signals stored thereon, which cooperate (or are capable of cooperating) with a programmable computer system such that the respective method is performed. Therefore, the digital storage medium may be computer readable.

Some embodiments according to the invention comprise a data carrier having electronically readable control signals, which are capable of cooperating with a programmable computer system, such that one of the methods described herein is performed.

Generally, embodiments of the present invention can be implemented as a computer program product with a program code, the program code being operative for performing one of the methods when the computer program product runs on a computer. The program code may for example be stored on a machine readable carrier.

Other embodiments comprise the computer program for performing one of the methods described herein, stored on a machine readable carrier.

In other words, an embodiment of the inventive method is, therefore, a computer program having a program code for performing one of the methods described herein, when the computer program runs on a computer.

A further embodiment of the inventive methods is, therefore, a data carrier (or a digital storage medium, or a computer-readable medium) comprising, recorded thereon, the computer program for performing one of the methods described herein. The data carrier, the digital storage medium or the recorded medium are typically tangible and/or non-transitory.

A further embodiment of the inventive method is, therefore, a data stream or a sequence of signals representing the computer program for performing one of the methods described herein. The data stream or the sequence of signals may for example be configured to be transferred via a data communication connection, for example via the Internet.

A further embodiment comprises a processing means, for example a computer, or a programmable logic device, configured to or adapted to perform one of the methods described herein.

A further embodiment comprises a computer having installed thereon the computer program for performing one of the methods described herein.

A further embodiment according to the invention comprises an apparatus or a system configured to transfer (for example, electronically or optically) a computer program for performing one of the methods described herein to a receiver. The receiver may, for example, be a computer, a mobile device, a memory device or the like. The apparatus or system may, for example, comprise a file server for transferring the computer program to the receiver.

In some embodiments, a programmable logic device (for example a field programmable gate array) may be used to perform some or all of the functionalities of the methods described herein. In some embodiments, a field programmable gate array may cooperate with a microprocessor in order to perform one of the methods described herein. Generally, the methods may be performed by any hardware apparatus.

The apparatus described herein may be implemented using a hardware apparatus, or using a computer, or using a combination of a hardware apparatus and a computer.

The methods described herein may be performed using a hardware apparatus, or using a computer, or using a combination of a hardware apparatus and a computer.

While this invention has been described in terms of several embodiments, there are alterations, permutations, and equivalents which will be apparent to others skilled in the art and which fall within the scope of this invention. It should also be noted that there are many alternative ways of implementing the methods and compositions of the present invention. It is therefore intended that the following appended claims be interpreted as including all such alterations, permutations, and equivalents as fall within the true spirit and scope of the present invention.

REFERENCES

[1] S. J. Savory, "Digital Coherent Optical Receivers: Algorithms and Subsystems," IEEE *J. Sel. Top. Quantum Electron.*, vol. 16, no. 5, pp. 1164-1179, 2010-09.

[2] D. Zwillinger, *Handbook of Differential Equations (eprint)*. Academic Press, 3rd ed., 1998.

[3] K. V. Peddanarappagari and M. Brandt-Pearce, "Volterra Series Transfer Function of Single-mode Fibers," *J. Lightwave Technol.*, vol. 15, no. 12, pp. 2232-2241, 1997.

[4] A. Vannucci, P. Serena, and A. Bononi, "The RP Method: A New Tool for The Iterative Solution of the Nonlinear Schrödinger Equation," *J. Lightwave Technol.*, vol. 20, no. 7, pp. 1102-1112, 2002.

[5] A. Ghazisaeidi, "A Theory of Nonlinear Interactions Between Signal and Amplified Spontaneous Emission Noise in Coherent Wavelength Division Multiplexed Systems," *J. Lightwave Technol.*, vol. 35, pp. 51505175, December 2017.

[6] A. Mecozzi, C. B. Clausen, and M. Shtaif, "Analysis of Intrachannel Nonlinear Effects in Highly Dispersed Optical Pulse Transmission," *IEEE Photonics Technol. Lett.*, vol. 12, no. 4, pp. 392-394, 2000.

[7] A. Mecozzi, C. B. Clausen, and M. Shtaif, "System Impact of Intrachannel Nonlinear Effects in Highly Dispersed Optical Pulse Transmission," *IEEE Photonics Technol. Lett.*, vol. 12, no. 12, pp. 1633-1635, 2000.

[8] A. Mecozzi, C. B. Clausen, M. Shtaif, S. G. Park, and A. H. Gnauck, "Cancellation of Timing and Amplitude Jitter in Symmetric Links Using Highly Dispersed Pulses," *IEEE Photonics Technol. Lett.*, vol. 13, no. 5, pp. 445-447, 2001.

[9] A. Mecozzi, "A Unified Theory of Intrachannel Nonlinearity in Pseudolinear Transmission," in *Impact of Nonlinearities on Fiber Optic Communications*, pp. 253-291, Springer Science & Business Media, 2011.

[10] A. Mecozzi and R. Essiambre, "Nonlinear Shannon Limit in Pseudolinear Coherent Systems," *J. Lightwave Technol.*, vol. 30, no. 12, pp. 2011-2024, 2012.

[11] R. Dar, M. Feder, A. Mecozzi, and M. Shtaif, "Properties of Nonlinear Noise in Long, Dispersion-Uncompensated Fiber Links," *Opt. Express*, vol. 21, no. 22, pp. 25685-25699, 2013.

[12] R. Dar, M. Feder, A. Mecozzi, and M. Shtaif, "Accumulation of Nonlinear Interference Noise in Fiber-Optic Systems," *Opt. Express*, vol. 22, no. 12, pp. 14199-14211, 2014.

[13] R. Dar, M. Feder, A. Mecozzi, and M. Shtaif, "Pulse Collision Picture of Inter-Channel Nonlinear Interference in Fiber-Optic Communications," *J. Lightwave Technol.*, vol. 34, pp. 593-607, January 2016.

[14] A. V. Oppenheim and A. S. Willsky, *Signals and Systems*. Prentice Hall, 1983.

[15] G. P. Agrawal, *Fiber-Optic Communication Systems*. John Wiley & Sons, Inc., 4th ed., 2010.

[16] I. Kaminow, *Optical Fiber Telecommunications Volume VIB, Systems and Networks*. Elsevier Science Publishing, 6th ed., 2013.

[17] R. Engelbrecht, *Nichtlineare Faseroptik: Grundlagen und Anwendungsbeispiele*. Springer-Verlag, 2015.

[18] R. F. H. Fischer, *Precoding and Signal Shaping for Digital Transmission*. John Wiley & Sons, 2002.

[19] K. D. Kammeyer, *Nachrichtenübertragung*. Vieweg+Teubner, 2008.

[20] J. P. Gordon and H. Kogelnik, "PMD Fundamentals: Polarization Mode Dispersion in Optical Fibers," *Proc. Natl. Acad. Sci. U.S.A.*, vol. 97, no. 9, pp. 4541-50, 2000.

[21] P. Johannisson and M. Karlsson, "Perturbation Analysis of Nonlinear Propagation in a Strongly Dispersive Optical Communication System," *J. Lightwave Technol.*, vol. 31, no. 8, pp. 1273-1282, 2013-04.

[22] H. Louchet, A. Hodzic, K. Petermann, A. Robinson, and R. Epworth, "Simple Criterion for the Characterization of Nonlinear Impairments in Dispersion-Managed Optical Transmission Systems," *IEEE Photonics Technol. Lett.*, vol. 17, no. 10, pp. 2089-2091, 2005.

[23] X. Wei, "Power-Weighted Dispersion Distribution Function Long-haul Optical Transmission Links," *Opt. Lett.*, vol. 31, no. 17, pp. 2544-2546, 2006.

[24] L. Liu, L. Li, Y. Huang, K. Cui, Q. Xiong, F. N. Hauske, C. Xie, and Y. Cai, "Intrachannel Nonlinearity Compensation by Inverse Volterra Series Transfer Function," *J. Lightwave Technol.*, vol. 30, no. 3, pp. 310-316, 2012.

[25] R. W. Boyd, *Nonlinear Optics*. Academic Press, 3rd ed., 2008.

[26] P. Poggiolini, G. Bosco, A. Carena, V. Curri, Y. Jiang, and F. Forghieri, "A Detailed Analytical Derivation of the GN Model of Non-Linear Interference in Coherent Optical Transmission Systems," *arXiv Prepr.arXiv*1209.0394v13, no. 1209.0394, pp. 1-24, 2012.

[27] P. Poggiolini, "The GN Model of Non-linear Propagation in Uncompensated Coherent Optical Systems," *J. Lightwave Technol.*, vol. 30, no. 24, pp. 3857-3879, 2012.

[28] A. Bononi, P. Serena, and A. Orlandini, "A Unified Design Framework for Terrestrial Systems," *J. Lightwave Technol.*, vol. 26, no. 22, pp. 36173631, 2008.

[29] J. K. Fischer, C.-A. Bunge, and K. Petermann, "Equivalent Single-Span Model for Dispersion-Managed Fiber-Optic Transmission Systems," *J. Lightwave Technol.*, vol. 27, no. 16, pp. 3425-3432, 2009.

[30] M. J. Ablowitz and T. Hirooka, "Managing Nonlinearity in Strongly Dispersion-managed Optical Pulse Transmission," *J. Opt. Soc. Am. B Opt. Phys.*, vol. 19, no. 3, pp. 425-439, 2002.

[31] M. J. Ablowitz and T. Hirooka, "Resonant Nonlinear Intrachannel Interactions in Strongly Dispersion-managed Transmission Systems," *Opt. Lett.*, vol. 25, no. 24, pp. 1750-1752, 2000.

[32] I. R. Gabitov and S. K. Turitsyn, "Averaged Pulse Dynamics in a Cascaded Transmission System with Passive Dispersion Compensation," *Opt. Lett.*, vol. 21, no. 5, pp. 327-329, 1996.

[33] R. Dar, "Analytical and Semi-Analytical Models for Nonlinear Transmission," in 42th *Eur. Conf. Opt. Commun.*, no. W.1.D.5, 2016.

[34] A. Carena, V. Curri, G. Bosco, P. Poggiolini, and F. Forghieri, "Modeling of the Impact of Nonlinear Propagation Effects in Uncompensated Optical Coherent Transmission Links," *J. Lightwave Technol.*, vol. 30, no. 10, pp. 1524-1539, 2012-05.

[35] F. Frey, R. Emmerich, C. Schubert, J. K. Fischer, and F. Fischer, "Improved Perturbation-based Fiber Nonlinearity Compensation," in 44*th Eur. Conf. Opt. Commun.*, no. Tu1F.6, 2018.

[36] J. J. Shynk, "Frequency-Domain and Multirate Adaptive Filtering," *IEEE Signal Process Mag.*, vol. 9, no. 1, pp. 14-37, 1992.

[37] F. P. Guiomar and A. N. Pinto, "Simplified Volterra Series Nonlinear Equalizer for Polarization-multiplexed Coherent Optical Systems," *J. Lightwave Technol.*, vol. 31, no. 23, pp. 3879-3891, 2013.

[38] B. Xu and M. Brandt-Pearce, "Modified Volterra Series Transfer Function Method," *IEEE Photonics Technol. Lett.*, vol. 14, pp. 47-49, January 2002.

[39] B. Xu and M. Brandt-Pearce, "Modified Volterra Series Transfer Function Method and Applications to Fiber-Optic Communications," in $35^{th}$ *Annu. Asilomar Conf. Signals, Syst. Comput.*, pp. 23-27, 2001.

[40] Y. Fan, L. Dou, Z. Tao, L. Lei, S. Oda, T. Hoshida, and J. C. Rasmussen, "Modulation Format Dependent Phase Noise Caused by Intra-channel Nonlinearity," in 38*th Eur. Conf. Opt. Commun.*, no. We.2.C.3, 2012.

[41] Z. Tao, Y. Zhao, Y. Fan, L. Dou, T. Hoshida, and J. Rasmussen, "Analytical Intrachannel Nonlinear Models to Predict the Nonlinear Noise Waveform," *J. Lightwave Technol.*, vol. 33, no. 10, pp. 2111-2119, 2014.

[42] M. Secondini, E. Forestieri, and C. R. Menyuk, "A Combined Regular-Logarithmic Perturbation Method for Signal-Noise Interaction in Amplified Optical Systems," *J Lightwave Technol*, vol. 27, pp. 3358-3369, August 2009.

[43] M. Winter, C.-A. Bunge, D. Setti, and K. Petermann, "A Statistical Treatment of Cross-Polarization Modulation in DWDM Systems," *J. Lightwave Technol.*, vol. 27, no. 17, pp. 3739-3751, 2009.

[44] P. Serena and A. Bononi, "On the Nonlinear Reference Phase in Regular Perturbation Models," in 2015 *Tyrrhenian Int. Work. Digit. Commun.*, no. 1-4, 2015.

[45] A. Mecozzi and F. Matera, "Polarization Scattering by Intra-channel Collisions," *Opt. Express*, vol. 20, no. 2, pp. 1213-1218, 2012.

[46] O. V. Sinkin, R. Holzlohner, J. Zweck, and C. R. Menyuk, "Optimization of the Split-step Fourier Method in Modeling Optical-fiber Communications Systems," *J Lightwave Technol*, vol. 21, pp. 61-68, January 2003.

The invention claimed is:

1. An apparatus for determining an interference in a transmission medium during a transmission of a data input signal, comprising:
    a transform module configured to transform the data input signal from a time domain to a frequency domain comprising a plurality of frequency channels to acquire a frequency-domain data signal comprising a plurality of spectral coefficients, wherein each spectral coefficient of the plurality of spectral coefficients is assigned to one of the plurality of frequency channels, and
    an analysis module configured to determine the interference by determining one or more spectral interference coefficients, wherein each of the one or more spectral interference coefficients is assigned to one of the plurality of frequency channels,
    wherein the analysis module configured to determine each of the one or more spectral interference coefficients depending on the plurality of spectral coefficients and depending on a transfer function, wherein the transfer function is configured to receive two or more argument values, wherein each of the two or more argument values indicates one of the plurality of frequency channels, and wherein the transfer function is configured to return a return value depending on the two or more argument values.

2. The apparatus according to claim 1, wherein the transmission medium is a fiber-optical channel.

3. The apparatus according to claim 1,
    wherein the apparatus further comprises a signal modification module being configured to modify the frequency-domain data signal using the one or more spectral interference coefficients to acquire a modified data signal,
    wherein the apparatus further comprises an inverse transform module configured to transform the modified data signal from the frequency domain to the time domain to acquire a corrected time-domain data signal.

4. The apparatus according to claim 3,
    wherein the signal modification module is configured to combine
        each one of the one or more spectral interference coefficients, or a value derived from said one of the one or more spectral interference coefficients, and
        one of the plurality of spectral coefficients to acquire the modified data signal.

5. The apparatus according to claim 3,
    wherein the transform module is configured to transform the data input signal from the time domain to the frequency domain by transforming a plurality of overlapping blocks of the data input signal from the time domain to the frequency domain to acquire a plurality of blocks of the frequency-domain data signal, and
    wherein the inverse transform module configured to transform the modified data signal from the frequency domain to the time domain by transforming a plurality of blocks from the frequency domain to the time domain and by overlapping said plurality of blocks being represented in the time domain to acquire the corrected time-domain data signal.

6. The apparatus according to claim 1,
    wherein the apparatus further comprises an inverse transform module configured to transform the one or more spectral interference coefficients from the frequency domain to the time domain, and
    wherein the apparatus further comprises a signal modification module being configured to modify the data input signal being represented in the time domain using the one or more spectral interference coefficients being represented in the time domain to acquire a corrected time-domain data signal.

7. The apparatus according to claim 6,
    wherein the signal modification module is configured to combine
        each one of the one or more spectral interference coefficients being represented in the time domain, or a value derived from said one of the one or more spectral interference coefficients, and a time domain sample of a plurality of time domain samples of the data input signal being represented in the time domain to acquire the corrected time-domain data signal.

8. The apparatus according to claim 6,
wherein the transform module is configured to transform the data input signal from the time domain to the frequency domain by transforming a plurality of overlapping blocks of the data input signal from the time domain to the frequency domain to acquire a plurality of blocks of the frequency-domain data signal, and
wherein the inverse transform module is configured to transform a plurality of interference coefficients blocks from the frequency domain to the time domain, said plurality of blocks comprising the one or more spectral interference coefficients, and
wherein the signal modification module is configured to modify the overlapping blocks of the data input signal, being represented in the time domain, using the plurality of interference coefficients blocks to acquire a plurality of corrected blocks, wherein the signal modification module is configured to overlap the plurality of corrected blocks to acquire the corrected time-domain data signal.

9. The apparatus according to claim 3,
wherein the apparatus further comprises a transmitter module configured to transmit the corrected time-domain data signal over the transmission medium.

10. The apparatus according to claim 3,
wherein the apparatus further comprises a receiver module configured to receive the data input signal being transmitted over the transmission medium.

11. The apparatus according to claim 1,
wherein the analysis module is configured to determine an estimation of a perturbated signal depending on the data input signal using the one or more spectral interference coefficients.

12. The apparatus according to claim 11,
wherein the analysis module is configured to determine the estimation of the perturbated signal by adding each one of the one or more spectral interference coefficients with one of the plurality of spectral coefficients.

13. The apparatus according to claim 1,
wherein each of the two or more argument values is a channel index being an index which indicates one of the plurality of frequency channels, or
wherein each of the two or more argument values is a frequency which indicates one of the plurality of frequency channels, wherein said one of the plurality of frequency channels comprises said frequency.

14. The apparatus according to claim 1,
wherein the analysis module is configured to determine each spectral interference coefficient of the one or more spectral interference coefficients by determining a plurality of addends, wherein the analysis module is configured to determine each of the plurality of addends as a product of three or more of the spectral coefficients and of the return value of the transfer function, the transfer function comprising three or more channel indices or three or more frequencies as the two or more argument values of the transfer function, which indicate three or more of the plurality of frequency channels to which said three or more of the spectral coefficients are assigned.

15. The apparatus according to claim 14,
wherein the analysis module is configured to determine the interference by applying a regular perturbation approach.

16. The apparatus according to claim 14,
wherein the analysis module is configured to determine each spectral interference coefficient depending on:

$$\Delta A_\lambda^{SCI}[\mu] = -j \frac{\phi_{NL,\rho}}{N_{DFT}^2} \times \sum_{\mu_1,\mu_2} A_\lambda[\mu_1] A_\lambda^H[\mu_2] A_\lambda[\mu_3] H_\rho[\mu_1,\mu_2,\mu_3]$$

wherein $\Delta A_\lambda^{SCI}[\mu]$ is said spectral interference coefficient,
wherein $A_\lambda[\mu_1]$ is a first one of the three or more spectral coefficients,
wherein $A_\lambda[\mu_2]$ is a second one of the three or more spectral coefficients,
wherein $A_\lambda[\mu_3]$ is a third one of the three or more spectral coefficients,
wherein H indicates Hermitian,
wherein $\mu_1$ is a first index which indicates a first one of the plurality of frequency channels,
wherein $\mu_2$ is a second index which indicates a second one of the plurality of frequency channels,
wherein $\mu_3$ is a third index which indicates a third one of the plurality of frequency channels,
wherein $H_\rho[\mu_1, \mu_2, \mu_3]$ indicates the transfer function,
wherein $N_{DFT}^2$ indicates a square of a number of the plurality of frequency channels of the frequency domain,
wherein ϕNL, ρ is a number.

17. The apparatus according to claim 14,
wherein the analysis module is configured to determine each spectral interference coefficient depending on:

$$\Delta A_\lambda^{XCI}[\mu] = -j \frac{\phi_{NL,\nu}}{N_{DFT}^2} \times$$
$$\sum_{\mu_1,\mu_2} \left( B_\lambda[\mu_1] B_\lambda^H[\mu_2] + B_\lambda^H[\mu_2] B_\lambda[\mu_1] I \right) \times A_\lambda[\mu_3] H_\nu[\mu_1,\mu_2,\mu_3]$$

wherein $\Delta A_\lambda^{XCI}[\mu]$ is said spectral interference coefficient,
wherein $B_\lambda[\mu_1]$ is a first one of the three or more spectral coefficients,
wherein $B_\lambda[\mu_2]$ is a second one of the three or more spectral coefficients,
wherein $A_\lambda[\mu_3]$ is a third one of the three or more spectral coefficients,
wherein I indicates an identity matrix,
wherein H indicates Hermitian,
wherein $\mu_1$ is a first index which indicates a first one of the plurality of frequency channels,
wherein $\mu_2$ is a second index which indicates a second one of the plurality of frequency channels,
wherein $\mu_3$ is a third index which indicates a third one of the plurality of frequency channels,
wherein $H_\nu[\mu_1, \mu_2, \mu_3]$ indicates the transfer function,
wherein $N_{DFT}^2$ indicates a square of a number of the plurality of frequency channels of the frequency domain,
wherein ϕNL, ν is a number.

18. The apparatus according to claim 14,
wherein the analysis module is configured to determine the interference by applying a regular logarithmic perturbation approach.

19. The apparatus according to claim 14,
wherein the analysis module is configured to determine each spectral interference coefficient depending on:

$$\Delta A_\lambda^{SCI}[\mu] = -j\frac{\phi_{NL,\rho}}{N_{DFT}^2} \times \sum_u A_\lambda[\mu_1]A_\lambda^H[\mu_2]A_\lambda[\mu_3]H_\rho[\mu_1, \mu_2, \mu_3]$$

wherein $\Delta A_\lambda^{XCI}[\mu]$ is said spectral interference coefficient,
wherein $A_\lambda[\mu_1]$ is a first one of the three or more spectral coefficients,
wherein $A_\lambda[\mu_2]$ is a second one of the three or more spectral coefficients,
wherein $A_\lambda[\mu_3]$ is a third one of the three or more spectral coefficients,
wherein H indicates Hermitian,
wherein $\mu_1$ is a first index which indicates a first one of the plurality of frequency channels,
wherein $\mu_2$ is a second index which indicates a second one of the plurality of frequency channels,
wherein $\mu_3$ is a third index which indicates a third one of the plurality of frequency channels,
wherein $H_\rho[\mu_1, \mu_2, \mu_3]$ indicates the transfer function,
wherein $N_{DFT}^2$ indicates a square of a number of the plurality of frequency channels of the frequency domain,
wherein ϕNL, v is a number,
wherein $$u = \{[\mu_1, \mu_2]^T | \mu_2 \neq \mu_1 \wedge \mu_2 \neq \mu_3\}$$

20. The apparatus according to claim 14,
wherein the analysis module is configured to determine each spectral interference coefficient depending on:

$$\Delta A_\lambda^{XCI}[\mu] =$$
$$-j\frac{\phi_{NL,\nu}}{N_{DFT}^2} \times \sum_u \left(B_\lambda[\mu_1]B_\lambda^H[\mu_2] + B_\lambda^H[\mu_2]B_\lambda[\mu_1]I\right) \times A_\lambda[\mu_3]H_\nu[\mu_1, \mu_2, \mu_3]$$

wherein $\Delta A_\lambda^{XCI}[\mu]$ is said spectral interference coefficient,
wherein $B_\lambda[\mu_1]$ is a first one of the three or more spectral coefficients,
wherein $B_\lambda[\mu_2]$ is a second one of the three or more spectral coefficients,
wherein $A_\lambda[\mu_3]$ is a third one of the three or more spectral coefficients,
wherein I indicates an identity matrix,
wherein H indicates Hermitian,
wherein $\mu_1$ is a first index which indicates a first one of the plurality of frequency channels,
wherein $\mu_2$ is a second index which indicates a second one of the plurality of frequency channels,
wherein $\mu_3$ is a third index which indicates a third one of the plurality of frequency channels,
wherein $H_\nu[\mu_1, \mu_2, \mu_3]$ indicates the transfer function,
wherein $N_{DFT}^2$ indicates a square of a number of the plurality of frequency channels of the frequency domain,
wherein ϕNL, v is a number,
wherein $$u = \{[\mu_1, \mu_2]^T | \mu_2 \neq \mu_1\}.$$

21. The apparatus according to claim 1,
wherein the transfer function is normalized and nonlinear.

22. The apparatus according to claim 1,
wherein the analysis module is configured to employ Volterra based compensation to determine the one or more spectral interference coefficients.

23. The apparatus according to claim 1,
wherein the analysis module is configured to determine the one or more spectral interference coefficients by determining one or more transmit and receive sequences over discrete frequencies from a periodic Nyquist interval.

24. The apparatus according to claim 1, wherein the transfer function depends on $$H_\nu(e^{j\omega T}) = \frac{1}{T^3} \sum_{m \in Z^3} H_\nu\left(\omega - \frac{2\pi m}{T}\right).$$

25. A method for determining an interference in a transmission medium during a transmission of a data input signal, comprising:
transforming the data input signal from a time domain to a frequency domain comprising a plurality of frequency channels to acquire a frequency-domain data signal comprising a plurality of spectral coefficients, wherein each spectral coefficient of the plurality of spectral coefficients is assigned to one of the plurality of frequency channels, and
determining the interference by determining one or more spectral interference coefficients, wherein each of the one or more spectral interference coefficients is assigned to one of the plurality of frequency channels,
wherein determining each of the one or more spectral interference coefficients is conducted depending on the plurality of spectral coefficients and depending on a transfer function, wherein the transfer function is configured to receive two or more argument values, wherein each of the two or more argument values indicates one of the plurality of frequency channels, and wherein the transfer function is configured to return a return value depending on the two or more argument values.

26. A non-transitory digital storage medium having stored thereon a computer program for performing a method for determining an interference in a transmission medium during a transmission of a data input signal, comprising:
transforming the data input signal from a time domain to a frequency domain comprising a plurality of frequency channels to acquire a frequency-domain data signal comprising a plurality of spectral coefficients, wherein each spectral coefficient of the plurality of spectral coefficients is assigned to one of the plurality of frequency channels, and
determining the interference by determining one or more spectral interference coefficients, wherein each of the one or more spectral interference coefficients is assigned to one of the plurality of frequency channels, wherein determining each of the one or more spectral interference coefficients is conducted depending on the plurality of spectral coefficients and depending on a transfer function, wherein the transfer function is configured to receive two or more argument values, wherein each of the two or more argument values indicates one of the plurality of frequency channels, and wherein the transfer function is configured to return a return value depending on the two or more argument values, when said computer program is run by a computer.

* * * * *